United States Patent
Junge et al.

(10) Patent No.: US 12,441,786 B2
(45) Date of Patent: Oct. 14, 2025

(54) BISPECIFIC ANTIBODIES FOR USE IN TREATMENT OF NLRC4-GOF INFLAMMASOMAPATHY

(71) Applicant: NOVARTIS AG, Basel (CH)

(72) Inventors: Guido Junge, Basel (CH); Michael Kiffe, Efringen-Kirchen (DE); Jiri Kovarik, Zurich (CH); Richard Stein, Weil am Rhein (DE); Frank Waldron-Lynch, Brookline, MA (US)

(73) Assignee: NOVARTIS AG, Basel (CH)

( * ) Notice: Subject to any disclaimer, the term of this patent is extended or adjusted under 35 U.S.C. 154(b) by 237 days.

(21) Appl. No.: 17/455,192

(22) Filed: Nov. 16, 2021

(65) Prior Publication Data

US 2022/0177569 A1     Jun. 9, 2022

Related U.S. Application Data

(60) Provisional application No. 63/237,473, filed on Aug. 26, 2021, provisional application No. 63/115,473, filed on Nov. 18, 2020.

(51) Int. Cl.
| | | |
|---|---|---|
| *A61K 39/00* | (2006.01) | |
| *A61K 45/06* | (2006.01) | |
| *A61P 37/00* | (2006.01) | |
| *C07K 16/24* | (2006.01) | |
| *C07K 16/28* | (2006.01) | |
| *C07K 16/46* | (2006.01) | |

(52) U.S. Cl.
CPC ............ *C07K 16/245* (2013.01); *A61K 45/06* (2013.01); *A61P 37/00* (2018.01); *C07K 16/2875* (2013.01); *C07K 16/468* (2013.01); *A61K 2039/505* (2013.01)

(58) Field of Classification Search
None
See application file for complete search history.

(56) References Cited

U.S. PATENT DOCUMENTS

| | | | |
|---|---|---|---|
| 7,993,878 B2 | 8/2011 | Gram et al. | |
| 9,212,230 B2 | 12/2015 | Schuurman et al. | |
| 9,376,489 B2 | 6/2016 | Bardroff et al. | |
| 9,527,927 B2 | 12/2016 | Chowdhury | |
| 10,882,922 B2 | 1/2021 | Yang | |
| 2007/0071675 A1 | 3/2007 | Wu et al. | |
| 2009/0081191 A1 | 3/2009 | Kufer | |
| 2010/0047204 A1 | 2/2010 | Yoo | |
| 2014/0010814 A1 | 1/2014 | Benhar | |
| 2014/0112915 A1 | 4/2014 | Bardroff | |
| 2014/0242080 A1 | 8/2014 | Jaeger | |
| 2014/0377253 A1 | 12/2014 | Harding | |
| 2017/0002060 A1 | 1/2017 | Bolen | |
| 2017/0320967 A1 | 11/2017 | Yang | |
| 2019/0002589 A1* | 1/2019 | Bardroff | ............... A61P 9/10 |
| 2019/0218311 A1 | 7/2019 | Loew | |

FOREIGN PATENT DOCUMENTS

| | | |
|---|---|---|
| CA | 2276216 A1 | 12/1999 |
| RU | 2587616 C2 | 12/2019 |
| WO | 0177342 A1 | 10/2001 |
| WO | 200216436 A2 | 2/2002 |
| WO | 02092008 A2 | 11/2002 |
| WO | 03073981 A2 | 9/2003 |
| WO | 2006081139 A2 | 8/2006 |
| WO | 2007070981 A1 | 6/2007 |
| WO | 2007137984 A2 | 12/2007 |
| WO | 2008060219 A1 | 5/2008 |
| WO | 2008145664 A1 | 12/2008 |
| WO | 2009026158 A2 | 2/2009 |
| WO | 2009149185 A2 | 12/2009 |
| WO | 20100028275 A1 | 3/2010 |
| WO | 2010048183 A1 | 4/2010 |
| WO | 2012/021773 A1 | 2/2012 |
| WO | 2012023053 A2 | 2/2012 |
| WO | 2012135345 A1 | 10/2012 |
| WO | 2013012806 A2 | 1/2013 |
| WO | 2013087914 A1 | 6/2013 |
| WO | 2013096291 A2 | 6/2013 |
| WO | 2013096516 A1 | 6/2013 |
| WO | 2014036971 A1 | 3/2014 |
| WO | 2014037899 A2 | 3/2014 |
| WO | 2014068132 A1 | 5/2014 |
| WO | 2014095808 A1 | 6/2014 |
| WO | 2014096672 A1 | 6/2014 |
| WO | 2015032932 A1 | 3/2015 |

(Continued)

OTHER PUBLICATIONS

Saavedra et al., "Protective and Detrimental Roles of Inflammasomes in Disease," Semin. Immunopathol., 2015, vol. 37. pp. 313-322.
Paul, Fundamental Immunology, 3rd Edition, 1993, pp. 292-295.
Maccallum, et al., J. Mol. Biol., 1996, vol. 262, pp. 732-745.
Pascalis, et al., Journal of Immunology, 2002, vol. 169, pp. 3076-3084.
Casset et al., Biochemical and Biophysical Research Communications, 2003, vol. 307, pp. 198-205.
Vajdos et al., Journal of Molecular Biology, 2002, vol. 320, pp. 415-428.
Liu et al., mAbs, 2010, vol. 2, pp. 480-499.
Klein, et al., "Progress in Overcoming the Chain Association Issue in Bispecific Heterodimeric . . . " Landes Bioscience, mAbs, 2012, vol. 4, No. 6, pp. 653-663.

(Continued)

*Primary Examiner* — Mark Halvorson
(74) *Attorney, Agent, or Firm* — David Goetz

(57) ABSTRACT

The invention relates to bivalent bispecific monoclonal antibodies (bbmAb) or variants thereof for use in the treatment or for use in alleviating the symptoms of an NLRC4 inflammasomopathy, such as an NLRC4-GOF inflammasomopathy in a subject in need thereof. This invention also relates to bivalent bispecific monoclonal antibodies (bbmAb) or variants thereof for use in the treatment or for use in alleviating the symptoms of AIFEC in a subject in need thereof.

6 Claims, 7 Drawing Sheets
Specification includes a Sequence Listing.

(56) References Cited

FOREIGN PATENT DOCUMENTS

| | | | |
|---|---|---|---|
| WO | 2015086830 A1 | 6/2015 | |
| WO | 2015198240 A2 | 12/2015 | |
| WO | 2016026943 A1 | 2/2016 | |
| WO | 2016139297 A1 | 9/2016 | |
| WO | 2017011773 A2 | 1/2017 | |
| WO | 2017059551 A1 | 4/2017 | |
| WO | 2018057955 A1 | 3/2018 | |
| WO | 2018/229612 A1 | 12/2018 | |
| WO | 2019238893 A1 | 12/2019 | |

OTHER PUBLICATIONS

Kontermann et al., "Bispecific Antibodies," Drug Discovery Today, 2015, vol. 20, No. 7, pp. 838-847.

Merchant et al., "An Efficient Route to Human Bispecific IgG," Nature Publishing Group, Nature Bio Technology, 1998, vol. 16, pp. 677-681.

Ridgway et al., "Knobs-into-holes Engineering of Antibody CH3 Domains for Heavy Chain . . . " Protein Engineering, 1996, vol. 9, No. 7, pp. 617-621.

Brinkmann et al., The Making of Bispecific Antibodies, mAbs, 2017, vol. 9, No. 2, pp. 182-212.

Fischer et al., "Exploiting Light Chains for the Scalable Generation and Platform Purification . . . " Nature Communications, Nature Publishing Group, 2015, vol. 6, pp. 1-12.

Magistrelli et al., "Optimizing Assembly and Production of Native Bispecific Antibodies by Codon . . . " mAbs, 2016, vol. 9, No. 2, pp. 231-239.

Zhao et al., "The NLRC4 Inflammasome Receptors for Bacterial Flagellin and Type III Secretion Apparatus," Nature, 2011, vol. 477, pp. 596-600.

Anon, The Fourth Report on the Diagnosis, Evaluation and Treatment of High Blood Pressure . . . Pediatrics, 2004, pp. 555-576.

Anon, The Hospital for Sick Children Research Ethics Board Blood Sampling Guidelines (internet); available at www.sickkids.ca/research/research-ethics/forms-guidelines-templates/index.html (accessed on Oct. 16, 2020).

Bracaglia, "Anti Interferon-gamma (IFNγ) Monoclonal Antibody Treatment in a Patient Carrying . . . " Pediatric Rheumatology, 13 (Suppl. 1), O68.

Barsalou, "Rapamycin as an Adjunctive Therapy for NLRC4 Associated Macrophage Activation Syndrome," Frontiers in Immunology, 2018, vol. 9, pp. 1-6.

Blondell, et al., "Disorders of Puberty," Am. Fam. Physician, 1999, vol. 60, No. 1, pp. 223-224.

Boosheri and Hoffman, "CAPS and NLRP3," J. Clin. Immunol., 2019, vol. 39, pp. 277-286.

Canna et al., "An Activating NLRC4 Inflammasome Mutation Causes Autoinflammation with Recurrent . . . " Nat. Genet., 2014, vol. 10, pp. 1140-1146CANN.

Canna et al., "Life-Threatening NLRC4-Associated Hyperinflammation Successfully Treated . . . " J. Allergy Clin. Immunol., 2017, vol. 139, pp. 1698-1701.

Chakraborty et al., "Pharmacokinetic and Pharmacodynamic Properties of Canakinumab . . . " Clinical Pharmacokinetics, 2012, vol. 51, No. 6, pp. e1-e18.

Chear et al., "A Novel de Novo NLRC4 Mutation Reinforces the Likely Pathogenicity . . . " Clin. Immunol., 2020, vol. 211, p. 108328.

FDA, Guidance for Industry: Drug-Induced Liver Injury: Premarketing Clinical Evaluation (internet), available from: evs.nci.nih.gov/ftp1/CTCAE/related/UCM072278.pdf, accessed Oct. 8, 2020.

Feid and Corey, "Hypertension in Childhood," Pediatric in Review, 2007, vol. 28, No. 283-298.

Fleming et al., "Normal Ranges of Heart Rate and Respiratory Rate in Children From Birth to 18 Years of Age . . . " Lancet, 2011, vol. 19, No. 377, pp. 1011-1018.

Girard et al., "Elevated Serum Levels of Free Interleukin-18 in Adult-Onset Still's Disease," Rheumatology, 2016, vol. 55, pp. 2237-2247.

Kofoed and Vance, "Innate Immune Recognition of Bacterial Ligands . . . " 2011, Nature, vol. 477, pp. 592-595.

Kou and Shuei, "Bradypnea," Encyclopedia of Molecular Mechanisms of Disease, 2009, pp. 241-243.

Liang, et al., "Novel NLRC4 Mutation Causes a Syndrome of Perinatal Autoinflammation.." Pediatr. Dev. Pathol., 2017, vol. 20, No. 6, pp. 498-505.

Miao et al., "Innate Immune Detection of the Type III Secretion Apparatus Through . . . " Proc. Natl. Acad. Sci., USA, 2010, vol. 107, pp. 3076-3080.

Moghaddas et al., "Autoinflammatory Mutation in NLRC4 Reveals a Leucine-Rich Repeat . . . " J. Allergy Clin. Immunol., 2018, vol. 142, pp. 1956-1967.

Romberg et al., "Mutation of NLRC4 Causes a Syndrome of Enterocolitis and Autoinflammation," Nature Genetics, 2014, vol. 46, No. 10, pp. 1135-1139.

Romberg and Canna, "Inflammasomopathies," Curr. Opin. Allergy Clin. Immunol., 2017, vol. 17, pp. 398-404.

Tak, et al., "Pharmacokinetics of Il-18 Binding Protein in Healthy Volunteers and Subjects with Rheumatoid . . . " Eur. J. Drug Metab. Pharmacokinet; 2006, vol. 31, pp. 109-116.

Weiss et al., "Interleukin-18 Diagnostically Distinguishes and Pathogenically Promotes . . . " Blood, 2018, vol. 131, No. 13, pp. 1442-1455.

WHO, The WHO Child Growth Standards (internet), available from www.who.int/childgrowth/en, accessed Oct. 6, 2020.

Yan, et al., "Methods of Solving Rapid Binding Target-Mediated Drug Disposition . . . " Journal of Pharmacokinetics and Pharmacodynamics, 2012, vol. 39, No. 5, pp. 543-560.

Mariuzza, et al., The Structural Basis of Antigen-Antibody Recognition, Ann. Rev. Biophs. Chem., 16, 139-159, 1987.

Pakula, et al., Genetic Analysis of Protein Stability and Function, Annual Reviews of Genetics, 23, 289-310, 1989.

Pirozhkov, et al., Inflammasomal Diseases, Immunologiya., 39(2-3), 158-165, 2018.

Shen, et al., Single Variable Domain-IgG Fusion, A Novel Recombinant Approach to Fc Domain-Containing Bispecific Antibodies, The Journal of Biological Chemistry, 281(16), 10706-10714, Apr. 21, 2006.

Torres, et al, The immunoglobulin constant region contributes to affinity and specificity, Trends in Immunology, 29 (2), 91-97, 2008.

\* cited by examiner

Physician Global Assessment of Disease (PGA)

Physician Global Assessment of NLRC4-GOF Disease Activity (PGA)

Physician Global Assessment of NLRC4-GOF

| Absent (0) | Minimal (1) | Mild (2) | Moderate (3) | Severe (4) |
| --- | --- | --- | --- | --- |
| ☐ | ☐ | ☐ | ☐ | ☐ |

FIG.5

Physician Severity Assessment of Disease Signs and Symptoms

Physician severity assessment of NLRC4-GOF disease signs & symptoms

1. Assessment of abdominal pain

| Absent (0) | Minimal (1) | Mild (2) | Moderate (3) | Severe (4) |
| --- | --- | --- | --- | --- |
| ☐ | ☐ | ☐ | ☐ | ☐ |

2. Assessment of diarrhea

| Absent (0) | Minimal (1) | Mild (2) | Moderate (3) | Severe (4) |
| --- | --- | --- | --- | --- |
| ☐ | ☐ | ☐ | ☐ | ☐ |

3. Assessment of skin disease

| Absent (0) | Minimal (1) | Mild (2) | Moderate (3) | Severe (4) |
| --- | --- | --- | --- | --- |
| ☐ | ☐ | ☐ | ☐ | ☐ |

4. Assessment of fever

| Absent (0) | Minimal (1) | Mild (2) | Moderate (3) | Severe (4) |
| --- | --- | --- | --- | --- |
| ☐ | ☐ | ☐ | ☐ | ☐ |

5. Assessment of tachycardia

| Absent (0) | Minimal (1) | Mild (2) | Moderate (3) | Severe (4) |
| --- | --- | --- | --- | --- |
| ☐ | ☐ | ☐ | ☐ | ☐ |

FIG.6

Patient's/Parent's Global Assessment of Disease Activity (PPGA)

Patient/Parent Global Assessment of NLRC4-GOF Disease Activity (PPGA)

Patient/Parent Global Assessment

*Please rate the overall severity of your/your child's NLRC4-GOF-related symptoms today*

| Absent (0) | Minimal (1) | Mild (2) | Moderate (3) | Severe (4) |
|:---:|:---:|:---:|:---:|:---:|
| ☐ | ☐ | ☐ | ☐ | ☐ |

FIG. 7

SEQUENCE LISTING

```
<160> NUMBER OF SEQ ID NOS: 104

<210> SEQ ID NO 1
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 1

Ser Tyr Ala Ile Ser
1               5
```

-continued

```
<210> SEQ ID NO 2
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 2

Asn Ile Ile Pro Met Thr Gly Gln Thr Tyr Tyr Ala Gln Lys Phe Gln
1               5                   10                  15
Gly

<210> SEQ ID NO 3
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 3

Ala Ala Tyr His Pro Leu Val Phe Asp Asn
1               5                   10

<210> SEQ ID NO 4
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 4

Gly Gly Thr Phe Lys Ser Tyr
1               5

<210> SEQ ID NO 5
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 5

Ile Pro Met Thr Gly Gln
1               5

<210> SEQ ID NO 6
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 6

Ala Ala Tyr His Pro Leu Val Phe Asp Asn
1               5                   10

<210> SEQ ID NO 7
<211> LENGTH: 119
```

<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 7

Glu Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Lys Ser Tyr
            20                  25                  30

Ala Ile Ser Trp Val Arg Gln Ala Pro Gly Gln Gly Leu Glu Trp Met
        35                  40                  45

Gly Asn Ile Ile Pro Met Thr Gly Gln Thr Tyr Tyr Ala Gln Lys Phe
    50                  55                  60

Gln Gly Arg Val Thr Ile Thr Ala Asp Glu Ser Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Ala Ala Tyr His Pro Leu Val Phe Asp Asn Trp Gly Gln Gly
            100                 105                 110

Thr Leu Val Thr Val Ser Ser
            115

<210> SEQ ID NO 8
<211> LENGTH: 356
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 8
gaggtgcagc tggtgcagag cggcgccgag gtgaagaagc ccggcagcag cgtgaaggtg      60
agctgcaagg ccagcggcgg caccttcaag agctacgcca tcagctgggt gaggcaggcc     120
cccggccagg gcctggagtg gatgggcaac atcatcccca tgaccggcca gacctactac     180
gcccagaagt tccagggcag ggtgaccatc accgccgacg agagcaccag caccgcctac     240
atggagctga gcagcctgag gagcgaggac accgccgtgt actactgcgc cagggccgcc     300
taccaccccc tggtgttcga caactgggcc agggcaccct ggtgaccgtg agcagc         356

<210> SEQ ID NO 9
<211> LENGTH: 449
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 9

Glu Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Lys Ser Tyr
            20                  25                  30

Ala Ile Ser Trp Val Arg Gln Ala Pro Gly Gln Gly Leu Glu Trp Met
        35                  40                  45

Gly Asn Ile Ile Pro Met Thr Gly Gln Thr Tyr Tyr Ala Gln Lys Phe

```
            50                  55                  60
Gln Gly Arg Val Thr Ile Thr Ala Asp Glu Ser Thr Ser Thr Ala Tyr
 65                  70                  75                  80

Met Glu Leu Ser Ser Leu Arg Ser Glu Asp Thr Ala Val Tyr Tyr Cys
                     85                  90                  95

Ala Arg Ala Ala Tyr His Pro Leu Val Phe Asp Asn Trp Gly Gln Gly
                100                 105                 110

Thr Leu Val Thr Val Ser Ser Ala Ser Thr Lys Gly Pro Ser Val Phe
                115                 120                 125

Pro Leu Ala Pro Ser Ser Lys Ser Thr Ser Gly Gly Thr Ala Ala Leu
                130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
                180                 185                 190

Ser Ser Leu Gly Thr Gln Thr Tyr Ile Cys Asn Val Asn His Lys Pro
                195                 200                 205

Ser Asn Thr Lys Val Asp Lys Arg Val Glu Pro Lys Ser Cys Asp Lys
                210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
                260                 265                 270

Pro Glu Val Lys Phe Asn Trp Tyr Val Asp Gly Val Glu Val His Asn
                275                 280                 285

Ala Lys Thr Lys Pro Arg Glu Glu Gln Tyr Asn Ser Thr Tyr Arg Val
                290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
                340                 345                 350

Leu Pro Pro Ser Arg Glu Glu Met Thr Lys Asn Gln Val Ser Leu Thr
                355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
                435                 440                 445

Lys

<210> SEQ ID NO 10
<211> LENGTH: 1347
```

```
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 10
gaggtgcagc tggtgcagag cggcgccgag gtgaagaagc cggcagcag cgtgaaggtg        60 agctgcaagg ccagcggcgg caccttcaag agctacgcca tcagctgggt gaggcaggcc      120
cccggccagg gcctggagtg gatgggcaac atcatcccca tgaccggcca gacctactac      180
gcccagaagt tccagggcag ggtgaccatc accgccgacg agagcaccag caccgcctac      240
atggagctga gcagcctgag gagcgaggac accgccgtgt actactgcgc cagggccgcc      300
taccaccccc tggtgttcga caactggggc cagggcaccc tggtgaccgt gagcagcgcc      360
agcaccaagg gccccagcgt gttccccctg gcccccagca gcaagagcac cagcggcggc      420
accgccgccc tgggctgcct ggtgaaggac tacttccccg agcccgtgac cgtgagctgg      480
aacagcggcg ccctgaccag cggcgtgcac accttccccg ccgtgctgca gagcagcggc      540
ctgtacagcc tgagcagcgt ggtgaccgtg cccagcagca gcctgggcac ccagacctac      600
atctgcaacg tgaaccacaa gcccagcaac accaaggtgg acaagagggt ggagcccaag      660
agctgcgaca gacccacac ctgcccccc tgccccgccc cgaggccgc cggcggcccc         720 agcgtgttcc tgttcccccc caagcccaag gacaccctga tgatcagcag gacccccgag      780
gtgacctgcg tggtggtgga cgtgagccac gaggacccg aggtgaagtt caactggtac       840
gtggacggcg tggaggtgca caacgccaag accaagccca gggaggagca gtacaacagc      900
acctacaggg tggtgagcgt gctgaccgtg ctgcaccagg actggctgaa cggcaaggag      960
tacaagtgca aggtgagcaa caaggccctg cccgccccca tcgagaagac catcagcaag     1020
gccaagggcc agcccaggga gccccaggtg tacaccctgc cccccagcag ggaggagatg     1080
accaagaacc aggtgagcct gacctgcctg gtgaagggct tctaccccag cgacatcgcc     1140
gtggagtggg agagcaacgg ccagcccgag aacaactaca agaccacccc ccccgtgctg     1200
gacagcgacg gcagcttctt cctgtacagc aagctgaccg tggacaagag caggtggcag     1260
cagggcaacg tgttcagctg cagcgtgatg cacgaggccc tgcacaacca ctacacccag     1320
aagagcctga gcctgagccc cggcaag                                         1347

<210> SEQ ID NO 11
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 11

Ser Gly Ser Ser Ser Asn Ile Gly Asn His Tyr Val Asn
1               5                   10

<210> SEQ ID NO 12
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 12

Arg Asn Asn His Arg Pro Ser
1               5

<210> SEQ ID NO 13
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 13

Gln Ser Trp Asp Tyr Ser Gly Phe Ser Thr Val
1               5                   10

<210> SEQ ID NO 14
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 14

Ser Ser Ser Asn Ile Gly Asn His Tyr
1               5

<210> SEQ ID NO 15
<211> LENGTH: 3
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 15

Arg Asn Asn
1

<210> SEQ ID NO 16
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 16

Trp Asp Tyr Ser Gly Phe Ser Thr
1               5

<210> SEQ ID NO 17
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 17

Asp Ile Val Leu Thr Gln Pro Pro Ser Val Ser Gly Ala Pro Gly Gln
```

```
1               5                   10                  15
Arg Val Thr Ile Ser Cys Ser Gly Ser Ser Ser Asn Ile Gly Asn His
                20                  25                  30

Tyr Val Asn Trp Tyr Gln Gln Leu Pro Gly Thr Ala Pro Lys Leu Leu
                35                  40                  45

Ile Tyr Arg Asn Asn His Arg Pro Ser Gly Val Pro Asp Arg Phe Ser
        50                  55                  60

Gly Ser Lys Ser Gly Thr Ser Ala Ser Leu Ala Ile Thr Gly Leu Gln
65                  70                  75                  80

Ser Glu Asp Glu Ala Asp Tyr Tyr Cys Gln Ser Trp Asp Tyr Ser Gly
                85                  90                  95

Phe Ser Thr Val Phe Gly Gly Gly Thr Lys Leu Thr Val Leu
                100                 105                 110
```

<210> SEQ ID NO 18
<211> LENGTH: 330
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 18

```
gatatcgtcc tgactcagcc ccctagcgtc agcggcgctc ccggtcagag agtgactatt    60
agctgtagcg gctctagctc taatatcggt aatcactacg tgaactggta tcagcagctg   120
cccggcaccg cccctaagct gctgatctat agaaacaatc accggcctag cggcgtgccc   180
gataggttta gcggatctaa gtcaggcact agcgctagtc tggctatcac cggactgcag   240
tcagaggacg aggccgacta ctactgtcag tcctgggact atagcggctt tagcaccgtg   300
ttcggcggag gcactaagct gaccgtgctg                                    330
```

<210> SEQ ID NO 19
<211> LENGTH: 216
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 19

```
Asp Ile Val Leu Thr Gln Pro Pro Ser Val Ser Gly Ala Pro Gly Gln
1               5                   10                  15

Arg Val Thr Ile Ser Cys Ser Gly Ser Ser Ser Asn Ile Gly Asn His
                20                  25                  30

Tyr Val Asn Trp Tyr Gln Gln Leu Pro Gly Thr Ala Pro Lys Leu Leu
                35                  40                  45

Ile Tyr Arg Asn Asn His Arg Pro Ser Gly Val Pro Asp Arg Phe Ser
        50                  55                  60

Gly Ser Lys Ser Gly Thr Ser Ala Ser Leu Ala Ile Thr Gly Leu Gln
65                  70                  75                  80

Ser Glu Asp Glu Ala Asp Tyr Tyr Cys Gln Ser Trp Asp Tyr Ser Gly
                85                  90                  95

Phe Ser Thr Val Phe Gly Gly Gly Thr Lys Leu Thr Val Leu Gly Gln
                100                 105                 110

Pro Lys Ala Ala Pro Ser Val Thr Leu Phe Pro Pro Ser Ser Glu Glu
        115                 120                 125
```

```
Leu Gln Ala Asn Lys Ala Thr Leu Val Cys Leu Ile Ser Asp Phe Tyr
    130                 135                 140

Pro Gly Ala Val Thr Val Ala Trp Lys Ala Asp Ser Ser Pro Val Lys
145                 150                 155                 160

Ala Gly Val Glu Thr Thr Thr Pro Ser Lys Gln Ser Asn Asn Lys Tyr
                165                 170                 175

Ala Ala Ser Ser Tyr Leu Ser Leu Thr Pro Glu Gln Trp Lys Ser His
            180                 185                 190

Arg Ser Tyr Ser Cys Gln Val Thr His Glu Gly Ser Thr Val Glu Lys
        195                 200                 205

Thr Val Ala Pro Thr Glu Cys Ser
    210                 215

<210> SEQ ID NO 20
<211> LENGTH: 648
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 20
gatatcgtcc tgactcagcc ccctagcgtc agcggcgctc ccggtcagag agtgactatt       60
agctgtagcg gctctagctc taatatcggt aatcactacg tgaactggta tcagcagctg      120
cccggcaccg cccctaagct gctgatctat agaaacaatc accggcctag cggcgtgccc      180
gataggttta gcggatctaa gtcaggcact agcgctagtc tggctatcac cggactgcag      240
tcagaggacg aggccgacta ctactgtcag tcctgggact atagcggctt tagcaccgtg      300
ttcggcggag cactaagct gaccgtgctg ggtcagccta aggctgcccc cagcgtgacc       360
ctgttccccc ccagcagcga ggagctgcag gccaacaagg ccaccctggt gtgcctgatc      420
agcgacttct acccaggcgc cgtgaccgtg gcctggaagg ccgacagcag ccccgtgaag      480
gccggcgtgg agaccaccac ccccagcaag cagagcaaca acaagtacgc cgccagcagc      540
tacctgagcc tgacccccga gcagtggaag agccacaggt cctacagctg ccaggtgacc      600
cacgagggca gcaccgtgga aaagaccgtg gccccaaccg agtgcagc                   648

<210> SEQ ID NO 21
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 21

Val Tyr Gly Met Asn
1               5

<210> SEQ ID NO 22
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 22
```

```
Ile Ile Trp Tyr Asp Gly Asp Asn Gln Tyr Tyr Ala Asp Ser Val Lys
1               5                   10                  15

Gly

<210> SEQ ID NO 23
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 23

Asp Leu Arg Thr Gly Pro Phe Asp Tyr
1               5

<210> SEQ ID NO 24
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 24

Gly Phe Thr Phe Ser Val Tyr
1               5

<210> SEQ ID NO 25
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 25

Trp Tyr Asp Gly Asp Asn
1               5

<210> SEQ ID NO 26
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 26

Asp Leu Arg Thr Gly Pro Phe Asp Tyr
1               5

<210> SEQ ID NO 27
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 27

Gln Val Gln Leu Val Glu Ser Gly Gly Gly Val Val Gln Pro Gly Arg
```

```
              1               5                  10                 15
Ser Leu Arg Leu Ser Cys Ala Ala Ser Gly Phe Thr Phe Ser Val Tyr
                 20                  25                 30

Gly Met Asn Trp Val Arg Gln Ala Pro Gly Lys Gly Leu Glu Trp Val
             35                  40                 45

Ala Ile Ile Trp Tyr Asp Gly Asp Asn Gln Tyr Tyr Ala Asp Ser Val
         50                  55                 60

Lys Gly Arg Phe Thr Ile Ser Arg Asp Asn Ser Lys Asn Thr Leu Tyr
65                   70                  75                  80

Leu Gln Met Asn Gly Leu Arg Ala Glu Asp Thr Ala Val Tyr Tyr Cys
                 85                  90                 95

Ala Arg Asp Leu Arg Thr Gly Pro Phe Asp Tyr Trp Gly Gln Gly Thr
                 100                 105                110

Leu Val Thr Val Ser Ser
         115
```

<210> SEQ ID NO 28
<211> LENGTH: 354
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 28

```
caggtgcagc tggtggagag cggcggcggc gtggtgcagc ccggcaggag cctgaggctg      60
agctgcgccg ccagcggctt caccttcagc gtgtacggca tgaactgggt gaggcaggcc     120
cccggcaagg gcctggagtg ggtggccatc atctggtacg acggcgacaa ccagtactac     180
gccgacagcg tgaagggcag gttcaccatc agcagggaca acagcaagaa caccctgtac     240
ctgcagatga acggcctgag ggccgaggac accgccgtgt actactgcgc cagggacctg     300
aggaccggcc ccttcgacta ctggggccag ggcaccctgg tgaccgtgag cagc           354
```

<210> SEQ ID NO 29
<211> LENGTH: 448
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 29

```
Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Val Tyr
                 20                  25                 30

Gly Met Asn Trp Val Arg Gln Ala Pro Gly Lys Gly Leu Glu Trp Val
             35                  40                 45

Ala Ile Ile Trp Tyr Asp Gly Asp Asn Gln Tyr Tyr Ala Asp Ser Val
         50                  55                 60

Lys Gly Arg Phe Thr Ile Ser Arg Asp Asn Ser Lys Asn Thr Leu Tyr
65                   70                  75                  80

Leu Gln Met Asn Gly Leu Arg Ala Glu Asp Thr Ala Val Tyr Tyr Cys
                 85                  90                 95

Ala Arg Asp Leu Arg Thr Gly Pro Phe Asp Tyr Trp Gly Gln Gly Thr
                 100                 105                110
```

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
        130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Arg Val Glu Pro Lys Ser Cys Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly Lys
        435                 440                 445

<210> SEQ ID NO 30
<211> LENGTH: 1344
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 30
caggtgcagc tggtggagag cggcggcggc gtggtgcagc ccggcaggag cctgaggctg      60
agctgcgccg ccagcggctt caccttcagc gtgtacggca tgaactgggt gaggcaggcc     120

```
cccggcaagg gcctggagtg ggtggccatc atctggtacg acggcgacaa ccagtactac    180
gccgacagcg tgaagggcag gttcaccatc agcagggaca cagcaagaa caccctgtac    240 ctgcagatga acggcctgag ggccgaggac accgccgtgt actactgcgc cagggacctg    300
aggaccggcc ccttcgacta ctggggccag ggcaccctgg tgaccgtgag cagcgccagc    360
accaagggcc cagcgtgtt ccccctggcc ccagcagca agagcaccag cggcggcacc    420
gccgccctgg gctgcctggt gaaggactac ttccccgagc ccgtgaccgt gagctggaac    480
agcggcgccc tgaccagcgg cgtgcacacc ttccccgccg tgctgcagag cagcggcctg    540
tacagcctga gcgcgtggt gaccgtgccc agcagcagcc tgggcaccca gacctacatc    600
tgcaacgtga accacaagcc cagcaacacc aaggtggaca gagggtgga gcccaagagc    660 tgcgacaaga cccacacctg ccccccctgc ccgccccg agctgctggg cggccccagc    720
gtgttcctgt tccccccaa gcccaaggac accctgatga tcagcaggac ccccgaggtg    780
acctgcgtgg tggtggacgt gagccacgag accccgagg tgaagttcaa ctggtacgtg    840
gacggcgtgg aggtgcacaa cgccaagacc aagcccaggg aggagcagta caacagcacc    900
tacagggtgt gagcgtgct gaccgtgctg caccaggact ggctgaacgg caaggagtac    960
aagtgcaagg tgagcaacaa ggccctgccc gcccccatcg agaagaccat cagcaaggcc    1020
aagggccagc ccagggagcc ccaggtgtac accctgcccc cagcaggga ggagatgacc    1080 aagaaccagg tgagcctgac ctgcctggtg aagggcttct accccagcga catcgccgtg    1140
gagtgggaga gcaacggcca gcccgagaac aactacaaga ccaccccccc cgtgctggac    1200
agcgacggca gcttcttcct gtacagcaag ctgaccgtgg acaagagcag gtggcagcag    1260
ggcaacgtgt tcagctgcag cgtgatgcac gaggccctgc acaaccacta cacccagaag    1320
agcctgagcc tgagccccgg caag                                           1344

<210> SEQ ID NO 31
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 31

Arg Ala Ser Gln Ser Ile Gly Ser Ser Leu His
1               5                   10

<210> SEQ ID NO 32
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 32

Tyr Ala Ser Gln Ser Phe Ser
1               5

<210> SEQ ID NO 33
<211> LENGTH: 9
<212> TYPE: PRT
<213> ORGANISM: Artificial Sequence
<220> FEATURE:
```

```
<221> NAME/KEY: source
<223> OTHER INFORMATION: /note="Description of Artificial Sequence:
      Synthetic peptide"

<400> SEQUENCE: 33

His Gln Ser Ser Ser Leu Pro Phe Thr
1               5

<210> SEQ ID NO 34
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 34

Ser Gln Ser Ile Gly Ser Ser
1               5

<210> SEQ ID NO 35
<211> LENGTH: 3
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 35

Tyr Ala Ser
1

<210> SEQ ID NO 36
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 36

Ser Ser Ser Leu Pro Phe
1               5

<210> SEQ ID NO 37
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 37

Glu Ile Val Leu Thr Gln Ser Pro Asp Phe Gln Ser Val Thr Pro Lys
1               5                   10                  15

Glu Lys Val Thr Ile Thr Cys Arg Ala Ser Gln Ser Ile Gly Ser Ser
            20                  25                  30

Leu His Trp Tyr Gln Gln Lys Pro Asp Gln Ser Pro Lys Leu Leu Ile
        35                  40                  45

Lys Tyr Ala Ser Gln Ser Phe Ser Gly Val Pro Ser Arg Phe Ser Gly
    50                  55                  60

Ser Gly Ser Gly Thr Asp Phe Thr Leu Thr Ile Asn Ser Leu Glu Ala
```

```
                65                  70                  75                  80
Glu Asp Ala Ala Ala Tyr Tyr Cys His Gln Ser Ser Ser Leu Pro Phe
                    85                  90                  95

Thr Phe Gly Pro Gly Thr Lys Val Asp Ile Lys
            100                 105
```

<210> SEQ ID NO 38
<211> LENGTH: 321
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 38

```
gagatcgtgc tgacccagtc acccgacttt cagtcagtga cccctaaaga aaaagtgact       60
atcacctgta gggcctccca gtctatcggc tctagcctgc actggtatca gcagaagccc      120
gatcagtcac ctaagctgct gattaagtac gcctctcagt cctttagcgg cgtgccctct      180
aggtttagcg gctcaggctc aggcaccgac ttcaccctga ctatcaatag cctggaagcc      240
gaggacgccg ctgcctacta ctgtcatcag tcaagtagcc tgcccttcac cttcggccct      300
ggcactaaag tggatattaa g                                                321
```

<210> SEQ ID NO 39
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 39

```
Glu Ile Val Leu Thr Gln Ser Pro Asp Phe Gln Ser Val Thr Pro Lys
1               5                   10                  15

Glu Lys Val Thr Ile Thr Cys Arg Ala Ser Gln Ser Ile Gly Ser Ser
            20                  25                  30

Leu His Trp Tyr Gln Gln Lys Pro Asp Gln Ser Pro Lys Leu Leu Ile
        35                  40                  45

Lys Tyr Ala Ser Gln Ser Phe Ser Gly Val Pro Ser Arg Phe Ser Gly
    50                  55                  60

Ser Gly Ser Gly Thr Asp Phe Thr Leu Thr Ile Asn Ser Leu Glu Ala
65                  70                  75                  80

Glu Asp Ala Ala Ala Tyr Tyr Cys His Gln Ser Ser Ser Leu Pro Phe
                    85                  90                  95

Thr Phe Gly Pro Gly Thr Lys Val Asp Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190
```

Ala Cys Glu Val Thr His Gln Gly Leu Ser Ser Pro Val Thr Lys Ser
        195                 200                 205

Phe Asn Arg Gly Glu Cys
    210

<210> SEQ ID NO 40
<211> LENGTH: 642
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 40
gagatcgtgc tgacccagtc acccgacttt cagtcagtga cccctaaaga aaaagtgact      60
atcacctgta gggcctccca gtctatcggc tctagcctgc actggtatca gcagaagccc     120
gatcagtcac ctaagctgct gattaagtac gcctctcagt cctttagcgg cgtgccctct     180
aggtttagcg gctcaggctc aggcaccgac ttcaccctga ctatcaatag cctggaagcc     240
gaggacgccg ctgcctacta ctgtcatcag tcaagtagcc tgcccttcac cttcggccct     300
ggcactaaag tggatattaa gcgtacggtg gccgctccca gcgtgttcat cttcccccc     360 agcgacgagc agctgaagag cggcaccgcc agcgtggtgt gcctgctgaa caacttctac     420
ccccgggagg ccaaggtgca gtggaaggtg gacaacgccc tgcagagcgg caacagccag     480
gagagcgtca ccgagcagga cagcaaggac tccacctaca gcctgagcag caccctgacc     540
ctgagcaagg ccgactacga gaagcataag gtgtacgcct gcgaggtgac ccaccagggc     600
ctgtccagcc ccgtgaccaa gagcttcaac aggggcgagt gc                       642

<210> SEQ ID NO 41
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 41

Gly Phe Thr Phe Ser Val Tyr Gly Met Asn
1               5                   10

<210> SEQ ID NO 42
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 42

Ile Ile Trp Tyr Asp Gly Asp Asn Gln Tyr Tyr Ala Asp Ser Val Lys
1               5                   10                  15

Gly

<210> SEQ ID NO 43
<211> LENGTH: 9
<212> TYPE: PRT
<213> ORGANISM: Artificial Sequence
<220> FEATURE:

```
<221> NAME/KEY: source
<223> OTHER INFORMATION: /note="Description of Artificial Sequence:
      Synthetic peptide"

<400> SEQUENCE: 43

Asp Leu Arg Thr Gly Pro Phe Asp Tyr
1               5

<210> SEQ ID NO 44
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 44

Val Tyr Gly Met Asn
1               5

<210> SEQ ID NO 45
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 45

Ile Ile Trp Tyr Asp Gly Asp Asn Gln Tyr Tyr Ala Asp Ser Val Lys
1               5                   10                  15

Gly

<210> SEQ ID NO 46
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 46

Asp Leu Arg Thr Gly Pro Phe Asp Tyr
1               5

<210> SEQ ID NO 47
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 47

Gly Phe Thr Phe Ser Val Tyr
1               5

<210> SEQ ID NO 48
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
```

```
         Synthetic peptide"

<400> SEQUENCE: 48

Trp Tyr Asp Gly Asp Asn
1               5

<210> SEQ ID NO 49
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
        Synthetic peptide"

<400> SEQUENCE: 49

Asp Leu Arg Thr Gly Pro Phe Asp Tyr
1               5

<210> SEQ ID NO 50
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
        Synthetic peptide"

<400> SEQUENCE: 50

Gly Phe Thr Phe Ser Val Tyr Gly
1               5

<210> SEQ ID NO 51
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
        Synthetic peptide"

<400> SEQUENCE: 51

Ile Trp Tyr Asp Gly Asp Asn Gln
1               5

<210> SEQ ID NO 52
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
        Synthetic peptide"

<400> SEQUENCE: 52

Ala Arg Asp Leu Arg Thr Gly Pro Phe Asp Tyr
1               5                   10

<210> SEQ ID NO 53
<211> LENGTH: 118
<212> TYPE: PRT
<213> ORGANISM: Artificial Sequence
<220> FEATURE:
<221> NAME/KEY: source
<223> OTHER INFORMATION: /note="Description of Artificial Sequence:
        Synthetic polypeptide"

<400> SEQUENCE: 53
```

```
Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Val Tyr
            20                  25                  30

Gly Met Asn Trp Val Arg Gln Ala Pro Gly Lys Gly Leu Glu Trp Val
        35                  40                  45

Ala Ile Ile Trp Tyr Asp Gly Asp Asn Gln Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Gly Leu Arg Ala Glu Asp Thr Ala Val Tyr Tyr Cys
                85                  90                  95

Ala Arg Asp Leu Arg Thr Gly Pro Phe Asp Tyr Trp Gly Gln Gly Thr
            100                 105                 110

Leu Val Thr Val Ser Ser
            115
```

```
<210> SEQ ID NO 54
<211> LENGTH: 354
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 54
caggtgcagc tggtggaatc aggcggcgga gtggtgcagc ctggtagatc actgagactg      60
agctgcgctg ctagtggctt cacctttagc gtctacggaa tgaactgggt ccgacaggcc     120
cctgggaaag gcctggagtg gtggcaatt atctggtacg acggcgataa tcagtactac      180
gccgatagcg tgaagggacg gttcactatc tctagggata actctaagaa caccctgtac     240
ctgcagatga acggcctgag agccgaggac accgccgtct actactgcgc tagggacctg     300
agaaccggcc ccttcgacta ctggggacag ggcaccctgg tcaccgtgtc tagc            354
```

```
<210> SEQ ID NO 55
<211> LENGTH: 448
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 55

Gln Val Gln Leu Val Glu Ser Gly Gly Gly Val Val Gln Pro Gly Arg
1               5                   10                  15

Ser Leu Arg Leu Ser Cys Ala Ala Ser Gly Phe Thr Phe Ser Val Tyr
            20                  25                  30

Gly Met Asn Trp Val Arg Gln Ala Pro Gly Lys Gly Leu Glu Trp Val
        35                  40                  45

Ala Ile Ile Trp Tyr Asp Gly Asp Asn Gln Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Gly Leu Arg Ala Glu Asp Thr Ala Val Tyr Tyr Cys
                85                  90                  95

Ala Arg Asp Leu Arg Thr Gly Pro Phe Asp Tyr Trp Gly Gln Gly Thr
```

100                 105                 110
Leu Val Thr Val Ser Ser Ala Ser Thr Lys Gly Pro Ser Val Phe Pro
                115                 120                 125

Leu Ala Pro Ser Ser Lys Ser Thr Ser Gly Gly Thr Ala Ala Leu Gly
            130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
                180                 185                 190

Ser Leu Gly Thr Gln Thr Tyr Ile Cys Asn Val Asn His Lys Pro Ser
                195                 200                 205

Asn Thr Lys Val Asp Lys Arg Val Glu Pro Lys Ser Cys Asp Lys Thr
                210                 215                 220

His Thr Cys Pro Pro Cys Pro Ala Pro Glu Ala Ala Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Asp Val Ser His Glu Asp Pro
                260                 265                 270

Glu Val Lys Phe Asn Trp Tyr Val Asp Gly Val Glu Val His Asn Ala
                275                 280                 285

Lys Thr Lys Pro Arg Glu Glu Gln Tyr Asn Ser Thr Tyr Arg Val Val
                290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Cys Thr Leu
                340                 345                 350

Pro Pro Ser Arg Glu Glu Met Thr Lys Asn Gln Val Ser Leu Ser Cys
                355                 360                 365

Ala Val Lys Gly Phe Tyr Pro Ser Asp Ile Ala Val Glu Trp Glu Ser
                370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Val Ser Lys Leu Thr Val Asp Lys Ser
                405                 410                 415

Arg Trp Gln Gln Gly Asn Val Phe Ser Cys Ser Val Met His Glu Ala
                420                 425                 430

Leu His Asn His Tyr Thr Gln Lys Ser Leu Ser Leu Ser Pro Gly Lys
                435                 440                 445

<210> SEQ ID NO 56
<211> LENGTH: 1344
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 56
caggtgcagc tggtggaatc aggcggcgga gtggtgcagc tggtagatc actgagactg      60

| | |
|---|---|
| agctgcgctg ctagtggctt cacctttagc gtctacggaa tgaactgggt ccgacaggcc | 120 |
| cctgggaaag gcctggagtg ggtggcaatt atctggtacg acggcgataa tcagtactac | 180 |
| gccgatagcg tgaagggacg gttcactatc tctagggata actctaagaa caccctgtac | 240 |
| ctgcagatga acggcctgag agccgaggac accgccgtct actactgcgc tagggacctg | 300 |
| agaaccggcc ccttcgacta ctggggacag ggcaccctgg tcaccgtgtc tagcgcctct | 360 |
| actaagggcc caagcgtgtt ccccctggcc cctagctcta agtctactag cggaggcacc | 420 |
| gccgctctgg gctgcctggt caaggactac ttccccgagc ccgtgaccgt cagctggaat | 480 |
| agcggcgctc tgactagcgg agtgcacacc ttccccgccg tgctgcagtc tagcggcctg | 540 |
| tatagcctgt ctagcgtcgt gaccgtgcct agctctagcc tgggcactca gacctatatc | 600 |
| tgtaacgtga accacaagcc ctctaacact aaggtggaca agcgggtgga acctaagtcc | 660 |
| tgcgataaga ctcacacctg tcctccctgc cctgccctg aggctgccgg aggacctagc | 720 |
| gtgttcctgt tcccacccaa gcctaaagac accctgatga tctctaggac ccccgaagtg | 780 |
| acctgcgtgg tggtggacgt ctcacacgag gaccctgaag tgaagtttaa ttggtacgtg | 840 |
| gacggcgtgg aagtgcacaa cgctaagact aagcctagag aggaacagta taactctacc | 900 |
| tatagggtcg tcagcgtgct gacagtgctg caccaggact ggctgaacgg gaaagagtat | 960 |
| aagtgtaaag tgtctaacaa ggccctgcca gccctatcg aaaagactat ctctaaggct | 1020 |
| aaggggcagc ctagagaacc ccaagtgtgc actctgcccc ctagtagaga agagatgact | 1080 |
| aagaatcagg tgtcactgag ctgtgccgtg aagggcttct accctagcga tatcgccgtg | 1140 |
| gagtgggaga gcaacggcca gcccgagaac aactacaaga ccaccccccc agtgctggac | 1200 |
| agcgacggca gcttcttcct ggtgagcaag ctgaccgtgg acaagtccag gtggcagcag | 1260 |
| ggcaacgtgt tcagctgcag cgtgatgcac gaggccctgc acaaccacta cacccagaag | 1320 |
| tccctgagcc tgagccccgg caag | 1344 |

<210> SEQ ID NO 57
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic peptide"

<400> SEQUENCE: 57

Arg Ala Ser Gln Ser Ile Gly Ser Ser Leu His
1               5                   10

<210> SEQ ID NO 58
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic peptide"

<400> SEQUENCE: 58

Tyr Ala Ser Gln Ser Phe Ser
1               5

<210> SEQ ID NO 59
<211> LENGTH: 9
<212> TYPE: PRT
<213> ORGANISM: Artificial Sequence

```
<220> FEATURE:
<221> NAME/KEY: source
<223> OTHER INFORMATION: /note="Description of Artificial Sequence:
      Synthetic peptide"

<400> SEQUENCE: 59

His Gln Ser Ser Ser Leu Pro Phe Thr
1               5

<210> SEQ ID NO 60
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 60

Arg Ala Ser Gln Ser Ile Gly Ser Ser Leu His
1               5                   10

<210> SEQ ID NO 61
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 61

Tyr Ala Ser Gln Ser Phe Ser
1               5

<210> SEQ ID NO 62
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 62

His Gln Ser Ser Ser Leu Pro Phe Thr
1               5

<210> SEQ ID NO 63
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 63

Ser Gln Ser Ile Gly Ser Ser
1               5

<210> SEQ ID NO 64
<211> LENGTH: 3
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 64

Tyr Ala Ser
1

<210> SEQ ID NO 65
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 65

Ser Ser Ser Leu Pro Phe
1               5

<210> SEQ ID NO 66
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 66

Gln Ser Ile Gly Ser Ser
1               5

<210> SEQ ID NO 67
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 67

Tyr Ala Ser Gln Ser Phe Ser Gly Val Pro
1               5                   10

<210> SEQ ID NO 68
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 68

His Gln Ser Ser Ser Leu Pro Phe Thr
1               5

<210> SEQ ID NO 69
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 69

Glu Ile Val Leu Thr Gln Ser Pro Asp Phe Gln Ser Val Thr Pro Lys
```

|   | 1 |   |   |   | 5 |   |   |   |   | 10 |   |   |   |   | 15 |
|---|---|---|---|---|---|---|---|---|---|----|---|---|---|---|----|

Glu Lys Val Thr Ile Thr Cys Arg Ala Ser Gln Ser Ile Gly Ser Ser
                20                  25                  30

Leu His Trp Tyr Gln Gln Lys Pro Asp Gln Ser Pro Lys Leu Leu Ile
            35                  40                  45

Lys Tyr Ala Ser Gln Ser Phe Ser Gly Val Pro Ser Arg Phe Ser Gly
        50                  55                  60

Ser Gly Ser Gly Thr Asp Phe Thr Leu Thr Ile Asn Ser Leu Glu Ala
65                  70                  75                  80

Glu Asp Ala Ala Ala Tyr Tyr Cys His Gln Ser Ser Ser Leu Pro Phe
                85                  90                  95

Thr Phe Gly Pro Gly Thr Lys Val Asp Ile Lys
                100                 105

<210> SEQ ID NO 70
<211> LENGTH: 321
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 70
gagatcgtgc tgacccagtc acccgacttt cagtcagtga cccctaaaga aaaagtgact      60
atcacctgta gggcctccca gtctatcggc tctagcctgc actggtatca gcagaagccc     120
gatcagtcac ctaagctgct gattaagtac gcctctcagt cctttagcgg cgtgccctct     180
aggtttagcg gctcaggctc aggcaccgac ttcaccctga ctatcaatag cctggaagcc     240
gaggacgccg ctgcctacta ctgtcatcag tcaagtagcc tgcccttcac cttcggccct     300
ggcactaaag tggatattaa g                                                321

<210> SEQ ID NO 71
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 71

Glu Ile Val Leu Thr Gln Ser Pro Asp Phe Gln Ser Val Thr Pro Lys
1               5                   10                  15

Glu Lys Val Thr Ile Thr Cys Arg Ala Ser Gln Ser Ile Gly Ser Ser
                20                  25                  30

Leu His Trp Tyr Gln Gln Lys Pro Asp Gln Ser Pro Lys Leu Leu Ile
            35                  40                  45

Lys Tyr Ala Ser Gln Ser Phe Ser Gly Val Pro Ser Arg Phe Ser Gly
        50                  55                  60

Ser Gly Ser Gly Thr Asp Phe Thr Leu Thr Ile Asn Ser Leu Glu Ala
65                  70                  75                  80

Glu Asp Ala Ala Ala Tyr Tyr Cys His Gln Ser Ser Ser Leu Pro Phe
                85                  90                  95

Thr Phe Gly Pro Gly Thr Lys Val Asp Ile Lys Arg Thr Val Ala Ala
                100                 105                 110

Pro Ser Val Phe Ile Phe Pro Pro Ser Asp Glu Gln Leu Lys Ser Gly
            115                 120                 125

```
Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 72
<211> LENGTH: 642
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 72
gagatcgtgc tgacccagtc acccgacttt cagtcagtga cccctaaaga aaaagtgact      60
atcacctgta gggcctccca gtctatcggc tctagcctgc actggtatca gcagaagccc     120
gatcagtcac ctaagctgct gattaagtac gcctctcagt cctttagcgg cgtgccctct     180
aggtttagcg gctcaggctc aggcaccgac ttcaccctga ctatcaatag cctggaagcc     240
gaggacgccg ctgcctacta ctgtcatcag tcaagtagcc tgcccttcac cttcggccct     300
ggcactaaag tggatattaa gcgtacggtg gccgctccca gcgtgttcat cttcccccc      360 agcgacgagc agctgaagag cggcaccgcc agcgtggtgt gcctgctgaa caacttctac     420
ccccgggagg ccaaggtgca gtggaaggtg gacaacgccc tgcagagcgg caacagccag     480
gagagcgtca ccgagcagga cagcaaggac tccacctaca gcctgagcag caccctgacc     540
ctgagcaagg ccgactacga gaagcataag gtgtacgcct gcgaggtgac ccaccagggc     600
ctgtccagcc ccgtgaccaa gagcttcaac aggggcgagt gc                        642

<210> SEQ ID NO 73
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 73

Gly Gly Thr Phe Lys Ser Tyr Ala Ile Ser
1               5                   10

<210> SEQ ID NO 74
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 74
```

Asn Ile Ile Pro Met Thr Gly Gln Thr Tyr Tyr Ala Gln Lys Phe Gln
1               5                   10                  15

Gly

<210> SEQ ID NO 75
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 75

Ala Ala Tyr His Pro Leu Val Phe Asp Asn
1               5                   10

<210> SEQ ID NO 76
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 76

Ser Tyr Ala Ile Ser
1               5

<210> SEQ ID NO 77
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 77

Asn Ile Ile Pro Met Thr Gly Gln Thr Tyr Tyr Ala Gln Lys Phe Gln
1               5                   10                  15

Gly

<210> SEQ ID NO 78
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 78

Ala Ala Tyr His Pro Leu Val Phe Asp Asn
1               5                   10

<210> SEQ ID NO 79
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 79

```
Gly Gly Thr Phe Lys Ser Tyr
1               5

<210> SEQ ID NO 80
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 80

Ile Pro Met Thr Gly Gln
1               5

<210> SEQ ID NO 81
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 81

Ala Ala Tyr His Pro Leu Val Phe Asp Asn
1               5                   10

<210> SEQ ID NO 82
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 82

Gly Gly Thr Phe Lys Ser Tyr Ala
1               5

<210> SEQ ID NO 83
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 83

Ile Ile Pro Met Thr Gly Gln Thr
1               5

<210> SEQ ID NO 84
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 84

Ala Arg Ala Ala Tyr His Pro Leu Val Phe Asp Asn
1               5                   10
```

<210> SEQ ID NO 85
<211> LENGTH: 119
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 85

Glu Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Lys Ser Tyr
            20                  25                  30

Ala Ile Ser Trp Val Arg Gln Ala Pro Gly Gln Gly Leu Glu Trp Met
        35                  40                  45

Gly Asn Ile Ile Pro Met Thr Gly Gln Thr Tyr Tyr Ala Gln Lys Phe
    50                  55                  60

Gln Gly Arg Val Thr Ile Thr Ala Asp Glu Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Ala Ala Tyr His Pro Leu Val Phe Asp Asn Trp Gly Gln Gly
            100                 105                 110

Thr Leu Val Thr Val Ser Ser
        115

<210> SEQ ID NO 86
<211> LENGTH: 357
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 86
gaggtgcagc tggtgcagtc aggcgccgaa gtgaagaaac ccggctctag cgtgaaagtc      60
agctgtaaag ctagtggcgg caccttcaag tcctacgcta ttagctgggt cagacaggcc     120
ccaggtcagg gcctggagtg gatgggcaat attatcccta tgaccggtca gacctactac     180
gctcagaaat tcagggtag agtgactatc accgccgacg agtctactag caccgcctat     240
atggaactgt ctagcctgag atcagaggac accgccgtct actactgcgc tagagccgcc     300
tatcaccccc tggtgttcga taactggggt cagggcaccc tggtcaccgt gtctagc       357

<210> SEQ ID NO 87
<211> LENGTH: 449
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 87

Glu Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Lys Ser Tyr
            20                  25                  30

Ala Ile Ser Trp Val Arg Gln Ala Pro Gly Gln Gly Leu Glu Trp Met

```
            35                  40                  45
Gly Asn Ile Ile Pro Met Thr Gly Gln Thr Tyr Tyr Ala Gln Lys Phe
 50                  55                  60
Gln Gly Arg Val Thr Ile Thr Ala Asp Glu Ser Thr Ser Thr Ala Tyr
 65                  70                  75                  80
Met Glu Leu Ser Ser Leu Arg Ser Glu Asp Thr Ala Val Tyr Tyr Cys
                 85                  90                  95
Ala Arg Ala Ala Tyr His Pro Leu Val Phe Asp Asn Trp Gly Gln Gly
                100                 105                 110
Thr Leu Val Thr Val Ser Ser Ala Ser Thr Lys Gly Pro Ser Val Phe
            115                 120                 125
Pro Leu Ala Pro Ser Ser Lys Ser Thr Ser Gly Gly Thr Ala Ala Leu
            130                 135                 140
Gly Cys Leu Val Lys Asp Tyr Phe Pro Glu Pro Val Thr Val Ser Trp
145                 150                 155                 160
Asn Ser Gly Ala Leu Thr Ser Gly Val His Thr Phe Pro Ala Val Leu
                165                 170                 175
Gln Ser Ser Gly Leu Tyr Ser Leu Ser Ser Val Val Thr Val Pro Ser
                180                 185                 190
Ser Ser Leu Gly Thr Gln Thr Tyr Ile Cys Asn Val Asn His Lys Pro
            195                 200                 205
Ser Asn Thr Lys Val Asp Lys Arg Val Glu Pro Lys Ser Cys Asp Lys
210                 215                 220
Thr His Thr Cys Pro Pro Cys Pro Ala Pro Glu Ala Ala Gly Gly Pro
225                 230                 235                 240
Ser Val Phe Leu Phe Pro Pro Lys Pro Lys Asp Thr Leu Met Ile Ser
                245                 250                 255
Arg Thr Pro Glu Val Thr Cys Val Val Val Asp Val Ser His Glu Asp
                260                 265                 270
Pro Glu Val Lys Phe Asn Trp Tyr Val Asp Gly Val Glu Val His Asn
            275                 280                 285
Ala Lys Thr Lys Pro Arg Glu Glu Gln Tyr Asn Ser Thr Tyr Arg Val
290                 295                 300
Val Ser Val Leu Thr Val Leu His Gln Asp Trp Leu Asn Gly Lys Glu
305                 310                 315                 320
Tyr Lys Cys Lys Val Ser Asn Lys Ala Leu Pro Ala Pro Ile Glu Lys
                325                 330                 335
Thr Ile Ser Lys Ala Lys Gly Gln Pro Arg Glu Pro Gln Val Tyr Thr
            340                 345                 350
Leu Pro Pro Cys Arg Glu Glu Met Thr Lys Asn Gln Val Ser Leu Trp
            355                 360                 365
Cys Leu Val Lys Gly Phe Tyr Pro Ser Asp Ile Ala Val Glu Trp Glu
            370                 375                 380
Ser Asn Gly Gln Pro Glu Asn Asn Tyr Lys Thr Thr Pro Pro Val Leu
385                 390                 395                 400
Asp Ser Asp Gly Ser Phe Phe Leu Tyr Ser Lys Leu Thr Val Asp Lys
                405                 410                 415
Ser Arg Trp Gln Gln Gly Asn Val Phe Ser Cys Ser Val Met His Glu
                420                 425                 430
Ala Leu His Asn His Tyr Thr Gln Lys Ser Leu Ser Leu Ser Pro Gly
            435                 440                 445
Lys
```

<210> SEQ ID NO 88
<211> LENGTH: 1347
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 88

```
gaggtgcagc tggtgcagtc aggcgccgaa gtgaagaaac ccggctctag cgtgaaagtc    60
agctgtaaag ctagtggcgg caccttcaag tcctacgcta ttagctgggt cagacaggcc   120
ccaggtcagg gcctggagtg gatgggcaat attatcccta tgaccggtca gacctactac   180
gctcagaaat ttcagggtag agtgactatc accgccgacg agtctactag caccgcctat   240
atggaactgt ctagcctgag atcagaggac accgccgtct actactgcgc tagagccgcc   300
tatcaccccc tggtgttcga taactggggt cagggcaccc tggtcaccgt gtctagcgct   360
agcactaagg gccctcagt gttccccctg gcccctagct ctaagtctac tagcggcggc   420
accgccgctc tgggctgcct ggtgaaagac tacttccccg agcccgtgac cgtgtcatgg   480
aatagcggcg ctctgactag cggagtgcac accttccccg ccgtgctgca gtctagcggc   540
ctgtatagcc tgtctagcgt ggtgaccgtg cctagctcta gcctgggcac tcagacctac   600
atctgtaacg tgaaccacaa gcctctaac actaaggtgg acaagcgggt ggaacctaag   660
tcctgcgata agactcacac ctgtcccccc tgccctgccc ctgaggctgc cggaggacct   720
agcgtgttcc tgttcccacc taagcctaag gacaccctga tgatctctag gacccccgaa   780
gtgacctgcg tggtggtgga tgtgtctcac gaggaccctg aagtgaagtt caattggtac   840
gtggacggcg tggaagtgca caacgctaag actaagccta gagaggaaca gtataactcc   900
acctatagag tggtgtcagt gctgaccgtg ctgcatcagg actggctgaa cggcaaagag   960
tataagtgta aagtctctaa caaggccctg ccagccccta tcgaaaagac tatctctaag  1020
gctaagggcc agcctagaga acctcaggtg tacaccctgc cccctgtag agaagagatg  1080
actaagaatc aggtgtccct gtggtgtctg gtgaaaggct tctaccctag cgatatcgcc  1140
gtggaatggg agtctaacgg ccagcccgag aacaactata agactacccc ccctgtgctg  1200
gatagcgacg gctcattctt cctgtactct aagctgaccg tggacaagtc taggtggcag  1260
cagggcaatg tgtttagctg tagcgtgatg cacgaggccc tgcataatca ctacactcag  1320
aagtcactga gcctgagccc cggcaag                                      1347
```

<210> SEQ ID NO 89
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 89

Ser Gly Ser Ser Ser Asn Ile Gly Asn His Tyr Val Asn
1               5                   10

<210> SEQ ID NO 90
<211> LENGTH: 7
<212> TYPE: PRT
<213> ORGANISM: Artificial Sequence
<220> FEATURE:

```
<221> NAME/KEY: source
<223> OTHER INFORMATION: /note="Description of Artificial Sequence:
      Synthetic peptide"

<400> SEQUENCE: 90

Arg Asn Asn His Arg Pro Ser
1               5

<210> SEQ ID NO 91
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 91

Gln Ser Trp Asp Tyr Ser Gly Phe Ser Thr Val
1               5                   10

<210> SEQ ID NO 92
<211> LENGTH: 13
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 92

Ser Gly Ser Ser Ser Asn Ile Gly Asn His Tyr Val Asn
1               5                   10

<210> SEQ ID NO 93
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 93

Arg Asn Asn His Arg Pro Ser
1               5

<210> SEQ ID NO 94
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 94

Gln Ser Trp Asp Tyr Ser Gly Phe Ser Thr Val
1               5                   10

<210> SEQ ID NO 95
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
```

```
<400> SEQUENCE: 95

Ser Ser Ser Asn Ile Gly Asn His Tyr
1               5

<210> SEQ ID NO 96
<211> LENGTH: 3
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 96

Arg Asn Asn
1

<210> SEQ ID NO 97
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 97

Trp Asp Tyr Ser Gly Phe Ser Thr
1               5

<210> SEQ ID NO 98
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 98

Ser Ser Asn Ile Gly Asn His Tyr
1               5

<210> SEQ ID NO 99
<211> LENGTH: 3
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 99

Arg Asn Asn
1

<210> SEQ ID NO 100
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 100

Gln Ser Trp Asp Tyr Ser Gly Phe Ser Thr Val
1               5                   10
```

<210> SEQ ID NO 101
<211> LENGTH: 110
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 101

```
Asp Ile Val Leu Thr Gln Pro Pro Ser Val Ser Gly Ala Pro Gly Gln
1               5                   10                  15

Arg Val Thr Ile Ser Cys Ser Gly Ser Ser Ser Asn Ile Gly Asn His
            20                  25                  30

Tyr Val Asn Trp Tyr Gln Gln Leu Pro Gly Thr Ala Pro Lys Leu Leu
        35                  40                  45

Ile Tyr Arg Asn Asn His Arg Pro Ser Gly Val Pro Asp Arg Phe Ser
    50                  55                  60

Gly Ser Lys Ser Gly Thr Ser Ala Ser Leu Ala Ile Thr Gly Leu Gln
65                  70                  75                  80

Ser Glu Asp Glu Ala Asp Tyr Tyr Cys Gln Ser Trp Asp Tyr Ser Gly
                85                  90                  95

Phe Ser Thr Val Phe Gly Gly Gly Thr Lys Leu Thr Val Leu
            100                 105                 110
```

<210> SEQ ID NO 102
<211> LENGTH: 330
<212> TYPE: DNA
<213> ORGANISM: Artificial Sequence
<220> FEATURE:
<221> NAME/KEY: source
<223> OTHER INFORMATION: /note="Description of Artificial Sequence: Synthetic polynucleotide"

<400> SEQUENCE: 102

```
gatatcgtcc tgactcagcc ccctagcgtc agcggcgctc ccggtcagag agtgactatt    60
agctgtagcg gctctagctc taatatcggt aatcactacg tgaactggta tcagcagctg   120
cccggcaccg cccctaagct gctgatctat agaaacaatc accggcctag cggcgtgccc   180
gataggttta gcggatctaa gtcaggcact agcgctagtc tggctatcac cggactgcag   240
tcagaggacg aggccgacta ctactgtcag tcctgggact atagcggctt tagcaccgtg   300
ttcggcggag gcactaagct gaccgtgctg                                    330
```

<210> SEQ ID NO 103
<211> LENGTH: 216
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 103

```
Asp Ile Val Leu Thr Gln Pro Pro Ser Val Ser Gly Ala Pro Gly Gln
1               5                   10                  15

Arg Val Thr Ile Ser Cys Ser Gly Ser Ser Ser Asn Ile Gly Asn His
            20                  25                  30

Tyr Val Asn Trp Tyr Gln Gln Leu Pro Gly Thr Ala Pro Lys Leu Leu
        35                  40                  45
```

```
Ile Tyr Arg Asn Asn His Arg Pro Ser Gly Val Pro Asp Arg Phe Ser
    50              55                  60
Gly Ser Lys Ser Gly Thr Ser Ala Ser Leu Ala Ile Thr Gly Leu Gln
 65              70                  75                      80
Ser Glu Asp Glu Ala Asp Tyr Tyr Cys Gln Ser Trp Asp Tyr Ser Gly
                 85                  90                  95
Phe Ser Thr Val Phe Gly Gly Gly Thr Lys Leu Thr Val Leu Gly Gln
                100             105                 110
Pro Lys Ala Ala Pro Ser Val Thr Leu Phe Pro Pro Ser Ser Glu Glu
            115             120                 125
Leu Gln Ala Asn Lys Ala Thr Leu Val Cys Leu Ile Ser Asp Phe Tyr
130             135                 140
Pro Gly Ala Val Thr Val Ala Trp Lys Ala Asp Ser Ser Pro Val Lys
145             150                 155                     160
Ala Gly Val Glu Thr Thr Thr Pro Ser Lys Gln Ser Asn Asn Lys Tyr
                165                 170                 175
Ala Ala Ser Ser Tyr Leu Ser Leu Thr Pro Glu Gln Trp Lys Ser His
            180                 185                 190
Arg Ser Tyr Ser Cys Gln Val Thr His Glu Gly Ser Thr Val Glu Lys
            195                 200                 205
Thr Val Ala Pro Thr Glu Cys Ser
    210             215

<210> SEQ ID NO 104
<211> LENGTH: 648
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic polynucleotide"

<400> SEQUENCE: 104
gatatcgtcc tgactcagcc ccctagcgtc agcggcgctc ccggtcagag agtgactatt      60
agctgtagcg gctctagctc taatatcggt aatcactacg tgaactggta tcagcagctg     120
cccggcaccg cccctaagct gctgatctat agaaacaatc accggcctag cggcgtgccc     180
gataggttta gcggatctaa gtcaggcact agcgctagtc tggctatcac cggactgcag     240
tcagaggacg aggccgacta ctactgtcag tcctgggact atagcggctt tagcaccgtg     300
ttcggcggag gcactaagct gaccgtgctg ggtcagccta aggctgcccc cagcgtgacc     360
ctgttccccc ccagcagcga ggagctgcag gccaacaagg ccaccctggt gtgcctgatc     420
agcgacttct acccaggcgc cgtgaccgtg gcctggaagg ccgacagcag ccccgtgaag     480
gccggcgtgg agaccaccac ccccagcaag cagagcaaca acaagtacgc cgccagcagc     540
tacctgagcc tgacccccga gcagtggaag agccacaggt cctacagctg ccaggtgacc     600
cacgagggca gcaccgtgga aaagaccgtg gccccaaccg agtgcagc                  648
```

BISPECIFIC ANTIBODIES FOR USE IN TREATMENT OF NLRC4-GOF INFLAMMASOMAPATHY

TECHNICAL FIELD

The invention relates to treatments for bivalent bispecific monoclonal antibodies (bbmAb) or variants thereof, for the use in treatment of an NLRC4-GOF inflammasomapathy in a patient in need thereof. In some cases, the bbmAb (or variant) is for the treatment of infantile enterocolitis in a patient having an NLRC4-GOF inflammasomapathy and/or an NLRC4-GOF mutation. The disclosure also relates to methods and treatment regimens for treating NLRC4-GOF inflammasomapathy by employing bispecific antibodies targeting both IL-1β and IL-18 simultaneously.

BACKGROUND OF THE DISCLOSURE

The inflammasomes are intracellular multiprotein complexes that are normally formed and activated in response to pathogen- or danger-associated molecular patterns (PAMPs/DAMPs). The inflammasomopathies are a group of mechanistically related diseases resulting from the over-activation of individual inflammasomes leading to differentiated clinical phenotypes dependent on the effector cytokines produced and the tissue-specific expression. The currently best described inflammasomopathies are the inflammatory syndromes associated with NLRP3 Gain of Function (GOF), also named cryopyrin-associated periodic syndrome (CAPS), by increased production of IL-1β leading to systemic (commonly including recurrent fever and fatigue, rash), as well as local inflammatory reactions, involving the eyes, inner ears, bones, joints, and meninges. For CAPS, neutralization of IL-1B (e.g. canakinumab) is an established and approved clinical therapy for adults and pediatric patients (Booshehri and Hoffman 2019). Nucleotide-binding oligomerization domain-like receptor family CARD domain-containing protein 4 (NLRC4) is a principal component of NLRC4 inflammasomes. NLRC4 inflammasomes are crucial for activating an inflammatory response to gram-negative intracellular bacteria including *Pseudomonas aeruginosa, Shigella flexneri* and *Salmonella enterica* that all express the flagellin protein (Miao et al 2010, Kofoed and Vance 2011, Zhao et al 2011).

In patients with NLRC4 inflammasomopathies, GOF mutations in the NLRC4 gene encoding this protein can promote the spontaneous formation of the NLRC4 inflammasome. Clinically, this results in multisystem autoinflammatory diseases characterized by elevation of the pro-inflammatory inflammasome effector cytokines IL-1β and IL-18, though the clinical phenotype and presentations differ dependent on the genotype and profile of the effector cytokines. See, FIG. 1.

Three NLRC4 inflammasomapathy clinical phenotypes have been described. NLRC4-GOF inflammasomopathy can be characterized by very early onset infantile enterocolitis with severe diarrhea, ephemeral maculopapular and urticarial rashes, fever, cytopenias, liver dysfunction and coagulopathy, and is typically found in patient having with germline de novo or inherited NLRC4-GOF mutations. Neonatal onset multisystemic inflammatory disease (NOMID) can be characterized by fever, rash, inflammatory bone lesions, sensory neural hearing loss and structural brain defects, and is typically found in patients presenting with somatic mosaicism of NLRC4 mutations. Familial cold autoinflammatory syndrome 4 (FACS4) can be characterized by fever, prominent cold induced urticarial rash, arthralgias, and mild intestinal inflammation, and is reported in a single family having a germline NLRC4 mutation. NLRC4-GOF inflammasomopathy patients typically have hyper-elevated IL-1β and IL-18 and investigational treatments include IL-1 receptor blocking therapy (e.g., administering anakinra) and IL-1 receptor blocking therapy combined with anti-IL-18 therapy (e.g., administering IL-18 BP) (Romberg et al. 2017; Canna et al, 2014). NOMID patients typically have elevated IL-1β and investigational treatments include anti-IL-1 therapy. FCAS4 patients typically have elevated IL-18 and investigational treatments include administration of one or more non-steroidal anti-inflammatory drugs (NSAIDs).

As explained above, patients affected by an NLRC4-GOF associated autoinflammatory disease generally have grossly elevated IL-1β and IL-18 levels. These elevated effector cytokines drive the MAS features (fever, rash, tachycardia, cytopenia, liver dysfunction and coagulopathy) and the rapid early development of enterocolitis that is characterized by severe, refractory, neonatal diarrhea that distinguishes NLRC4-GOF from other NLRC4 clinical phenotypes. The present inventors believe that only the combination of anti-IL-1 receptor (e.g., anakinra) and recombinant IL-18 binding protein (e.g., IL-18 BP) has been reported as clinically efficacious in a limited number of infant cases.

Accordingly, apart from supportive medical care and immunosuppression that is of limited benefit in this population, there are no approved therapeutics that directly and specifically target the underlying IL-1β and IL-18 driven autoinflammatory process to improve the overall clinical outcome for NLRC4-GOF inflammasomopathy pediatric patients. Thus, there is a long-felt unmet need in the art for improved treatments of NLRC4-GOF inflammasomopathy.

SUMMARY OF THE DISCLOSURE

Described is a bispecific antibody or functional fragments thereof targeting both IL-1B and IL-18 simultaneously, for use in preventing or treating an NLRC4-GOF inflammasomopathy in a subject. In some cases, the bispecific antibody or functional fragments thereof targeting both IL-1β and IL-18 simultaneously are for use in treating autoinflammation with infantile enterocolitis (AIFEC) in a subject. Described herein are also methods of preventing or treating an NLRC4-GOF inflammasomapathy by administering to a subject in need thereof a therapeutically effective amount of a bispecific antibody targeting both IL-1β and IL-18 simultaneously. In some cases, the method includes treatment of AIFEC in a subject in need thereof by administering the therapeutically effective amount of the bispecific antibody.

Further provided herein are specific dosing regimens for the methods or use of a bispecific antibody targeting both IL-1β and IL-18 simultaneously (e.g., bbmAb1) described herein.

Additionally described herein are pharmaceutical combinations and pharmaceutical compositions comprising a) a bispecific antibody targeting both IL-1β and IL-18 simultaneously (e.g., bbmAb1), and b) at least one further therapeutic agent, optionally in the presence of a pharmaceutically acceptable carrier, for use in the treatment or prevention of an NLRC4-GOF inflammasomopathy, such as for use in treatment of AIFEC. Further features and advantages of the described methods and uses will become apparent from the following detailed description In a first aspect the disclosure relates to a method for the treatment or prevention of symptoms of NLRC4 inflammasomopathy the method comprising administering to said subject a therapeutically effective amount of a bispecific antibody, wherein the antibody comprises
  a. a first part which is an immunoglobulin with a first variable light chain of (VL1) and a first variable heavy chain (VH1), that binds specifically to a IL1β, and a first constant heavy chain (CH1) with a hetero-dimerization modification, and
  b. a second part which is an immunoglobulin with a second variable light chain (VL2) and a second variable heavy chain (VH2), that binds specifically to IL-18 and a second constant heavy chain (CH2) with a hetero-dimerization modification which is complementary to the hetero-dimerization modification of the first constant heavy chain.

In a second aspect the disclosure relates to a method for slowing, arresting, or reducing the severity of symptoms of NLRC4 inflammasomopathy in a subject in need thereof, comprising administering to said subject a therapeutically effective amount of a bispecific antibody, wherein the antibody comprises
  a. a first part which is an immunoglobulin with a first variable light chain of (VL1) and a first variable heavy chain (VH1), that binds specifically to a IL1β, and a first constant heavy chain (CH1) with a hetero-dimerization modification, and
  b. a second part which is an immunoglobulin with a second variable light chain (VL2) and a second variable heavy chain (VH2), that binds specifically to IL-18 and a second constant heavy chain (CH2) with a hetero-dimerization modification which is complementary to the hetero-dimerization modification of the first constant heavy chain.

In a third aspect, the disclosure relates to a bispecific antibody comprising
  a. a first part which is an immunoglobulin with a first variable light chain of (VL1) and a first variable heavy chain (VH1), that binds specifically to a IL1β, and a first constant heavy chain (CH1) with a hetero-dimerization modification, and
  b. a second part which is an immunoglobulin with a second variable light chain (VL2) and a second variable heavy chain (VH2), that binds specifically to IL-18 and a second constant heavy chain (CH2) with a hetero-dimerization modification which is complementary to the hetero-dimerization modification of the first constant heavy chain, for use in the treatment or prevention of an NLRC4 inflammasomopathy, such as an in a subject in need thereof.

In a fourth aspect the disclosure relates to method and treatments of the first, second and third aspect, wherein about 1 mg/kg to about 35 mg/kg of the bispecific antibody targeting both IL-1β and IL-18 simultaneously is administered to the subject. In a preferred embodiment of the fourth aspect, about 10 mg/kg of the bispecific antibody are administered to the treated subject.

In one aspect of the disclosure the bispecific antibody targeting both IL-1β and IL-18 simultaneously is administered to the subject intravenously or subcutaneously.

In a furthermore preferred embodiment, the bispecific antibody targeting both IL-1β and IL-18 simultaneously is administered intravenously to the treated subject at a dose of about 10 mg/kg.

In one embodiment, the 10 mg/kg dose of the bispecific antibody targeting both IL-1β and IL-18 simultaneously is administered intravenously to the patient only once on day 1. In another embodiment, the 10 mg/kg dose of the bispecific antibody targeting both IL-1β and IL-18 simultaneously is administered intravenously to the patient on day 1 and on day 2, day 3, day 4, day 5, day 6, day 7, day 8, day 9, day 10, day 11, day 12, day 13 and/or day 14. In a further embodiment, the 10 mg/kg dose of the bispecific antibody targeting both IL-1β and IL-18 simultaneously is administered intravenously to the patient on day 1 and day 14. In a further embodiment, the 10 mg/kg dose of the bispecific antibody targeting both IL-1β and IL-18 simultaneously is administered intravenously to the patient once every 2 weeks. In one embodiment, the 10 mg/kg dose of the bispecific antibody targeting both IL-1β and IL-18 simultaneously is administered intravenously to the patient once every 2 weeks in a period of up to 28 weeks. In one embodiment, the 10 mg/kg dose of the bispecific antibody targeting both IL-1β and IL-18 simultaneously is administered intravenously to the patient once every 2 weeks in a period of up to 24 weeks.

In one embodiment, the 10 mg/kg dose of the bispecific antibody targeting both IL-1β and IL-18 simultaneously is administered intravenously to the patient once every 2 weeks in a period of up to 3 years. In one embodiment, the 10 mg/kg dose of the bispecific antibody targeting both IL-1β and IL-18 simultaneously is administered intravenously to the patient once every 2 weeks for 2 weeks. In one embodiment, the 10 mg/kg dose of the bispecific antibody targeting both IL-1β and IL-18 simultaneously is administered intravenously to the patient once every 2 weeks for 8 weeks. In one embodiment, the 10 mg/kg dose of the bispecific antibody targeting both IL-1β and IL-18 simultaneously is administered intravenously to the patient once every 2 weeks for 14 weeks. In one embodiment, the 10 mg/kg dose of the bispecific antibody targeting both IL-1β and IL-18 simultaneously is administered intravenously to the patient once every 2 weeks for 24 weeks. In one embodiment, the 10 mg/kg dose of the bispecific antibody targeting both IL-1β and IL-18 simultaneously is administered intravenously to the patient once every 2 weeks for at least 2 weeks. In one embodiment, the 10 mg/kg dose of the bispecific antibody targeting both IL-1β and IL-18 simultaneously is administered intravenously to the patient once every 2 weeks for at least 8 weeks. In one embodiment, the 10 mg/kg dose of the bispecific antibody targeting both IL-1β and IL-18 simultaneously is administered intravenously to the patient once every 2 weeks for at least 14 weeks. In one embodiment, the 10 mg/kg dose of the bispecific antibody targeting both IL-1β and IL-18 simultaneously is administered intravenously to the patient once every 2 weeks for at least 24 weeks.

In a preferred embodiment, a bispecific antibody targeting both IL-1β and IL-18 simultaneously is administered to a patient every two weeks, e.g., intravenously, such as for example at a dose of, or of about, 10 mg/kg.

In another embodiment of the preceding aspects of the disclosure, the bispecific antibody targeting both IL-1β and IL-18 is administered in combination with at least one further therapeutic agent.

In a particular embodiment of any one of the preceding aspects of the disclosure, the first and second constant heavy chains of the bispecific antibody are human IgA, IgD, IgE, IgG, or IgM, preferably IgD, IgE or IgG, such as human IgG1, IgG2, IgG3, or IgG4, preferably IgG1.

In another embodiment of any one of the preceding aspects of the disclosure the first and second constant heavy chains of the bispecific antibody are IgG1, and a. the first constant heavy chain has point mutations generating a knob structure and the second constant heavy has point mutations generating a hole structure, or
b. the first constant heavy chain has point mutations generating a hole structure and the second constant heavy has point mutations generating a knob structure, and optionally
c. the first and second constant heavy chains have mutations resulting in a disulfide bridge.

In a specifically preferred embodiment of the first and second aspect, the first immunoglobulin VH1 domain of the bispecific antibody comprises:
  i. hypervariable regions CDR1, CDR2 and CDR3, said CDR1 having the amino acid sequence SEQ ID NO:76, said CDR2 having the amino acid sequence SEQ ID NO:77, and said CDR3 having the amino acid sequence SEQ ID NO:78; or
  ii. hypervariable regions CDR1, CDR2 and CDR3, said CDR1 having the amino acid sequence SEQ ID NO:79, said CDR2 having the amino acid sequence SEQ ID NO:80, and said CDR3 having the amino acid sequence SEQ ID NO:81; and the first immunoglobulin VL1 domain of the bispecific antibody comprises:
  iii. hypervariable regions CDR1, CDR2 and CDR3, said CDR1 having the amino acid sequence SEQ ID NO:92, said CDR2 having the amino acid sequence SEQ ID NO:93, and said CDR3 having the amino acid sequence SEQ ID NO:94 or
  iv. hypervariable regions CDR1, CDR2 and CDR3, said CDR1 having the amino acid sequence SEQ ID NO:95, said CDR2 having the amino acid sequence SEQ ID NO:96, and said CDR3 having the amino acid sequence SEQ ID NO:97; and the second immunoglobulin VH2 domain of the bispecific antibody comprises:
  v. hypervariable regions CDR1, CDR2 and CDR3, said CDR1 having the amino acid sequence SEQ ID NO:44, said CDR2 having the amino acid sequence SEQ ID NO:45, and said CDR3 having the amino acid sequence SEQ ID NO:46; or
  vi. hypervariable regions CDR1, CDR2 and CDR3, said CDR1 having the amino acid sequence SEQ ID NO:47, said CDR2 having the amino acid sequence SEQ ID NO:48, and said CDR3 having the amino acid sequence SEQ ID NO:49; and the second immunoglobulin VL2 domain of the bispecific antibody comprises:
  vii. hypervariable regions CDR1, CDR2 and CDR3, said CDR1 having the amino acid sequence SEQ ID NO:60, said CDR2 having the amino acid sequence SEQ ID NO:61, and said CDR3 having the amino acid sequence SEQ ID NO:62 or
  viii. hypervariable regions CDR1, CDR2 and CDR3, said CDR1 having the amino acid sequence SEQ ID NO:63, said CDR2 having the amino acid sequence SEQ ID NO:64, and said CDR3 having the amino acid sequence SEQ ID NO:65.

In another preferred embodiment of the disclosure, the antibody used in the methods according to any of the preceding aspects comprises:
  a. the first immunoglobulin VH1 domain of amino acid sequence SEQ ID NO: 85,
  b. the first immunoglobulin VL1 domain of amino acid sequence SEQ ID NO: 101,
  c. the second immunoglobulin VH2 domain of amino acid sequence SEQ ID NO: 53, and
  d. the second immunoglobulin VL2 domain of amino acid sequence SEQ ID NO: 69.

In another preferred embodiment of the disclosure, the antibody used in the methods according to any of the preceding aspects comprises
  e. the first immunoglobulin heavy chain of amino acid sequence SEQ ID NO: 87,
  f. the first immunoglobulin light chain of amino acid sequence SEQ ID NO: 103,
  g. the second immunoglobulin heavy chain of amino acid sequence SEQ ID NO: 55, and
  h. the second immunoglobulin light chain of amino acid sequence SEQ ID NO: 71.

In another embodiment of the preceding aspects of the disclosure, the treated subject has an NLRC4-GOF inflammasomapathy. In another embodiment of the preceding aspects of the disclosure, the treated subject has an NLRC4 mutation, such as an NLRC4-GOF mutation. In some cases, the subject has a germline NLRC4 mutation, such as a germline NLRC4-GOF mutation. In some cases, the subject has an inherited NLRC4 mutation, such as an inherited NLRC4-GOF mutation. In some cases, the subject exhibits somatic mosaicism for an NLRC4 mutation, such as an NLRC4-GOF mutation.

In some cases, the subject in need of an NLCR4 inflammasomopathy treatment has hyper elevated levels of IL-18, IL-1β, or hyper elevated serum levels of IL-18 and IL-1β as compared to a control population of subjects that do not exhibit an NLRC4 inflammasomopathy. In some cases, the subject in need of an NLCR4 inflammasomopathy treatment has hyper elevated serum levels IL-18 and IL-1β as compared to a control population of subjects that do not exhibit an NLRC4 inflammasomopathy. In some cases, the hyper elevated serum IL-18 level is a hyper elevated total IL-18 serum level. In some cases, the hyper elevated serum IL-18 level is a hyper elevated free IL-18 serum level. In some cases, the subject has high serum C-reactive protein (CRP) levels as compared to a control population. In some cases, the subject has high serum ferritin levels as compared to a control.

In a preferred embodiment, the subject in need of an NLCR4 inflammasomopathy treatment has hyper elevated total IL-18 serum level as compared to a control population of subjects that do not exhibit an NLRC4 inflammasomopathy. In some cases, the hyper elevated total IL-18 serum level is a level greater than 1000 μg/mL. In some cases, the hyper elevated total IL-18 serum level is a level greater than 5000 μg/mL. In some cases, the hyper elevated total IL-18 serum level is a level greater than 10,000 μg/mL. In some cases, the hyper elevated total IL-18 serum level is a level of between about 1000 μg/mL and about 20000 μg/mL. In some cases, the hyper elevated total IL-18 serum level is a level of between about 5000 μg/mL and about 20000 μg/mL. In some cases, the hyper elevated total IL-18 serum level is a level of between about 10000 μg/mL and about 20000 pg/mL. In some cases, the hyper elevated total IL-18 serum level is a level of between about 1000 μg/mL and about 25000 μg/mL. In some cases, the hyper elevated total IL-18 serum level is a level of between about 5000 μg/mL and about 25000 μg/mL. In some cases, the hyper elevated total IL-18 serum level is a level of between about 10000 μg/mL and about 25000 μg/mL.

In some cases, the subject in need of an NLCR4 inflammasomopathy treatment has hyper elevated free IL-18 serum level as compared to a control population of subjects that do not exhibit an NLRC4 inflammasomopathy. In some cases, the hyper elevated free IL-18 serum level is a level greater than 5000 μg/mL.

In some cases, the hyper elevated serum IL-1 level is a level greater than 5 μg/mL. In some cases, the hyper elevated serum IL-1β level is a level greater than 10 μg/mL. In some cases, the hyper elevated serum IL-1β level is a level of between about 5 μg/mL and about 25 μg/mL. In some cases, the hyper elevated serum IL-1β level is a level of between about 10 μg/mL and about 25 μg/mL.

In some cases, the subject in need of an NLCR4 inflammasomopathy treatment is under the age of 17 and weighs at least 3 kg. In some cases, the subject in need of an NLCR4 inflammasomopathy treatment is under the age of 10 and weighs at least 3 kg. In some cases, the subject in need of an NLCR4 inflammasomopathy treatment is under the age of 5 and weighs at least 3 kg. In some cases, the subject in need of an NLCR4 inflammasomopathy treatment is an infant weighing at least 3 kg, and wherein the subject has both infantile enterocolitis and hyper elevated total IL-18 serum level. In some cases, the subject in need of an NLCR4 inflammasomopathy treatment is an infant weighing at least 3 kg, and wherein the subject has both infantile enterocolitis and hyper elevated free IL-18 serum level.

In a specifically preferred embodiment of the preceding aspects of the disclosure, the treated subject has AIFEC. In a further preferred embodiment, the treated subject has AIFEC and hyper elevated total IL-18 serum level. In another embodiment, the treated subject has AIFEC and hyper elevated free IL-18 serum level.

In a specifically preferred embodiment of the preceding aspects of the disclosure, the NLRC4 gene of treated subject comprises one or more point mutations selected from the group consisting of: S171F, T177A, 1343N, T337S/N, V341A, H443P, S445P, W665C. In one embodiment, the point mutation comprised in the NLRC4 gene of treated subject is S171F. In one embodiment, the point mutation comprised in the NLRC4 gene of treated subject is T177A. In one embodiment, the point mutation comprised in the NLRC4 gene of treated subject is 1343N. In one embodiment, the point mutation comprised in the NLRC4 gene of treated subject is T337S/N. In one embodiment, the point mutation comprised in the NLRC4 gene of treated subject is V341A. In one embodiment, the point mutation comprised in the NLRC4 gene of treated subject is H443P. In one embodiment, the point mutation comprised in the NLRC4 gene of treated subject is S445P. In one embodiment, the point mutation comprised in the NLRC4 gene of treated subject is W665C.

In one embodiment, the subject in need of an NLCR4 inflammasomopathy treatment has a serum C-reactive protein (CRP) level higher than 20 mg/L. In another embodiment, the subject in need of an NLCR4 inflammasomopathy treatment has a serum ferritin level higher than 600 μg/L. In a further preferred embodiment, the subject in need of an NLCR4 inflammasomopathy treatment has a serum CRP level higher than 20 mg/L and a serum ferritin level higher than 600 μg/L.

In one embodiment of the preceding aspects, the treatment with the bispecific antibody targeting both IL-1β and IL-18 increases the lifespan of the patient compared to standard of care treatment. In another embodiment, treatment with the bispecific antibody targeting both IL-1β and IL-18 reduces serum CRP and/or serum ferritin levels as compared with standard of care (SoC) after 14 days of treatment. In another embodiment, treatment with the bispecific antibody targeting both IL-1β and IL-18 reduces serum CRP and/or serum ferritin levels as compared with standard of care (SoC) after 28 days of treatment.

In another embodiment treatment with the bispecific antibody targeting both IL-1β and IL-18 reduces the serum CRP level of patients after 7 days of treatment compared to standard of care. In another embodiment treatment with the bispecific antibody targeting both IL-1β and IL-18 reduces the serum CRP level of patients after 14 days of treatment compared to standard of care. In another embodiment treatment with the bispecific antibody targeting both IL-1β and IL-18 reduces the serum CRP level of patients after 28 days of treatment compared to standard of care. In another embodiment treatment with the bispecific antibody targeting both IL-1β and IL-18 reduces the serum ferritin level of patients after 7 days of treatment compared to standard of care. In another embodiment treatment with the bispecific antibody targeting both IL-1β and IL-18 reduces the serum ferritin level of patients after 14 days of treatment compared to standard of care. In another embodiment treatment with the bispecific antibody targeting both IL-1β and IL-18 reduces the serum ferritin level of patients after 28 days of treatment compared to standard of care.

In one embodiment, provided herein is a method of reducing the serum C-reactive protein (CRP) level in a subject in need thereof, comprising administering to said subject a therapeutically effective amount of a bispecific antibody targeting both IL-1β and IL-18, e.g. bbmAb1. In one embodiment, provided herein is a bispecific antibody targeting both IL-1β and IL-18, e.g. bbmAb1 for use in reducing the serum C-reactive protein (CRP) level in a subject having an NLRC4 inflammasomopathy. In some embodiments, provided herein is the use of a bispecific antibody targeting both IL-1β and IL-18, e.g. bbmAb1, for the manufacture of a medicament for reducing the serum C-reactive protein (CRP) level in a subject having an NLRC4 inflammasomopathy. In some embodiments, the serum CRP level in the subject decreases by at least 1 mg/l, at least 2 mg/l, at least 3 mg/l, at least 4 mg/l or at least 5 mg/l. In some embodiments, the serum CRP level in subjects having an NLRC4 inflammasomopathy and having received the bispecific antibody targeting both IL-1β and IL-18, e.g. bbmAb1 decreases by at least 10%, at least 20%, at least 30%, at least 40%, or at least 50% from baseline compared to patients not having received the same treatment, e.g. patients having received standard of care (SOC). In some embodiments, the reduction in serum CRP levels occurs after 2 days, 3 days, 4 days, 5 days, 6 days or 7 days after administration of a bispecific antibody targeting both IL-1β and IL-18, e.g. bbmAb1. In some embodiments, the reduction in serum CRP levels occurs after 14 days, or 28 days after administration of a bispecific antibody targeting both IL-1β and IL-18, e.g. bbmAb1.

In one embodiment, provided herein is a method of reducing the serum ferritin level in a subject having an NLRC4 inflammasomopathy, comprising administering to said subject a therapeutically effective amount of a bispecific antibody targeting both IL-1β and IL-18, e.g. bbmAb1. In one embodiment, provided herein is a bispecific antibody targeting both IL-1β and IL-18, e.g. bbmAb1 for use in reducing the serum ferritin level in a subject having an NLRC4 inflammasomopathy. In some embodiments, provided herein is the use of a bispecific antibody targeting both IL-1β and IL-18, e.g. bbmAb1, for the manufacture of a medicament for reducing the serum ferritin level in a subject having an NLRC4 inflammasomopathy. In some embodiments, the serum ferritin level in the subject decreases by at least 100 ng/l, at least 200 ng/l, at least 300 ng/l, at least 400 ng/l or at least 500 ng/l. In some embodiments, the serum ferritin level in subjects having received the bispecific antibody targeting both IL-1β and IL-18, e.g. bbmAb1 decreases by at least 10%, at least 20%, at least 30%, at least 40%, or at least 50% from baseline compared to patients not having received the same treatment, e.g. patients having received standard of care (SOC). In some embodiments, the reduction in serum ferritin levels occurs after 2 days, 3 days, 4 days, 5 days, 6 days or 7 days after administration of a bispecific antibody targeting both IL-1β and IL-18, e.g. bbmAb1. In some embodiments, the reduction in serum ferritin levels occurs after 14 days or 28 days after administration of a bispecific antibody targeting both IL-1β and IL-18, e.g. bbmAb1.

In one embodiment, provided herein is a method of reducing the serum level of a biomarker selected from the group consisting of CXCL9, CXCL10 (IP-10), IL-6, and sIL2R in a subject having an NLRC4 inflammasomopathy, comprising administering to said subject a therapeutically effective amount of a bispecific antibody targeting both IL-1β and IL-18, e.g. bbmAb1. In one embodiment, provided herein is a bispecific antibody targeting both IL-1β and IL-18, e.g. bbmAb1 for use in reducing the serum level of a biomarker selected from the group consisting of CXCL9, CXCL10 (IP-10), IL-6, and sIL2R in a subject having an NLRC4 inflammasomopathy. In some embodiments, provided herein is the use of a bispecific antibody targeting both IL-1β and IL-18, e.g. bbmAb1, for the manufacture of a medicament for reducing the serum level of a biomarker selected from the group consisting of CXCL9, CXCL10 (IP-10), IL-6, and sIL2R in a subject having an NLRC4 inflammasomopathy. In some embodiments, the serum level of a biomarker selected from the group consisting of CXCL9, CXCL10 (IP-10), IL-6, and sIL2R in subjects having received the bispecific antibody targeting both IL-1β and IL-18, e.g. bbmAb1 decreases by at least 10%, at least 20%, at least 30%, at least 40%, or at least 50% from baseline compared to patients not having received the same treatment, e.g. patients having received standard of care (SOC). In some embodiments, the reduction in the serum level of a biomarker selected from the group consisting of CXCL9, CXCL10 (IP-10), IL-6, and sIL2R occurs after 2 days, 3 days, 4 days, 5 days, 6 days or 7 days after administration of a bispecific antibody targeting both IL-1β and IL-18, e.g. bbmAb1.

In an eighth aspect of the disclosure a method is provided for preventing or reducing the incidence or severity of fever in a subject having an NLRC4 inflammasomopathy, comprising administering to said subject a therapeutically effective amount of a bispecific antibody targeting both IL-1β and IL-18, e.g. bbmAb1. In one embodiment, provided herein is a bispecific antibody targeting both IL-1β and IL-18, e.g. bbmAb1 for use in preventing or reducing the incidence or severity of fever in a subject having an NLRC4 inflammasomopathy. In some embodiments, provided herein is the use of a bispecific antibody targeting both IL-1β and IL-18, e.g. bbmAb1, for the manufacture of a medicament for preventing or reducing the incidence or severity of fever in a subject having an NLRC4 inflammasomopathy.

In an ninth aspect of the disclosure a method is provided for preventing or reducing the incidence or severity of diarrhea in a subject having an NLRC4 inflammasomopathy, comprising administering to said subject a therapeutically effective amount of a bispecific antibody targeting both IL-1β and IL-18, e.g. bbmAb1. In one embodiment, provided herein is a bispecific antibody targeting both IL-1β and IL-18, e.g. bbmAb1 for use in preventing or reducing the incidence or severity of diarrhea in a subject having an NLRC4 inflammasomopathy. In some embodiments, provided herein is the use of a bispecific antibody targeting both IL-1β and IL-18, e.g. bbmAb1, for the manufacture of a medicament for preventing or reducing the incidence or severity of diarrhea in a subject having an NLRC4 inflammasomopathy.

Various embodiment of the preceding aspects may be beneficially combined with the other treatments of an NLCR4 inflammasomopathy in a subject in need thereof. Such therapies could be, for example, any known therapies for the disease, disorder, condition, or syndrome being treated. As a non-limiting set of examples, the at least one additional therapeutic agent may be selected from a list consisting of: a nonsteroidal anti-inflammatory, cyclosporin, a glucocorticoid, IL-18 binding protein (IL-18 BP), and combinations thereof.

In some cases, the treatment with a bispecific antibody described herein provides a reduction in, or elimination of, the maintenance dose of a glucocorticoid required to treat the subject. In some cases, the treatment includes administration of a bispecific antibody described herein and a discontinuation of a dose of a glucocorticoid. In some cases, the treatment includes administration of a bispecific antibody described herein and a discontinuation of a dose of cyclosporin.

In some cases, the treatment includes administration of a bispecific antibody described herein and a tapering of a dose of an additional therapeutic agent. In some cases, the treatment includes administration of a bispecific antibody described herein and a tapering of a dose of a glucocorticoid. In some embodiments, the treatment includes a reduction, taper, or discontinuation of glucocorticoid administration in a subject administered glucocorticoid and the bispecific antibody. In some cases, the treatment includes a reduction or taper to a dose of less than or equal to a dose equivalent to a 0.2 mg/kg/day dose of prednisone. In some cases, the treatment includes a reduction or taper to a dose of less than or equal to 0.2 mg/kg/day of prednisone. In some cases, the subject administered the treatment maintains at least a partial, or a complete, response to the bispecific antibody for at least two weeks after tapering to a dose equivalent to a 0.2 mg/kg/day dose of prednisone. In some embodiments, the treatment includes a reduction, taper, or discontinuation of glucocorticoid administration and a discontinuation of cyclosporin in a subject administered the bispecific antibody, glucocorticoid, and cyclosporin.

In some embodiments, the subject in need thereof has been, or is, administered cyclosporin, anti-TNFα, corticosteroids, anti-IFNγ, anti-IL-1β or an anti-IL-18 therapy, or a combination thereof. In some embodiments, the subject in need thereof has not achieved adequate control of the NLRC4-GOF inflammasomopathy by administration of cyclosporin, anti-TNFα, corticosteroids, anti-IFNγ, anti-IL-1β or an anti-IL-18 therapy, or a combination thereof. In some embodiments, NLRC4-GOF inflammasomopathy in the subject in need thereof is resistant to cyclosporin, anti-TNFα, corticosteroids, anti-IFNγ, anti-IL-1β or an anti-IL-18 therapy, or a combination thereof. In some cases, the NLRC4-GOF inflammasomopathy does not respond to cyclosporin, anti-TNFα, corticosteroids, anti-IFNγ, anti-IL-1β or an anti-IL-18 therapy, or a combination thereof. In some cases, resistance and/or inadequate control is indicated by a failure to achieve a PPGA score as described herein of less than 2. In some cases, resistance and/or inadequate control is indicated by a failure to achieve a PPGA score as described herein of less than 1. In some cases, non-response is indicated by a failure to reduce a PPGA score as described herein.

In some embodiments, the treatment reduces or prevents occurrence of disease flare in the subject in need thereof compared with standard of care (SoC) after 7 or 14 or 21 or 29 days of treatment. In some embodiments, the reduction or prevention of occurrence of disease flare in the subject is a reduction or prevention for at least about a week, two weeks, or three weeks, or for about four weeks.

In some embodiments, the treatment reduces or prevents occurrence of one or more MAS features in the subject, wherein the MAS features are selected from the group consisting of fever, rash, tachycardia, cytopenia, liver dysfunction and coagulopathy. In some cases, the treatment reduces or prevents enterocolitis in the subject. In some cases, the treatment reduces or prevents severe, refractory, neonatal diarrhea in the subject. In some cases, the treatment reverses gastrointestinal pathology in the patient.

In some embodiments, the treatment increases the time to first flare in a patient, e.g., by about (or at least about) a week, a month, two months, three months, six months, or a year. In some embodiments, the treatment further comprises inducing serological remission in the patient. Serological remission can be indicated by full suppression of serum IL-18 to undetectable levels or to levels found in a healthy individual (e.g., less than 500 μg/mL, less than 1000 μg/mL, or less than 5000 μg/mL).

In some embodiments, the patient has an NLRC4-GOF mutation in the nucleotide binding domain or the winged helix domain of the NLRC4 gene. In some embodiments, the patient has an NLRC4-GOF mutation at amino acid 443 or 445 of the NLRC4 gene. In some embodiments, the patient has an NLRC4-GOF mutation selected from the group consisting of H443P and S445P of the NLRC4 gene.

In some embodiments, the patient is neonatal. In some embodiments, the patient is pediatric (<18 yrs old). In some embodiments, the patient is less than 1 year old. In some embodiments, the patient is between 1 week and 1 year old. In some embodiments, the patient is between one month and 1 year old. In some embodiments, the patient is at least one week old. In some embodiments, the patient is at least one month old.

BRIEF DESCRIPTION OF THE FIGURES

FIG. 5 depicts an embodiment of a physician global assessment of disease (PGA) form.

FIG. 6 depicts an embodiment of a physician severity assessment of NLRC4-GOF disease signs and symptoms form.

FIG. 7 depicts a patient/parent global assessment of NLRC4-GOF Disease Activity (PPGA).

DETAILED DESCRIPTION OF THE DISCLOSURE

Figure 1:
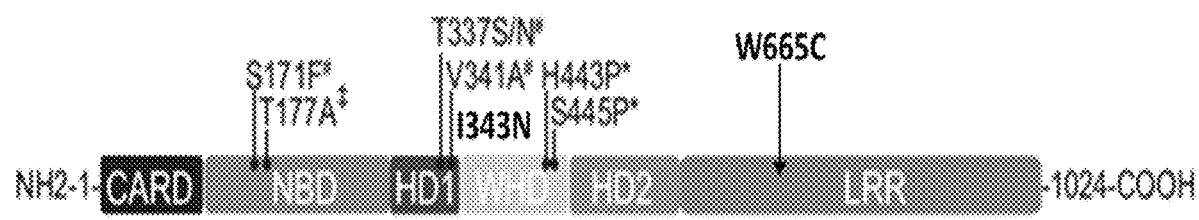
FIG. 1 is a schematic overview of the functional domains of the NLRC4 protein. The H443P and S445P mutations in the Winged Helix Domain (WHD) are associated clinically with a predominant skin phenotype. The T177A variant that is due to somatic mutation presents with a clinical phenotype similar to NOMID. NLRC4-GOF mutations that occur in the Nucleotide-Binding Domain (NBD) and the adjacent helical domain 1 (HD1) can present in early life with a prominent life-threatening gastrointestinal phenotype (modified from (Romberg et al 2017)).
Figure 2A:
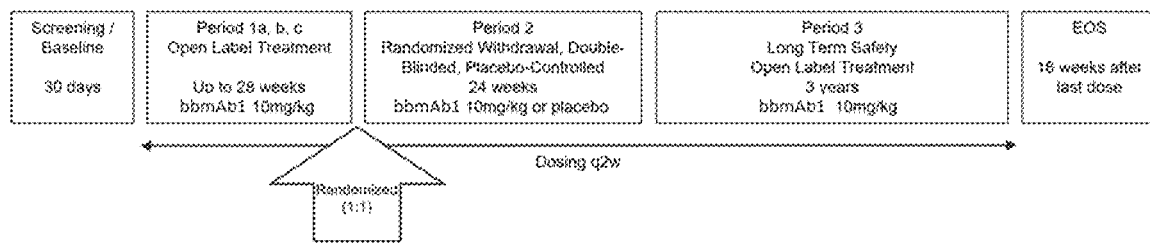
FIG. 2 is a schematic depiction of a treatment protocol for a clinical study for treatment of an NLCR4-GOF inflammasomopathy with a bispecific antibody targeting both IL-1β and IL-18, e.g., bbmAb1. A: Overall study design. B: study design period 1. C: study design period 2. D. study design period 3.
Figure 2B:
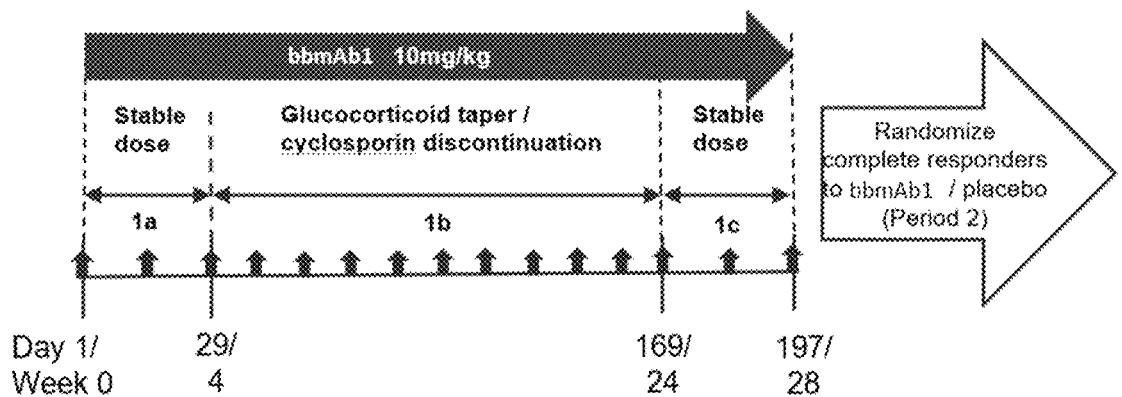
Figure 2C:
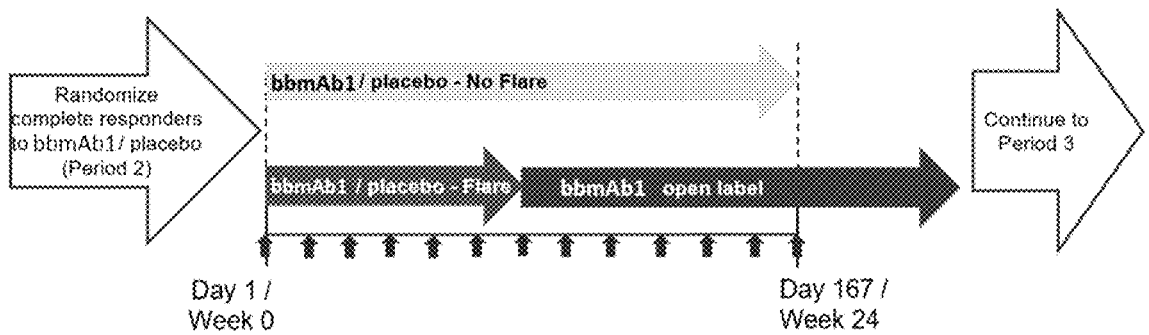
Figure 2D:
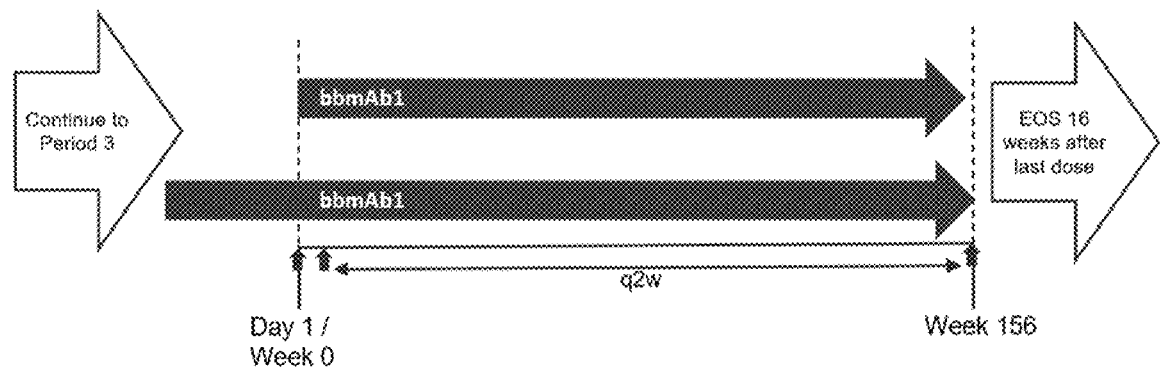

NLRC4 germline de novo and inherited mutations (p.S171F, p.T337S, p.T337N, PT337N, pV341A) have been described—In 2014, two independent clinical research teams in the United States genotyped and clinically phenotyped patients with NLRC4-GOF mutations in two unrelated families. Although the clinically presentations were near identical (MAS and infantile enterocolitis) with functional mutations found in the same HD1 domain and evidence on cytokine profiling of hyper elevation of both IL-1β and IL-18, the disease was called NLRC4 GOF by one group and a syndrome of enterocolitis and autoinflammation associated with mutation of NLRC4 (SCAN4) by the other group, that was later designated as AIFEC (OMIM, #616050, *606831). As used herein, the umbrella term NLRC4-GOF inflammasomopathy will be used as it best reflects the underlying etiology of the disease.

NLRC4-GOF inflammasomopathy is characterized by very early onset enterocolitis, ephemeral maculopapular and urticarial rashes, MAS and most commonly premature death in childhood. Affected individuals can have grossly elevated IL-1β and IL-18 levels, with the effector cytokines driving the MAS features (fever, rash, tachycardia, cytopenia, liver dysfunction and coagulopathy) and the rapid early development of enterocolitis that is characterized by severe, refractory, neonatal diarrhea that distinguishes NLRC4-GOF from other NLRC4 clinical phenotypes. In the skin, maculopapular and urticarial rashes are associated with lymphohistiocytic infiltrates on skin biopsy, a relatively unusual finding that clinically may provide rapid diagnostic information. NLRC4-GOF cases can now be rapidly diagnosed by a combination of clinical features, inflammatory markers like elevated serum IL-18 concentration, ferritin and C-Reactive Protein (CRP), and diagnostic gene sequencing (Romberg et al 2017).

In subjects, e.g., infants, it is hypothesized that early treatment of the MAS-like features and enterocolitis can prevent progression of the disease to irreversible end organ damage that commonly results in a fatal outcome (Romberg et al 2014, Moghaddas et al 2018). In the critically ill pediatric population, the disease has been found to be resistant to cyclosporin, anti-TNFα treatments, systemic glucocorticoids and anti-IL-1β therapies in combination or alone. Since 2014, around 40 patients worldwide have been reported in the literature with NLRC4 inflammasomopathies and confirmed mutations in the NLRC4 gene. Of these, eight patients have the NLRC4-GOF inflammasomopathy clinical phenotype, with very early onset infantile enterocolitis with severe diarrhea, ephemeral maculopapular and urticarial rashes, fever, cytopenias, liver dysfunction and coagulopathy. The majority of cases (6 out of 8) have presented under the age of 2 years (from first week of life to 18 months of age). There is significant mortality associated with the development of NLRC4 GOF inflammasomopathy, with 3/5 cases being fatal within weeks of diagnosis or morbidity with poor growth and development (based on available data) (Canna et al 2014, Romberg et al 2014, Baracaglia et al 2015, Liang et al 2017, Barsalou et al 2018, Moghaddas et al 2018, Chear et al 2020). A single case has been reported to have survived into adulthood, namely the father of a NLRC4 GOF proband. The proband was reported as deceased at 23 days after birth. The patient had short stature and anemia and life-long history of periodic fevers. During infancy, he had an extended hospitalization for fever, vomiting, non-bloody diarrhea and failure to thrive though no specific diagnosis was made then (Romberg et al 2014). Currently, apart from supportive medical care and immunosuppression that is of limited benefit in this population, there are no approved therapeutics that directly and specifically target the underlying IL-1β and IL-18 driven autoinflammatory process to improve the overall clinical outcome for NLRC4-GOF inflammasomopathy pediatric patients.

Herein are described methods of treating or preventing an NLRC4-GOF inflammasomopathy by administering to a subject in need thereof an effective amount of a bispecific antibody targeting both IL-1β and IL-18 simultaneously (e.g., bbmAb1) or functional fragments thereof. Accordingly, in one aspect provided is a method of preventing or treating AIFEC comprising administering to a subject in need thereof an effective amount of a bispecific antibodies targeting both IL-1β and IL-18 simultaneously (e.g., bbmAb1).

The disclosure relates to bispecific monoclonal antibodies (bbmAb) or variants thereof, e.g. bispecific antibodies targeting both IL-1β and IL-18 simultaneously (e.g., bbmAb1) for the use in treatment of NLRC4-GOF inflammasomopathy patients having hyper elevated IL-1β and/or IL-18. The disclosure also relates to methods, treatment regimens, uses, kits and therapies for treating NLRC4-GOF inflammasomopathy by employing bispecific antibodies targeting both IL-1β and IL-18 simultaneously.

Data suggests, such as data described herein, that combined simultaneous IL-1β and IL-18 neutralization could more potently attenuate IFN-γ (and other pro-inflammatory cytokines) production compared to individual neutralization of IL-1β or IL-18 by either anti-IL-1 or anti-IL-18 mAbs. Thus, the present disclosure is inter alia based on the unexpected finding that certain antibodies that simultaneously neutralize IL-1β and IL-18 more potently attenuate IFN-γ (and other pro-inflammatory cytokines) production compared to single IL-1β or IL-18 neutralization alone, which is considered by the inventors to be an efficacious treatment of (i) NLRC4 inflammasomopathy or (ii) AIFEC, in particular patients having an NLRC4-GOF mutation.

Moreover, the present inventors hypothesize that treatment with an antibody that simultaneously neutralizes IL-1β and IL-18 (e.g., bbmAb1), can allow for a significantly reduced dose frequency in NLRC4-GOF inflammasomopathy patients, with administration every 2 weeks and treatment with a single agent compared to the more complex investigational combination requiring anti-IL-1β (every two weeks for canakinumab or every day for anakinra) potentially with glucocorticoids, cyclosporin and IL-18BP (every two days).

1. Definitions

For purposes of interpreting this specification, the following definitions will apply and whenever appropriate, terms used in the singular will also include the plural and vice versa. Additional definitions are set forth throughout the detailed description. All references, publications, patents, and database accession codes, including GenBank and OMIM and the contents therein, are herein incorporated by reference in the entirety and for all purposes.

The term "flare" in the context of a treatment of an NLRC4 inflammasomopathy (e.g., NLRC4-GOF inflammasomopathy), refers to:
 an increase in disease activity from absent or minimal to greater than minimal in a physician global assessment of disease activity as described herein;
 a 60% increase from normalized levels in treated patients of serum ferritin and/or C-reactive protein (CRP), wherein normalized levels indicate minimal or absent NLRC4 inflammasome disease activity (e.g., CRP<20 mg/L; ferritin <600 ng/L); or
 an increase in serum ferritin levels of >2500 ng/ml and/or elevation of CRP of >20 mg/mL.

The term "IL-18" is synonym to IL-18 polypeptide, Interleukin-18 polypeptide, IFN-gamma inducing factor or Interferon-gamma-inducing-factor or INF-γ inducing factor. The term "IL-18" refers to human IL-18, unless another species is indicated. IL-18 is well known to a person skilled in the art, and for example obtainable from MBL® International Corporation under product reference #B001-5. Throughout this specification, the term IL-18 encompasses both pro-IL-18 (precursor of mature IL-18 prior protease cleavage) and mature IL-18 (post protease cleavage) interchangeably unless it is specified that the pro- or mature form is meant.

The term "IL-1β" or "IL-1b" is synonym to IL-1β polypeptide and Interleukin-1B polypeptide. The term "IL-1β" refers to human IL-1β unless another species is indicated. IL-1β is well known to a person skilled in the art, and for example obtainable from Sino Biological under product reference #10139-HNAE-5.

The term "antibody" refers to an intact immunoglobulin or a functional fragment thereof. Naturally occurring antibodies typically comprise a tetramer which is usually composed of at least two heavy (H) chains and at least two light (L) chains. Each heavy chain is comprised of a heavy chain variable region (abbreviated herein as VH) and a heavy chain constant region, usually comprised of three domains (CH1, CH2 ad CH3). Heavy chains can be of any isotype, including IgG (IgG1, IgG2, IgG3 and IgG4 subtypes), IgA (IgA1 and IgA2 subtypes), IgM and IgE. Each light chain is comprised of a light chain variable region (abbreviated herein as VL) and a light chain constant region (CL). Light chain includes kappa (κ) chains and lambda (λ) chains. The heavy and light chain variable region is typically responsible for antigen recognition, whilst the heavy and light chain constant region may mediate the binding of the immunoglobulin to host tissues or factors, including various cells of the immune system (e.g. effector cells) and the first component (C1q) of the classical complement system. The VH and VL regions can be further subdivided into regions of hypervariability, termed complementarity determining regions (CDR), interspersed with regions that are more conserved, termed framework regions (FR). Each VH and VL is composed of three CDRs and four FRs arranged from amino-terminus to carboxy-terminus in the following order: FR1, CDR1, FR2, CDR2, FR3, CDR3, FR4. The variable regions of the heavy and light chains contain a binding domain that interacts with an antigen.

The term "antigen-binding portion" of an antibody (or simply "antigen portion"), as used herein, refers to full length or one or more fragments of an antibody that retain the ability to specifically bind to IL-18 or IL-1β antigen. It has been shown that the antigen-binding function of an antibody can be performed by fragments of a full-length antibody. Examples of binding fragments encompassed within the term "antigen-binding portion" of an antibody include a Fab fragment, a monovalent fragment consisting of the VL, VH, CL and CH1 domains; a F(ab)2 fragment, a fragment comprising two monovalent Fab fragments linked by a disulfide bridge at the hinge region; a Fd fragment consisting of the VH and CH1 domains; a Fv fragment consisting of the VL and VH domains of a single arm of an antibody; a dAb fragment (Ward et al., (1989) Nature; 341:544-546), which consists of a VH domain; and an isolated complementarity determining region (CDR).

Furthermore, although the two domains of the Fv fragment, VL and VH, are coded for by separate genes, they can be joined, using recombinant methods, by a flexible linker that enables them to be made as a single protein chain in which the VL and VH regions pair to form monovalent molecules (known as single chain Fv (scFv); see e.g. Bird et al., (1988) Science 242:423-426; and Huston et al., (1988) Proc Natl Acad Sc; 85:5879-5883). Such single chain antibodies are also intended to be encompassed within the term "antigen-binding portion" of an antibody. These antibody fragments are obtained using conventional techniques known to those of skill in the art, and the fragments are screened for utility in the same manner as are intact antibodies.

The term "isolated" means throughout this specification, that the immunoglobulin, antibody or polynucleotide, as the case may be, exists in a physical milieu distinct from that in which it may occur in nature.

Throughout this specification, complementarity determining regions ("CDR") are defined according to the Kabat definition unless specified that the CDR are defined according to another definition. The precise amino acid sequence boundaries of a given CDR can be determined using any of a number of well-known schemes, including those described by Kabat et al. (1991), "Sequences of Proteins of Immunological Interest," 5th Ed. Public Health Service, National Institutes of Health, Bethesda, MD ("Kabat" numbering scheme), Al-Lazikani et al., (1997) JMB 273, 927-948 ("Chothia" numbering scheme) and ImMunoGenTics (IMGT) numbering (Lefranc, M.-P., The Immunologist, 7, 132-136 (1999); Lefranc, M.-P. et al., Dev. Comp. Immunol., 27, 55-77 (2003) ("IMGT" numbering scheme). For example, for classic formats, under Kabat, the CDR amino acid residues in the heavy chain variable domain (VH) are numbered 31-35 (HCDR1), 50-65 (HCDR2), and 95-102 (HCDR3); and the CDR amino acid residues in the light chain variable domain (VL) are numbered 24-34 (LCDR1), 50-56 (LCDR2), and 89-97 (LCDR3). Under Chothia the CDR amino acids in the VH are numbered 26-32 (HCDR1), 52-56 (HCDR2), and 95-102 (HCDR3); and the amino acid residues in VL are numbered 26-32 (LCDR1), 50-52 (LCDR2), and 91-96 (LCDR3). By combining the CDR definitions of both Kabat and Chothia, the CDRs consist of amino acid residues 26-35 (HCDR1), 50-65 (HCDR2), and 95-102 (HCDR3) in human VH and amino acid residues 24-34 (LCDR1), 50-56 (LCDR2), and 89-97 (LCDR3) in human VL. Under IMGT the CDR amino acid residues in the VH are numbered approximately 26-35 (CDR1), 51-57 (CDR2) and 93-102 (CDR3), and the CDR amino acid residues in the VL are numbered approximately 27-32 (CDR1), 50-52 (CDR2), and 89-97 (CDR3) (numbering according to "Kabat"). Under IMGT, the CDR regions of an antibody can be determined using the program IMGT/DomainGap Align.

By convention, the CDR regions in the heavy chain are typically referred to as H-CDR1, H-CDR2 and H-CDR3 and in the light chain as L-CDR1, LCDR2 and L-CDR3. They are numbered sequentially in the direction from the amino terminus to the carboxy terminus.

The terms "monoclonal antibody" or "monoclonal antibody composition" as used herein refer to a preparation of antibody molecules of single molecular composition. A monoclonal antibody composition displays a single binding specificity and affinity for a particular epitope.

The term "human antibody", as used herein, is intended to include antibodies having variable regions in which both the framework and CDR regions are derived from sequences of human origin. Furthermore, if the antibody contains a constant region, the constant region also is derived from such human sequences, e.g. human germline sequences, or mutated versions of human germline sequences or antibody containing consensus framework sequences derived from human framework sequences analysis, for example, as described in Knappik, et al., (2000) J Mol Biol; 296:57-86).

The human antibodies of the invention may include amino acid residues not encoded by human sequences (e.g. mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences.

The term "human monoclonal antibody" refers to antibodies displaying a single binding specificity which have variable regions in which both the framework and CDR regions are derived from human sequences.

The term "recombinant human antibody", as used herein, includes all human antibodies that are prepared, expressed, created or isolated by recombinant means, such as antibodies isolated from an animal (e.g. a mouse) that is transgenic or transchromosomal for human immunoglobulin genes or a hybridoma prepared therefrom, antibodies isolated from a host cell transformed to express the human antibody, e.g. from a transfectoma, antibodies isolated from a recombinant, combinatorial human antibody library, and antibodies prepared, expressed, created or isolated by any other means that involve splicing of all or a portion of a human immunoglobulin gene. Such recombinant human antibodies have variable regions in which the framework and CDR regions are derived from human germline immunoglobulin sequences. In certain embodiments, however, such recombinant human antibodies can be subjected to in vitro mutagenesis (or, when an animal transgenic for human Ig sequences is used, in vivo somatic mutagenesis) and thus the amino acid sequences of the VH and VL regions of the recombinant antibodies are sequences that, while derived from and related to human germline VH and VL sequences, may not naturally exist within the human antibody germline repertoire in vivo.

The phrases "an antibody recognizing an antigen" and "an antibody specific for an antigen" are used interchangeably herein with the term "an antibody which binds specifically to an antigen".

As used herein, a binding molecule that "specifically binds to IL-18" is intended to refer to a binding molecule that binds to human IL-18 with a $K_D$ of a 100 nM or less, 10 nM or less, 1 nM or less.

As used herein, a binding molecule that "specifically binds to IL-1β" is intended to refer to a binding molecule that binds to human IL-1β with a $K_D$ of a 100 nM or less, 10 nM or less, 1 nM or less.

As used herein, the term "antagonist" is intended to refer to a binding molecule that inhibits the signalling activity in the presence of activating compound. For example, in the case of IL-18, an IL-18 antagonist would be a binding molecule inhibiting the signalling activity in the presence of IL-18 in a human cell assay such as IL-18 dependent Interferon-gamma (IFN-γ) production assay in human blood cells. Examples of an IL-18 dependent IFN-γ production assay in human blood cells are described in more details in the examples below.

The term bivalent bispecific antibody or bivalent bispecific antibodies refer to antibodies binding to two different targets, such as IL-18 and IL-1β. Typically, the bivalent bispecific antibody binds each target monovalently.

The bispecific antibodies are "hetero-dimers", which means that one part comes from first antibody, specific for a first target, and another part comes from a second antibody, specific for a second target. A "hetero-dimerization modification" is a modification to one or both parts of the antibodies forming the hetero-dimeric bispecific antibody, intended to facilitate such formation. An example of hetero-dimerization modifications of the Fc domains of two IgG1 parts of antibodies intended to form a bispecific is a "knob" with a bulky amino acid (aa) side chain (S354C, T366W) in the first heavy chain and a "hole" with small aa side chains (Y349C, T366S, L368A, Y407V) were introduced in the second heavy chain as well as an additional disulfide bridge in the CH3 region connecting both heavy chains (Merchant et al., Nat. Biotechnol., 16:677-681 (1998), page 678, table 1).

The term "$K_D$", as used herein, is intended to refer to the dissociation constant, which is obtained from the ratio of $K_d$ to $K_a$ (i.e. $K_d/K_a$) and is expressed as a molar concentration (M). $K_D$ values for antibodies can be determined using methods well established in the art. A method for determining the $K_D$ of an antibody is by using surface plasmon resonance, such as a Biacore® system.

As used herein, the term "affinity" refers to the strength of interaction between binding molecule and antigen at single antigenic sites.

As used herein, the term "high affinity" for an antibody refers to an antibody having a KD of 1 nM or less for a target antigen.

As used herein, the term "subject" includes any human subjects receiving the bispecific antibody as presently described. The term subject can additionally or alternatively include any human subject that presents symptoms of or is at risk of an NLRC4-inflammasomopathy, an NLRC4-GOF inflammasomopathy, or AIFEC, e.g., as hereinabove defined.

As used herein, the term, "optimized nucleotide sequence" means that the nucleotide sequence has been altered to encode an amino acid sequence using codons that are preferred in the production cell or organism, generally a eukaryotic cell, for example, a cell of *Pichia pastoris*, a Chinese Hamster Ovary cell (CHO) or a human cell. The optimized nucleotide sequence is engineered to retain completely the amino acid sequence originally encoded by the starting nucleotide sequence, which is also known as the "parental" sequence. The optimized sequences herein have been engineered to have codons that are preferred in CHO mammalian cells; however optimized expression of these sequences in other eukaryotic cells is also envisioned herein.

The term "identity" refers to the similarity between at least two different sequences. This identity can be expressed as a percent identity and determined by standard alignment algorithms, for example, the Basic Local Alignment Tool (BLAST) (Altshul et al., (1990) J Mol Biol; 215:403-410); the algorithm of Needleman et al., (1970) J Mol Biol; 48:444-453 or the algorithm of Meyers et al., (1988) Comput Appl Biosci; 4:11-17). A set of parameters may be the Blosum 62 scoring matrix with a gap penalty of 12, a gap extend penalty of 4, and a frameshift gap penalty of 5. The percent identity between two amino acid or nucleotide sequences can also be determined using the algorithm of E. Meyers and W. Miller, (1989) CABIOS; 4 (1): 1-17) which has been incorporated into the ALIGN program (version 2.0), using a PAM 120 weight residue table, a gap length penalty of 12 and a gap penalty of 4. The percent identity is usually calculated by comparing sequences of similar length.

The term "immune response" refers to the action of, for example, lymphocytes, antigen presenting cells, phagocytic cells, granulocytes, and soluble macromolecules produced by the above cells or the liver (including antibodies, cytokines, and complement) that results in selective damage to, destruction of, or elimination from the human body of invading pathogens, cells or tissues infected with pathogens, cancerous cells, or, in cases of autoimmunity or pathological inflammation, normal human cells or tissues.

A "signal transduction pathway" or "signaling activity" refers to a biochemical causal relationship generally initiated by a protein-protein interaction such as binding of a growth factor to a receptor, resulting in transmission of a signal from one portion of a cell to another portion of a cell. In general, the transmission involves specific phosphorylation of one or more tyrosine, serine, or threonine residues on one or more proteins in the series of reactions causing signal transduction. Penultimate processes typically include nuclear events, resulting in a change in gene expression.

The term "neutralises" and grammatical variations thereof means throughout this specification, that the biological activity of the target is reduced either totally or partially in the presence of the binding protein or antibody, as the case may be.

The term "nucleic acid" or "polynucleotide" refers to deoxyribonucleic acid (DNA) or ribonucleic acid (RNA) and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g. degenerate codon substitutions), alleles, orthologs, SNPs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., Nucleic Acid Res. 19:5081 (1991); Ohtsuka et al., J. Biol. Chem. 260:2605-2608 (1985); and Rossolini et al., Mol. Cell. Probes 8:91-98 (1994))

The nucleotide in the "polynucleotide" or "nucleic acid" may comprise modifications including base modifications such as bromouridine and inosine derivatives, ribose modification such as phosphorothioate, phosphorodithioate, phosphoroselenoate, phosphorodiselenoate, phosphoroanilothioate, phosphoraniladate and phosphoroamidate.

The term "vector" means any molecule or entity (e.g. nucleic acid, plasmid, bacteriophage or virus) that is suitable for transformation or transfection of a host cell and contains nucleic acid sequences that direct and/or control (in conjunction with the host cell) expression of one or more heterologous coding regions operatively linked thereto.

A "conservative variant" of a sequence encoding a binding molecule, an antibody or a fragment thereof refers to a sequence comprising conservative amino acid modifications. "Conservative amino acid modifications" are intended to refer to amino acid modifications that do not significantly affect or alter the binding characteristics of the antibody containing the amino acid sequence. Such conservative modifications include amino acid substitutions, additions and deletions. Conservative amino acid substitutions are ones in which the amino acid residue is replaced with an amino acid residue having a similar side chain. Families of amino acid residues having similar side chains have been defined in the art. These families include amino acids with basic side chains (e.g. lysine, arginine, histidine), acidic side chains (e.g. aspartic acid, glutamic acid), uncharged polar side chains (e.g. glycine, asparagine, glutamine, serine, threonine, tyrosine, cysteine, tryptophan), nonpolar side chains (e.g. alanine, valine, leucine, isoleucine, proline, phenylalanine, methionine), beta-branched side chains (e.g. threonine, valine, isoleucine) and aromatic side chains (e.g. tyrosine, phenylalanine, tryptophan, histidine). Modifications can be introduced into a binding protein of the invention by standard techniques known in the art, such as site-directed mutagenesis and PCR-mediated mutagenesis. Conservative amino acid substitution can also encompass non-naturally occurring amino acid residues which are typically incorporated by chemical peptide synthesis rather than by synthesis in biological systems. Non-naturally occurring amino acids include, but are not limited to, peptidomimetic, reversed or inverted forms of amino acid moieties.

The term "epitope" is the part of an antigen that is recognized by the immune system, such as an antibody or a fragment thereof. Within the present specification, the term "epitope" is used interchangeably for both conformational epitopes and linear epitopes. A conformational epitope is composed of discontinuous sections of the antigen's amino acid sequence, whilst a linear epitope is formed by a continuous sequence of amino acids from the antigen.

The term "treat", "treating", "treatment", "prevent", "preventing" or "prevention" includes therapeutic treatments, prophylactic treatments and applications in which one reduces the risk that a subject will develop a disorder or other risk factor. Treatment does not require the complete curing of a disorder and encompasses the reduction of the symptoms or underlying risk factors.

The term "treating or preventing" includes the administration of a compound, e.g., the a bispecific antibody targeting both IL-1β and IL-18, e.g., bbmAb1 optionally in combination with at least one further therapeutic agent, to prevent or delay the onset of the symptoms, complications, or biochemical indicia of a disease, condition, disorder, or syndrome (e.g., NLRC4 inflammasomopathy, NLRC4-GOF inflammasomopathy, AIFEC), alleviating the symptoms or arresting or inhibiting further development of the disease, condition, disorder, or syndrome. Treatment may be prophylactic (to prevent or delay the onset of the disease, condition, disorder, or syndrome, or to prevent the manifestation of clinical or subclinical symptoms thereof) or therapeutic suppression or alleviation of symptoms after the manifestation of the disease, condition, disorder, or syndrome.

As used herein, the term "prevent", "preventing", or "prevention" in connection to a disease, condition, disorder, or syndrome refers to the prophylactic treatment of a subject who is at risk of developing a condition (e.g., a specific disease, condition, disorder, or syndrome or clinical symptom thereof such as NLRC4-GOF inflammasomopathy or AIFEC) resulting in a decrease in the probability that the subject will develop the condition.

The terms "treat", "treating", and "treatment" refer to both therapeutic treatment and prophylactic or preventive measures, wherein the object is to ameliorate the disease, condition, disorder, or syndrome (i.e., slowing or arresting or reducing the development of the disease or at least one of the clinical symptoms thereof) by alleviating or ameliorating at least one physical parameter including those which may not be discernible by the patient. The terms "treat", "treating", or "treatment" also refer to modulating the disease or disorder, either physically, (e.g., stabilization of a discernible symptom), physiologically, (e.g., stabilization of a physical parameter), or both and/or to preventing or delaying the onset or development or progression of the disease or disorder.

For example, "treating NLRC4-GOF inflammasomopathy" or "treating or AIFEC" may refer to ameliorating, alleviating or modulating at least one of the symptoms or pathological features associated with NLRC4-GOF inflammasomopathy or AIFEC; e.g., an elevated serum inflammatory marker (such as one or more of serum CRP, serum ferritin, serum IL-18, serum total IL-18, serum free IL-18, serum IL-13, serum total IL-1β, serum free IL-1β), fever, diarrhea, rash, tachycardia, cytopenia, liver dysfunction and/or coagulopathy; e.g., may refer to slowing progression, reducing or stopping at least one of the symptoms or pathological features associated with NLRC4-GOF inflammasomopathy or AIFEC; e.g., an elevated serum inflammatory marker (such as one or more of serum CRP, serum ferritin, serum IL-18), fever, diarrhea, rash, tachycardia, cytopenia, liver dysfunction and/or coagulopathy. It may also refer to preventing or delaying one or more of the described symptoms, e.g., slow the progress of, halt, or reverse disease, condition, disorder, or syndrome progression and improve clinical outcomes (e.g., prevent fatal progression of AIFEC, and improve survival).

Total IL-18 in serum can be measured by conjugating anti-human IL-18 antibody (e.g., clone 125-2H, MBL International) to Bio-plex Magnetic COOH beads (Bio-Rad, Inc.), detected using biotinylated anti-human IL-18 (clone 159-12B, MBL), and concentrations calculated using the IL-18 contained in the Group II cytokine standard curve (Bio-Rad, Inc.). Free IL-18 can be measured as described in Girard et al. Rheumatology (Oxford). 2016 December; 55 (12): 2237-2247.

Serum IL-1β can be measured using a commercially available ELISA kit (88-7261-88, eBioscience) used in accordance with manufacturers instructions.

In some embodiments, the reduction in one or more elevated serum inflammatory marker by administration of a bispecific antibody or functional fragments thereof targeting both IL-1β and IL-18 simultaneously can be a reduction of at least 10% from baseline compared to patients not having received the same treatment, e.g. patients having received standard of care (SOC). In some embodiments, the reduction in one or more elevated serum inflammatory marker by administration of a bispecific antibody or functional fragments thereof targeting both IL-1β and IL-18 simultaneously can be a reduction of at least 20% from baseline compared to patients not having received the same treatment, e.g. patients having received standard of care (SOC). In some embodiments, the reduction in one or more elevated serum inflammatory marker by administration of a bispecific antibody or functional fragments thereof targeting both IL-1β and IL-18 simultaneously can be a reduction of at least 30% from baseline compared to patients not having received the same treatment, e.g. patients having received standard of care (SOC). In some embodiments, the reduction in one or more elevated serum inflammatory marker by administration of a bispecific antibody or functional fragments thereof targeting both IL-1β and IL-18 simultaneously can be a reduction of at least 40% from baseline compared to patients not having received the same treatment, e.g. patients having received standard of care (SOC). In some embodiments, the reduction in one or more elevated serum inflammatory marker by administration of a bispecific antibody or functional fragments thereof targeting both IL-1β and IL-18 simultaneously can be a reduction of at least 50% from baseline compared to patients not having received the same treatment, e.g. patients having received standard of care (SOC).

As one example, the NLRC4-GOF inflammasomopathy suitable for treatment with the compositions and methods described herein include those caused by or associated with mutations in the nucleotide binding domain or the adjacent helical domain 1 of NLCRC4. In some embodiments, the suitable subject or subject in need thereof has a mutation in NLRC4 selected from the group consisting of an S171F, T177A, T337S, T337N, and a V341A mutation. In some embodiments, the suitable subject or subject in need thereof has a mutation in NLRC4 selected from the group consisting of an H443P and a S445P mutation.

Also "treating" may refer to slow the progress of, halt, or reverse disease, condition, disorder, or syndrome progression and improve clinical outcomes, e.g, moving from a higher number to a lower number on a 5-category ordinal scale as follows:

| Scale Number | Clinical status of NLRC4-GOF inflammasomopathy-related symptoms |
|---|---|
| 0 | absent |
| 1 | minimal |
| 2 | mild |
| 3 | moderate |
| 4 | severe |

As used herein, the term "therapeutically effective amount" of the compound described herein refers to an amount of the compound that will elicit the biological or medical response of a subject, for example, ameliorate symptoms, alleviate conditions, slow or delay disease progression, or prevent a disease, condition, disorder, or syndrome, etc. In one non-limiting embodiment, the term "a therapeutically effective amount" refers to the amount of the compound described herein that, when administered to a subject, is effective to at least partially alleviating, inhibiting, preventing and/or ameliorating NLRC4-GOF inflammasomopathy. In one non-limiting embodiment, the term "a therapeutically effective amount" refers to the amount of the compound described herein that, when administered to a subject, is effective to at least partially alleviating, inhibiting, preventing and/or ameliorating NLRC4 inflammasomopathy presenting with elevated levels of IL-18 and IL-1β. In one non-limiting embodiment, the term "a therapeutically effective amount" refers to the amount of the compound described herein that, when administered to a subject, is effective to at least partially alleviating, inhibiting, preventing and/or ameliorating AIFEC.

As used herein, a human antibody or a fragment thereof comprises heavy or light chain variable regions or full length heavy or light chains that are "the product of" or "derived from" a particular germline sequence if the variable regions or full length chains of the antibody are obtained from a system that uses human germline immunoglobulin genes. Such systems include immunizing a transgenic mouse carrying human immunoglobulin genes with the antigen of interest or screening a human immunoglobulin gene library displayed on phage with the antigen of interest. A human antibody or fragment thereof that is "the product of" or "derived from" a human germline immunoglobulin sequence can be identified as such by comparing the amino acid sequence of the human antibody to the amino acid sequences of human germline immunoglobulins and selecting the human germline immunoglobulin sequence that is closest in sequence (i.e., greatest % identity) to the sequence of the human antibody. A human antibody that is "the product of" or "derived from" a particular human germline immunoglobulin sequence may contain amino acid differences as compared to the germline sequence, due to, for example, naturally occurring somatic mutations or intentional introduction of site-directed mutation. However, a selected human antibody typically is at least 90% identical in amino acids sequence to an amino acid sequence encoded by a human germline immunoglobulin gene and contains amino acid residues that identify the human antibody as being human when compared to the germline immunoglobulin amino acid sequences of other species (e.g. murine germline sequences). In certain cases, a human antibody may be at least 60%, 70%, 80%, 90%, or at least 95%, or even at least 96%, 97%, 98%, or 99% identical in amino acid sequence to the amino acid sequence encoded by the germline immunoglobulin gene. Typically, a human antibody derived from a particular human germline sequence will display no more than 10 amino acid differences from the amino acid sequence encoded by the human germline immunoglobulin gene. In certain cases, the human antibody may display no more than 5, or even no more than 4, 3, 2, or 1 amino acid difference from the amino acid sequence encoded by the germline immunoglobulin gene.

Human antibodies may be produced by a number of methods known to those of skill in the art. Human antibodies can be made by the hybridoma method using human myeloma or mouse-human heteromyeloma cells lines (Kozbor, J Immunol; (1984) 133:3001; Brodeur, Monoclonal Isolated Antibody Production Techniques and Applications, pp 51-63, Marcel Dekker Inc, 1987). Alternative methods include the use of phage libraries or transgenic mice both of which utilize human variable region repertoires (Winter G; (1994) Annu Rev Immunol 12:433-455, Green L L, (1999) J Immunol Methods 231:11-23).

Several strains of transgenic mice are now available wherein their mouse immunoglobulin loci has been replaced with human immunoglobulin gene segments (Tomizuka K, (2000) Proc Natl Acad Sci, 97:722-727; Fishwild D M (1996) Nature Biotechnol 14:845-851; Mendez M J, (1997) Nature Genetics 15:146-156). Upon antigen challenge such mice are capable of producing a repertoire of human antibodies from which antibodies of interest can be selected. Of particular note is the Trimera™ system (Eren R et al, (1988) Immunology 93:154-161) where human lymphocytes are transplanted into irradiated mice, the Selected Lymphocyte Isolated antibody System (SLAM, Babcook et al, Proc Natl Acad Sci (1996) 93:7843-7848) where human (or other species) lymphocytes are effectively put through a massive pooled in vitro isolated antibody generation procedure followed by deconvoluted, limiting dilution and selection procedure and the Xenomouse™ (Abgenix Inc). An alternative approach is available from Morphotek Inc using the Morphodoma™ technology.

Phage display technology can be used to produce human antibodies and fragments thereof, (McCafferty; (1990) Nature, 348:552-553 and Griffiths A D et al (1994) EMBO 13:3245-3260). According to this technique, isolated antibody variable domain genes are cloned in frame into either a major or minor coat of protein gene of a filamentous bacteriophage such as M13 or fd and displayed (usually with the aid of a helper phage) as function isolated antibody fragments on the surface of the phage particle. Selections based on the function properties of the isolated antibody result in selection of the gene encoding the isolated antibody exhibiting these properties. The phage display technique can be used to select antigen specific antibodies from libraries made from human B cells taken from individuals afflicted with a disease or disorder or alternatively from unimmunized human donors (Marks; J Mol Bio (1991) 222:581-591). Where an intact human isolated antibody is desired comprising an Fc domain it is necessary reclone the phage displayed derived fragment into a mammalian expression vectors comprising the desired constant regions and establishing stable expressing cell lines.

The technique of affinity maturation (Marks; Biotechnol (1992) 10:779-783) may be used to provide binding affinity wherein the affinity of the primary human isolated antibody is improved by sequentially replacing the H and L chain variable regions with naturally occurring variants and selecting on the basis of improved binding affinities. Variants of this technique such as 'epitope imprinting' are now also available (WO 93/06213; Waterhouse; Nucl Acids Res (1993) 21:2265-2266).

The term "pure" when used in the context of purified bispecific antibody relates to purity and identity of different bispecific antibody combinations and constructs after co-expression in selected cells under conditions wherein the cells express the bispecific antibody and after protein-A purification using an intact UPLC-MS mass screening approach. Pure or purity refers to the relative quantify of the formed hetero- and homodimer bbmAbs. Using the method of the invention correctly formed heterodimeric bbmAb1 and bbmAb2 could be observed with a relative purity of over 85% based on intact mass signal intensity.

2. IL-18 Antibody

Particularly preferred IL-18 antibodies or antigen-binding fragments thereof used in the disclosed methods are human antibodies.

For ease of reference, the amino acid sequences of the hypervariable regions of a specific IL-18 antibody, called mAb1, based on the Kabat definition and the Chothia definition, as well as the $V_L$ and $V_H$ domains and full heavy and light chains are provided in Table 1, below.

TABLE 1

Amino acid sequences of the hypervariable regions (CDRs), variable domains (VH and VL) and full chains of mAb1. The DNA encoding the VL of mAb1 is set forth in SEQ ID NO: 18. The DNA encoding the VH of mAb1 is set forth in SEQ ID NO: 8.

| mAb1 heavy chain | | |
|---|---|---|
| CDR1 | Kabat | SEQ ID NO: 1 |
| | Chothia | SEQ ID NO: 4 |
| CDR2 | Kabat | SEQ ID NO: 2 |
| | Chothia | SEQ ID NO: 5 |

TABLE 1-continued

Amino acid sequences of the hypervariable regions (CDRs), variable domains (VH and VL) and full chains of mAb1. The DNA encoding the VL of mAb1 is set forth in SEQ ID NO: 18. The DNA encoding the VH of mAb1 is set forth in SEQ ID NO: 8.

| CDR3 | Kabat | SEQ ID NO: 3 |
|---|---|---|
| | Chothia | SEQ ID NO: 6 |
| VH | | SEQ ID NO: 7 |
| Heavy Chain | | SEQ ID NO: 9 |
| mAb1 light chain | | |
| CDR1 | Kabat | SEQ ID NO: 11 |
| | Chothia | SEQ ID NO: 14 |
| CDR2 | Kabat | SEQ ID NO: 12 |
| | Chothia | SEQ ID NO: 15 |
| CDR3 | Kabat | SEQ ID NO: 13 |
| | Chothia | SEQ ID NO: 16 |
| VL | | SEQ ID NO: 17 |
| Light Chain | | SEQ ID NO: 19 |

10 In one embodiment, the IL-18 antibody or antigen-binding fragment thereof comprises at least one immunoglobulin heavy chain variable domain ($V_H$) comprising hypervariable regions CDR1, CDR2 and CDR3, said CDR1 having the amino acid sequence SEQ ID NO:1, said CDR2 having the amino acid sequence SEQ ID NO:2, and said CDR3 having the amino acid sequence SEQ ID NO:3. In one embodiment, the IL-18 antibody or antigen-binding fragment thereof comprises at least one immunoglobulin heavy chain variable domain ($V_H$) comprising hypervariable regions CDR1, CDR2 and CDR3, said CDR1 having the amino acid sequence SEQ ID NO:4, said CDR2 having the amino acid sequence SEQ ID NO:5, and said CDR3 having the amino acid sequence SEQ ID NO: 6.

In one embodiment, the IL-18 antibody or antigen-binding fragment thereof comprises at least one immunoglobulin light chain variable domain ($V_L$) comprising hypervariable regions CDR1, CDR2 and CDR3, said CDR1 having the amino acid sequence SEQ ID NO:11, said CDR2 having the amino acid sequence SEQ ID NO: 12 and said CDR3 having the amino acid sequence SEQ ID NO:13. In one embodiment, the IL-18 antibody or antigen-binding fragment thereof comprises at least one immunoglobulin light chain variable domain ($V_L$) comprising hypervariable regions CDR1, CDR2 and CDR3, said CDR1 having the amino acid sequence SEQ ID NO:14, said CDR2 having the amino acid sequence SEQ ID NO:15 and said CDR3 having the amino acid sequence SEQ ID NO:16.

In one embodiment, the IL-18 antibody or antigen-binding fragment thereof comprises at least one immunoglobulin $V_H$ domain and at least one immunoglobulin $V_L$ domain, wherein: a) the immunoglobulin $V_H$ domain comprises (e.g. in sequence): i) hypervariable regions CDR1, CDR2 and CDR3, said CDR1 having the amino acid sequence SEQ ID NO:1, said CDR2 having the amino acid sequence SEQ ID NO:2, and said CDR3 having the amino acid sequence SEQ ID NO:3; or ii) hypervariable regions CDR1, CDR2 and CDR3, said CDR1 having the amino acid sequence SEQ ID NO:4, said CDR2 having the amino acid sequence SEQ ID NO:5, and said CDR3 having the amino acid sequence SEQ ID NO:6; and b) the immunoglobulin $V_L$ domain comprises (e.g. in sequence): i) hypervariable regions CDR1, CDR2 and CDR3, said CDR1 having the amino acid sequence SEQ ID NO:11, said CDR2 having the amino acid sequence SEQ ID NO: 12, and said CDR3 having the amino acid sequence SEQ ID NO: 13 or ii) hypervariable regions CDR1, CDR2 and CDR3, said CDR1 having the amino acid sequence SEQ ID NO: 14, said CDR2 having the amino acid sequence SEQ ID NO: 15, and said CDR3 having the amino acid sequence SEQ ID NO:16.

In one embodiment, the IL-18 antibody or antigen-binding fragment thereof comprises: a) an immunoglobulin heavy chain variable domain (V_H) comprising the amino acid sequence set forth as SEQ ID NO:7; b) an immunoglobulin light chain variable domain (V_L) comprising the amino acid sequence set forth as SEQ ID NO: 17; c) an immunoglobulin V_H domain comprising the amino acid sequence set forth as SEQ ID NO:7 and an immunoglobulin V_L domain comprising the amino acid sequence set forth as SEQ ID NO: 17; d) an immunoglobulin V_H domain comprising the hypervariable regions set forth as SEQ ID NO:1, SEQ ID NO:2, and SEQ ID NO:3; e) an immunoglobulin V_L domain comprising the hypervariable regions set forth as SEQ ID NO:11, SEQ ID NO: 12 and SEQ ID NO: 13; f) an immunoglobulin V_H domain comprising the hypervariable regions set forth as SEQ ID NO:4, SEQ ID NO:5 and SEQ ID NO:6; g) an immunoglobulin V_L domain comprising the hypervariable regions set forth as SEQ ID NO: 14, SEQ ID NO: 15 and SEQ ID NO: 16; h) an immunoglobulin V_H domain comprising the hypervariable regions set forth as SEQ ID NO:1, SEQ ID NO:2, and SEQ ID NO:3 and an immunoglobulin V_L domain comprising the hypervariable regions set forth as SEQ ID NO: 11, SEQ ID NO: 12 and SEQ ID NO: 13; i) an immunoglobulin V_H domain comprising the hypervariable regions set forth as SEQ ID NO:4, SEQ ID NO:5, and SEQ ID NO:6 and an immunoglobulin V_L domain comprising the hypervariable regions set forth as SEQ ID NO: 14, SEQ ID NO: 15 and SEQ ID NO: 16; j) a light chain comprising SEQ ID NO:19; k) a heavy chain comprising SEQ ID NO: 9; or l) a light chain comprising SEQ ID NO: 19 and a heavy chain comprising SEQ ID NO: 9.

In some embodiments, the IL-18 antibody or antigen-binding fragment thereof (e.g. mAb1) comprises the three CDRs of SEQ ID NO:7. In other embodiments, the IL-18 antibody or antigen-binding fragment thereof comprises the three CDRs of SEQ ID NO:17. In other embodiments, the IL-18 antibody or antigen-binding fragment thereof comprises the three CDRs of SEQ ID NO:7 and the three CDRs of SEQ ID NO:17. In some embodiments, the IL-18 antibody or antigen-binding fragment thereof comprises the three CDRs of SEQ ID NO:9. In other embodiments, IL-18 antibody or antigen-binding fragment thereof comprises the three CDRs of SEQ ID NO:19. In other embodiments, the IL-18 antibody or antigen-binding fragment thereof comprises the three CDRs of SEQ ID NO:9 and the three CDRs of SEQ ID NO:19.

In one embodiment, the IL-18 antibody or antigen-binding fragment thereof (e.g. mAb1) is selected from a human IL-18 antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:1, said CDR2 having the amino acid sequence SEQ ID NO:2, and said CDR3 having the amino acid sequence SEQ ID NO:3; and b) an immunoglobulin light chain or fragment thereof which comprises a variable domain comprising, in sequence, the hypervariable regions CDR1, CDR2, and CDR3 and the constant part or fragment thereof of a human light chain, said CDR1 having the amino acid sequence SEQ ID NO: 11, said CDR2 having the amino acid sequence SEQ ID NO:12, and said CDR3 having the amino acid sequence SEQ ID NO:13.

In one embodiment, the IL-18 antibody or antigen-binding fragment thereof (e.g. mAb1) is selected from a human IL-18 antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:4, said CDR2 having the amino acid sequence SEQ ID NO:5 and said CDR3 having the amino acid sequence SEQ ID NO:6; and b) an immunoglobulin light chain or fragment thereof which comprises a variable domain comprising, in sequence, the hypervariable regions CDR1, CDR2, and CDR3 and the constant part or fragment thereof of a human light chain, said CDR1 having the amino acid sequence SEQ ID NO: 14, said CDR2 having the amino acid sequence SEQ ID NO:15, and said CDR3 having the amino acid sequence SEQ ID NO:16.

In one embodiment, the IL-18 antibody or antigen-binding fragment thereof is selected from a single chain antibody or antigen-binding fragment thereof that comprises an antigen-binding site comprising: a) a first domain comprising, in sequence, the hypervariable regions CDR1, CDR2 and CDR3, said CDR1 having the amino acid sequence SEQ ID NO:1, said CDR2 having the amino acid sequence SEQ ID NO:2, and said CDR3 having the amino acid sequence SEQ ID NO:3; and b) a second domain comprising, in sequence, the hypervariable regions CDR1, CDR2 and CDR3, said CDR1 having the amino acid sequence SEQ ID NO:11, said CDR2 having the amino acid sequence SEQ ID NO: 12, and said CDR3 having the amino acid sequence SEQ ID NO:13; and c) a peptide linker which is bound either to the N-terminal extremity of the first domain and to the C-terminal extremity of the second domain or to the C-terminal extremity of the first domain and to the N-terminal extremity of the second domain.

In one embodiment, the IL-18 antibody or antigen-binding fragment thereof (e.g. mAb1) is selected from a single chain antibody or antigen-binding fragment thereof that comprises an antigen-binding site comprising: a) a first domain comprising, in sequence, the hypervariable regions CDR1, CDR2 and CDR3, said CDR1 having the amino acid sequence SEQ ID NO:4, said CDR2 having the amino acid sequence SEQ ID NO:5, and said CDR3 having the amino acid sequence SEQ ID NO:6; and b) a second domain comprising, in sequence, the hypervariable regions CDR1, CDR2 and CDR3, said CDR1 having the amino acid sequence SEQ ID NO:14, said CDR2 having the amino acid sequence SEQ ID NO:15, and said CDR3 having the amino acid sequence SEQ ID NO:16; and c) a peptide linker which is bound either to the N-terminal extremity of the first domain and to the C-terminal extremity of the second domain or to the C-terminal extremity of the first domain and to the N-terminal extremity of the second domain.

The V_H or V_L domain of an IL-18 antibody or antigen-binding fragment thereof used in the disclosed methods may have V_H and/or V_L domains that are substantially identical to the V_H or V_L domains set forth in SEQ ID NO:7 and 17. A human IL-18 antibody disclosed herein may comprise a heavy chain that is substantially identical to that set forth as SEQ ID NO: 9 and/or a light chain that is substantially identical to that set forth as SEQ ID NO: 19. A human IL-18 antibody disclosed herein may comprise a heavy chain that comprises SEQ ID NO: 9 and a light chain that comprises SEQ ID NO: 19. A human IL-18 antibody disclosed herein may comprise: a) one heavy chain, comprising a variable domain having an amino acid sequence substantially identical to that shown in SEQ ID NO:7 and the constant part of a human heavy chain; and b) one light chain, comprising a variable domain having an amino acid sequence substantially identical to that shown in SEQ ID NO:17 and the constant part of a human light chain.

Other preferred IL-18 antagonists (e.g. antibodies) for use in the disclosed methods, kits and regimens are those set forth in U.S. Pat. No. 9,376,489, which is incorporated by reference herein in its entirety.

3. IL-1β Antibody

Particularly preferred IL-1β antibodies or antigen-binding fragments thereof used in the disclosed methods are human antibodies.

For ease of reference, the amino acid sequences of the hypervariable regions of a specific IL-1β antibody, called mAb2, based on the Kabat definition and the Chothia definition, as well as the $V_L$ and $V_H$ domains and full heavy and light chains are provided in Table 2, below.

TABLE 2

Amino acid sequences of the hypervariable regions (CDRs), variable domains (VH and VL) and full chains of mAb2. The DNA encoding the VL of mAb2 is set forth in SEQ ID NO: 38. The DNA encoding the VH of mAb2 is set forth in SEQ ID NO: 27.

| mAb2 heavy chain | | |
|---|---|---|
| CDR1 | Kabat | SEQ ID NO: 21 |
| | Chothia | SEQ ID NO: 24 |
| CDR2 | Kabat | SEQ ID NO: 22 |
| | Chothia | SEQ ID NO: 25 |
| CDR3 | Kabat | SEQ ID NO: 23 |
| | Chothia | SEQ ID NO: 26 |
| VH | | SEQ ID NO: 27 |
| Heavy Chain | | SEQ ID NO: 29 |
| mAb2 light chain | | |
| CDR1 | Kabat | SEQ ID NO: 31 |
| | Chothia | SEQ ID NO: 34 |
| CDR2 | Kabat | SEQ ID NO: 32 |
| | Chothia | SEQ ID NO: 35 |
| CDR3 | Kabat | SEQ ID NO: 33 |
| | Chothia | SEQ ID NO: 36 |
| VL | | SEQ ID NO: 37 |
| Light Chain | | SEQ ID NO: 39 |

In one embodiment, the IL-1β antibody or antigen-binding fragment thereof comprises at least one immunoglobulin heavy chain variable domain ($V_H$) comprising hypervariable regions CDR1, CDR2 and CDR3, said CDR1 having the amino acid sequence SEQ ID NO:21, said CDR2 having the amino acid sequence SEQ ID NO:22, and said CDR3 having the amino acid sequence SEQ ID NO:23. In one embodiment, the IL-1β antibody or antigen-binding fragment thereof comprises at least one immunoglobulin heavy chain variable domain ($V_H$) comprising hypervariable regions CDR1, CDR2 and CDR3, said CDR1 having the amino acid sequence SEQ ID NO:24, said CDR2 having the amino acid sequence SEQ ID NO:25, and said CDR3 having the amino acid sequence SEQ ID NO:26.

In one embodiment, the IL-1β antibody or antigen-binding fragment thereof comprises at least one immunoglobulin light chain variable domain ($V_L$) comprising hypervariable regions CDR1, CDR2 and CDR3, said CDR1 having the amino acid sequence SEQ ID NO:31, said CDR2 having the amino acid sequence SEQ ID NO:32 and said CDR3 having the amino acid sequence SEQ ID NO:33. In one embodiment, the IL-1β antibody or antigen-binding fragment thereof comprises at least one immunoglobulin light chain variable domain ($V_L$) comprising hypervariable regions CDR1, CDR2 and CDR3, said CDR1 having the amino acid sequence SEQ ID NO:34, said CDR2 having the amino acid sequence SEQ ID NO:35 and said CDR3 having the amino acid sequence SEQ ID NO:36.

In one embodiment, the IL-1β antibody or antigen-binding fragment thereof comprises at least one immunoglobulin $V_H$ domain and at least one immunoglobulin $V_L$ domain, wherein: a) the immunoglobulin $V_H$ domain comprises (e.g. in sequence): i) hypervariable regions CDR1, CDR2 and CDR3, said CDR1 having the amino acid sequence SEQ ID NO:21, said CDR2 having the amino acid sequence SEQ ID NO:22, and said CDR3 having the amino acid sequence SEQ ID NO:23; or ii) hypervariable regions CDR1, CDR2 and CDR3, said CDR1 having the amino acid sequence SEQ ID NO: 24, said CDR2 having the amino acid sequence SEQ ID NO:25, and said CDR3 having the amino acid sequence SEQ ID NO:26; and b) the immunoglobulin $V_L$ domain comprises (e.g. in sequence): i) hypervariable regions CDR1, CDR2 and CDR3, said CDR1 having the amino acid sequence SEQ ID NO:31, said CDR2 having the amino acid sequence SEQ ID NO:32, and said CDR3 having the amino acid sequence SEQ ID NO:33 or ii) hypervariable regions CDR1, CDR2 and CDR3, said CDR1 having the amino acid sequence SEQ ID NO:34, said CDR2 having the amino acid sequence SEQ ID NO:35, and said CDR3 having the amino acid sequence SEQ ID NO:36.

In one embodiment, the IL-1β antibody or antigen-binding fragment thereof comprises: a) an immunoglobulin heavy chain variable domain ($V_H$) comprising the amino acid sequence set forth as SEQ ID NO:27; b) an immunoglobulin light chain variable domain ($V_L$) comprising the amino acid sequence set forth as SEQ ID NO:37; c) an immunoglobulin $V_H$ domain comprising the amino acid sequence set forth as SEQ ID NO: 27 and an immunoglobulin $V_L$ domain comprising the amino acid sequence set forth as SEQ ID NO:37; d) an immunoglobulin $V_H$ domain comprising the hypervariable regions set forth as SEQ ID NO:21, SEQ ID NO:22, and SEQ ID NO:23; e) an immunoglobulin $V_L$ domain comprising the hypervariable regions set forth as SEQ ID NO:31, SEQ ID NO:32 and SEQ ID NO:33; f) an immunoglobulin $V_H$ domain comprising the hypervariable regions set forth as SEQ ID NO:24, SEQ ID NO:25 and SEQ ID NO:26; g) an immunoglobulin $V_L$ domain comprising the hypervariable regions set forth as SEQ ID NO:34, SEQ ID NO:35 and SEQ ID NO:36; h) an immunoglobulin $V_H$ domain comprising the hypervariable regions set forth as SEQ ID NO:21, SEQ ID NO:22, and SEQ ID NO:23 and an immunoglobulin $V_L$ domain comprising the hypervariable regions set forth as SEQ ID NO:31, SEQ ID NO:32 and SEQ ID NO:33; i) an immunoglobulin $V_H$ domain comprising the hypervariable regions set forth as SEQ ID NO:24, SEQ ID NO:25, and SEQ ID NO:26 and an immunoglobulin $V_L$ domain comprising the hypervariable regions set forth as SEQ ID NO:34, SEQ ID NO:35 and SEQ ID NO:36; j) a light chain comprising SEQ ID NO:37; k) a heavy chain comprising SEQ ID NO:29; or l) a light chain comprising SEQ ID NO:39 and a heavy chain comprising SEQ ID NO:29.

In some embodiments, the IL-1β antibody or antigen-binding fragment thereof (e.g. mAb2) comprises the three CDRs of SEQ ID NO:37. In other embodiments, the IL-1β antibody or antigen-binding fragment thereof comprises the three CDRs of SEQ ID NO:27. In other embodiments, the IL-1β antibody or antigen-binding fragment thereof comprises the three CDRs of SEQ ID NO:37 and the three CDRs of SEQ ID NO:27. In some embodiments, the IL-1β antibody or antigen-binding fragment thereof comprises the three CDRs of SEQ ID NO:39. In other embodiments, IL-1β antibody or antigen-binding fragment thereof comprises the three CDRs of SEQ ID NO:29. In other embodiments, the IL-1β antibody or antigen-binding fragment thereof comprises the three CDRs of SEQ ID NO: 39 and the three CDRs of SEQ ID NO:29.

In one embodiment, the IL-1β antibody or antigen-binding fragment thereof (e.g. mAb2) is selected from a human IL-1β antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:21, said CDR2 having the amino acid sequence SEQ ID NO: 22, and said CDR3 having the amino acid sequence SEQ ID NO:23; and b) an immunoglobulin light chain or fragment thereof which comprises a variable domain comprising, in sequence, the hypervariable regions CDR1, CDR2, and CDR3 and the constant part or fragment thereof of a human light chain, said CDR1 having the amino acid sequence SEQ ID NO:31, said CDR2 having the amino acid sequence SEQ ID NO:32, and said CDR3 having the amino acid sequence SEQ ID NO:33.

In one embodiment, the IL-1β antibody or antigen-binding fragment thereof (e.g. mAb2) is selected from a human IL-1β antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:24, said CDR2 having the amino acid sequence SEQ ID NO:25 and said CDR3 having the amino acid sequence SEQ ID NO:26; and b) an immunoglobulin light chain or fragment thereof which comprises a variable domain comprising, in sequence, the hypervariable regions CDR1, CDR2, and CDR3 and the constant part or fragment thereof of a human light chain, said CDR1 having the amino acid sequence SEQ ID NO: 34, said CDR2 having the amino acid sequence SEQ ID NO:35, and said CDR3 having the amino acid sequence SEQ ID NO:36.

In one embodiment, the IL-1β antibody or antigen-binding fragment thereof is selected from a single chain antibody or antigen-binding fragment thereof that comprises an antigen-binding site comprising: a) a first domain comprising, in sequence, the hypervariable regions CDR1, CDR2 and CDR3, said CDR1 having the amino acid sequence SEQ ID NO:21, said CDR2 having the amino acid sequence SEQ ID NO:22, and said CDR3 having the amino acid sequence SEQ ID NO:23; and b) a second domain comprising, in sequence, the hypervariable regions CDR1, CDR2 and CDR3, said CDR1 having the amino acid sequence SEQ ID NO:31, said CDR2 having the amino acid sequence SEQ ID NO:32, and said CDR3 having the amino acid sequence SEQ ID NO:33; and c) a peptide linker which is bound either to the N-terminal extremity of the first domain and to the C-terminal extremity of the second domain or to the C-terminal extremity of the first domain and to the N-terminal extremity of the second domain.

In one embodiment, the IL-1β antibody or antigen-binding fragment thereof (e.g. mAb2) is selected from a single chain antibody or antigen-binding fragment thereof that comprises an antigen-binding site comprising: a) a first domain comprising, in sequence, the hypervariable regions CDR1, CDR2 and CDR3, said CDR1 having the amino acid sequence SEQ ID NO:24, said CDR2 having the amino acid sequence SEQ ID NO:25, and said CDR3 having the amino acid sequence SEQ ID NO:26; and b) a second domain comprising, in sequence, the hypervariable regions CDR1, CDR2 and CDR3, said CDR1 having the amino acid sequence SEQ ID NO:34, said CDR2 having the amino acid sequence SEQ ID NO:35, and said CDR3 having the amino acid sequence SEQ ID NO:36; and c) a peptide linker which is bound either to the N-terminal extremity of the first domain and to the C-terminal extremity of the second domain or to the C-terminal extremity of the first domain and to the N-terminal extremity of the second domain.

The $V_H$ or $V_L$ domain of an IL-1β antibody or antigen-binding fragment thereof used in the disclosed methods may have $V_H$ and/or $V_L$ domains that are substantially identical to the $V_H$ or $V_L$ domains set forth in SEQ ID NO:27 and 37. A human IL-1β antibody disclosed herein may comprise a heavy chain that is substantially identical to that set forth as SEQ ID NO:29 and/or a light chain that is substantially identical to that set forth as SEQ ID NO: 39. A human IL-1β antibody disclosed herein may comprise a heavy chain that comprises SEQ ID NO:29 and a light chain that comprises SEQ ID NO:39. A human IL-1β antibody disclosed herein may comprise: a) one heavy chain, comprising a variable domain having an amino acid sequence substantially identical to that shown in SEQ ID NO: 27 and the constant part of a human heavy chain; and b) one light chain, comprising a variable domain having an amino acid sequence substantially identical to that shown in SEQ ID NO:37 and the constant part of a human light chain.

Other preferred IL-1β antagonists (e.g. antibodies) for use in the disclosed methods, kits and regimens are those set forth in U.S. Pat. No. 7,446,175 or U.S. Pat. No. 7,993,878 or U.S. Pat. No. 8,273,350, which are incorporated by reference herein in their entirety.

4. Fc Modifications

In addition or alternative to modifications made within the framework or CDR regions, antibodies of the invention may be engineered to include modifications within the Fc region, typically to alter one or more functional properties of the antibody, such as serum half-life, complement fixation, Fc receptor binding, and/or antigen-dependent cellular cytotoxicity. Furthermore, an antibody of the invention may be chemically modified (e.g. one or more chemical moieties can be attached to the antibody) or be modified to alter its glycosylation, again to alter one or more functional properties of the antibody. Each of these embodiments is described in further detail below. The numbering of residues in the Fc region is that of the EU numbering scheme of Edelman et al., PNAS, 1969 May, 63 (1): 78-85.

In one embodiment, the hinge region of CH1 is modified such that the number of cysteine residues in the hinge region is altered, e.g. increased or decreased. This approach is described further in U.S. Pat. No. 5,677,425 by Bodmer et al. The number of cysteine residues in the hinge region of CH1 is altered to, for example, facilitate assembly of the light and heavy chains or to increase or decrease the stability of the antibody.

In another embodiment, the Fc hinge region of an antibody is mutated to decrease the biological half-life of the antibody. More specifically, one or more amino acid mutations are introduced into the CH2-CH3 domain interface region of the Fc-hinge fragment such that the antibody has impaired Staphylococcal protein A (SpA) binding relative to native Fc-hinge domain SpA binding. This approach is described in further detail in U.S. Pat. No. 6,165,745 by Ward et al.

In another embodiment, the antibody is modified to increase its biological half-life. Various approaches are possible. For example, one or more of the following mutations can be introduced: T252L, T254S, T256F, as described in U.S. Pat. No. 6,277,375 to Ward. Alternatively, to increase the biological half life, the antibody can be altered within the CH1 or CL region to contain a salvage receptor binding epitope taken from two loops of a CH2 domain of an Fc region of an IgG, as described in U.S. Pat. Nos. 5,869,046 and 6,121,022 by Presta et al.

In yet other embodiments, the Fc region is altered by replacing at least one amino acid residue with a different amino acid residue to alter the effector functions of the antibody. For example, one or more amino acids can be replaced with a different amino acid residue such that the antibody has an altered affinity for an effector ligand but retains the antigen-binding ability of the parent antibody. The effector ligand to which affinity is altered can be, for example, an Fc receptor or the C1 component of complement. This approach is described in further detail in U.S. Pat. Nos. 5,624,821 and 5,648,260, both by Winter et al.

In another embodiment, one or more amino acids selected from amino acid residues can be replaced with a different amino acid residue such that the antibody has altered C1q binding and/or reduced or abolished complement dependent cytotoxicity (CDC). This approach is described in further detail in U.S. Pat. No. 6,194,551 by Idusogie et al.

In another embodiment, one or more amino acid residues are altered to thereby alter the ability of the antibody to fix complement. This approach is described further in PCT Publication WO 94/29351 by Bodmer et al.

In yet another embodiment, the Fc region is modified to increase the ability of the antibody to mediate antibody dependent cellular cytotoxicity (ADCC) and/or to increase the affinity of the antibody for an Fcγ receptor by modifying one or more amino acids. This approach is described further in PCT Publication WO 00/42072 by Presta. Moreover, the binding sites on human IgG1 for FcγRI, FcγRII, FcγRIII and FcRn have been mapped and variants with improved binding have been described (see Shields, R. L. et al, (2001) J Biol Chem 276:6591-6604).

In certain embodiments, the Fc domain of IgG1 isotype is used. In some specific embodiments, a mutant variant of IgG1 Fc fragment is used, e.g. a silent IgG1 Fc which reduces or eliminates the ability of the fusion polypeptide to mediate antibody dependent cellular cytotoxicity (ADCC) and/or to bind to an Fcγ receptor. An example of an IgG1 isotype silent mutant wherein Leucine residue is replaced by Alanine residue at amino acid positions 234 and 235 as described by Hezareh et al, J. Virol (2001); 75 (24): 12161-8.

In certain embodiments, the Fc domain is a mutant preventing glycosylation at position 297 of Fc domain. For example, the Fc domain contains an amino acid substitution of asparagine residue at position 297. Example of such amino acid substitution is the replacement of N297 by a glycine or an alanine.

Silenced effector functions can be obtained by mutation in the Fc region of the antibodies and have been described in the art: LALA and N297A (Strohl, W., 2009, Curr. Opin. Biotechnol. vol. 20 (6): 685-691); and D265A (Baudino et al., 2008, J. Immunol. 181:6664-69; Strohl, W., supra); and DAPA (D265A and P329A) (Shields R L., J Biol Chem. 2001;276 (9): 6591-604; U.S. Patent Publication US2015/0320880). Examples of silent Fc IgG1 antibodies comprise the so-called LALA mutant comprising L234A and L235A mutation in the IgG1 Fc amino acid sequence. Another example of a silent IgG1 antibody comprises the D265A mutation. Another example of a silent IgG1 antibody is the so-called DAPA mutant, comprising D265A and P329A mutations to the IgG1 Fc amino acid sequence. Another silent IgG1 antibody comprises the N297A mutation, which results in aglycosylated/non-glycosylated antibodies. Additional Fc mutations for providing silenced effector function are described in PCT publication no. WO2014/145806 (e.g., in FIG. 7 of WO2014/145806), herein incorporated by reference in its entirety. One example from WO2014/145806 of a silent IgG1 antibody comprises a E233P, L234V, L235A, and S267K mutation, and a deletion of G236 (G236del). Another example from WO2014/145806 of a silent IgG1 antibody comprises a E233P, L234V, and L235A mutation, and a deletion of G236 (G236del). Another example from WO2014/145806 of a silent IgG1 antibody comprises a S267K mutation.

In still another embodiment, the glycosylation of an antibody is modified. For example, an aglycosylated antibody can be made (i.e., the antibody lacks glycosylation). Glycosylation can be altered to, for example, increase the affinity of the antibody for the antigen. Such carbohydrate modifications can be accomplished by; for example, altering one or more sites of glycosylation within the antibody sequence. For example, one or more amino acid substitutions can be made that result in elimination of one or more variable region framework glycosylation sites to thereby eliminate glycosylation at that site. Such aglycosylation may increase the affinity of the antibody for antigen. Such an approach is described in further detail in U.S. Pat. Nos. 5,714,350 and 6,350,861 by Co et al.

Additionally or alternatively, an antibody can be made that has an altered type of glycosylation, such as a hypofucosylated antibody having reduced amounts of fucosyl residues or an antibody having increased bisecting GlcNac structures. Such altered glycosylation patterns have been demonstrated to increase the ADCC ability of antibodies. Such carbohydrate modifications can be accomplished by, for example, expressing the antibody in a host cell with altered glycosylation machinery. Cells with altered glycosylation machinery have been described in the art and can be used as host cells in which to express recombinant antibodies of the invention to thereby produce an antibody with altered glycosylation. For example, EP 1,176,195 by Hang et al. describes a cell line with a functionally disrupted FUT8 gene, which encodes a fucosyl transferase, such that antibodies expressed in such a cell line exhibit hypofucosylation. Therefore, in one embodiment, the antibodies of the invention are produced by recombinant expression in a cell line which exhibit hypofucosylation pattern, for example, a mammalian cell line with deficient expression of the FUT8 gene encoding fucosyltransferase. PCT Publication WO 03/035835 by Presta describes a variant CHO cell line, Lec13 cells, with reduced ability to attach fucose to Asn (297)-linked carbohydrates, also resulting in hypofucosylation of antibodies expressed in that host cell (see also Shields, R. L. et al., 2002 J. Biol. Chem. 277:26733-26740). PCT Publication WO 99/54342 by Umana et al. describes cell lines engineered to express glycoprotein-modifying glycosyl transferases (e.g. beta(1,4)-N acetylglucosaminyl-transferase III (GnTIII)) such that antibodies expressed in the engineered cell lines exhibit increased bisecting GlcNac structures which results in increased ADCC activity of the antibodies (see also Umana et al., 1999 Nat. Biotech. 17:176-180). Alternatively, the antibodies of the invention can be produced in a yeast or a filamentous fungi engineered for mammalian-like glycosylation pattern, and capable of producing antibodies lacking fucose as glycosylation pattern (see for example EP1297172B1).

Another modification of the antibodies herein that is contemplated by the invention is pegylation. An antibody can be pegylated to, for example, increase the biological (e.g. serum) half-life of the antibody. To pegylate an antibody, the antibody, or fragment thereof, typically is reacted with polyethylene glycol (PEG), such as a reactive ester or aldehyde derivative of PEG, under conditions in which one or more PEG groups become attached to the antibody or antibody fragment. The pegylation can be carried out by an acylation reaction or an alkylation reaction with a reactive PEG molecule (or an analogous reactive water-soluble polymer). As used herein, the term "polyethylene glycol" is intended to encompass any of the forms of PEG that have been used to derivatize other proteins, such as mono (C1-C10) alkoxy- or aryloxy-polyethylene glycol or polyethylene glycol-maleimide. In certain embodiments, the antibody to be pegylated is an aglycosylated antibody. Methods for pegylating proteins are known in the art and can be applied to the antibodies of the invention. See for example, EP 0 154 316 by Nishimura et al. and EP 0 401 384 by Ishikawa et al.

Another modification of the antibodies that is contemplated by the invention is a conjugate or a protein fusion of at least the antigen-binding region of the antibody of the invention to serum protein, such as human serum albumin or a fragment thereof to increase half-life of the resulting molecule. Such approach is for example described in Ballance et al. EP0322094.

Another modification of the antibodies that is contemplated by the invention is one or more modifications to increase formation of a heterodimeric bispecific antibody. A variety of approaches available in the art can be used in for enhancing dimerization of the two heavy chain domains of bispecific antibodies, e.g., bbmAbs, as disclosed in, for example, EP 1870459A1; U.S. Pat. Nos. 5,582,996; 5,731,168; 5,910,573; 5,932,448; 6,833,441; 7,183,076; U.S. Patent Application Publication No. 2006204493A1; and PCT Publication No. WO2009/089004A1, the contents of which are incorporated herein in their entireties.

Generation of bispecific antibodies using knobs-into-holes is disclosed e.g. in PCT Publication No. WO1996/027011, Ridgway et al., (1996), and Merchant et al. (1998).

In practicing some of the methods of treatment or uses of the present disclosure, a therapeutically effective amount of a bispecific antibodies targeting both IL-1β and IL-18 simultaneously, e.g. bbmAb1 has to be administered to a subject in need thereof. It will be understood that regimen changes may be appropriate for certain patients. Thus, administration (e.g. of bbmAb1) may be more frequent e.g., daily, bi-weekly dosing, or weekly dosing.

Some patients may benefit from a loading regimen (e.g., daily administrations for several days/[e.g., 1 to 4 days e.g., dosing at day 0, 1, 2, and/or 3] followed by a maintenance regimen starting e.g. at Week 3 or 4 where bbmAb1 may be administered weekly, bi-weekly or every 4 weeks for several weeks. In some embodiments, the period of administration of a a bispecific antibodies targeting both IL-1β and IL-18 simultaneously, e.g. bbmAb1 is for 1 day, 2 days, 3 days, 4 days, 5 days, 6 days, 7 days. In some embodiments, the period of administration of a a bispecific antibodies targeting both IL-1β and IL-18 simultaneously, e.g. bbmAb1 is for 8 days, 9 days, 10 days, 11 days, 12 days, 13 days, 14 days, 3 weeks, 4 weeks, 5 weeks, 6 weeks, 7 weeks, 8 weeks, 9 weeks, 10 weeks, 11 weeks, 12 weeks, 4 months, 5 months, 6 months, 7 months, 8 months, 9 months, 10 months, 11 months, 12 months, or more.

It will be understood that dose escalation may be appropriate for certain patients, for example patients, based on severity of the disease, e.g., patients that display inadequate response to treatment with the bbmAb1. Thus, dosages (intravenous (i.v.)) may be greater than about 10 mg/kg, e.g., about 11 mg/kg, 12 mg/kg, 15 mg/kg, 20 mg/kg, 25 mg/kg, 30 mg/kg, 35 mg/kg, etc. Furthermore, subcutaneous (s.c.) dosages (loading or maintenance doses) may be greater than about 50 mg to about 900 mg s.c., e.g., about 75 mg, about 100 mg, about 125 mg, about 175 mg, about 200 mg, about 250 mg, about 350 mg, about 400 mg, about 450 mg, about 500 mg, about 600 mg, etc.;

It will also be understood that dose reduction may also be appropriate for certain patients, such as patients, e.g., patients that display adverse events or an adverse response to treatment with the bbmAb1. Thus, dosages of the may be less than about 10 mg/kg e.g., about 1 mg/kg, about 2 mg/kg, about 3 mg/kg, about 4 mg/kg, about 5 mg/kg, about 6 mg/kg, about 7 mg/kg, about 8 mg/kg or about 9 mg/kg. In some embodiments, the bbmAB1 dose may be adjusted as determined by a physician.

In some embodiments, the bbmAB1 antibody may be administered to the patient as a single dose of 10 mg/kg delivered i.v., wherein the dose may be adjusted to a higher or lower dose if needed, as determined by a physician, e.g., about 1 mg/kg, about 2 mg/kg, about 3 mg/kg, about 4 mg/kg, about 5 mg/kg, about 6 mg/kg, about 7 mg/kg, about 8 mg/kg or about 9 mg/kg or e.g., about 11 mg/kg, 12 mg/kg, 15 mg/kg, 20 mg/kg, 25 mg/kg, 30 mg/kg, 35 mg/kg, etc.

In some embodiments, the bbmAB1 antibody may be administered to the patient at an initial dose of 10 mg/kg delivered i.v., and the dose may be then adjusted to a higher or lower dose if needed, as determined by a physician.

In a specific embodiment, 10 mg/kg bbmAB1 is administered on day 1.

In a specific embodiment, 10 mg/kg bbmAB1 is administered on day 1 (D1) and on day 2 (D2), D3, D4, D5, D6, D7, D8, D9, D10, D11, D12, D13 and/or D14

In another specific embodiment, 10 mg/kg bbmAB1 is administered i.v. on day 1.

Example 1

The generation of bbmAb1 has been described in detail in the examples 1 to 5 of the patent application WO/2018/229612. The examples 1 of WO/2018/229612, comprising (1) vector construction, (2) Host cell line and transfection, (3) Cell selection and sorting, (4) Cell expansion, (5) Clone stability, (6) Manufacturing, (7) Analytical characterization and purity assessment, (8) Analytical Results are herewith incorporated by reference in their entirety.

The bbmAb1, is a bispecific IgG1, with LALA silencing mutations, simultaneously binding to two distinct targets, IL-1β and IL-18. The antibody combines two distinct antigen binding arms (Fab fragments), whereas the Fab directed against IL-1β is based on mAb2 and contains a kappa light chain (Vk6). The Fab directed against IL-18 is based on mAb1 and is composed of a lambda light chain (Vλ1). In order to drive hetero-dimerization of the Fc domain during expression a "knob" with a bulky amino acid (aa) side chain (S354C and T366W) in the mAb1 heavy chain and a "hole" with small aa side chains (Y349C, T366S, L368A, Y407V) were introduced in the mAb2 heavy chain.

For ease of reference, the amino acid sequences of the hypervariable regions of bbmAb1, based on the Kabat definition and the Chothia definition, as well as the $V_L$ and $V_H$ domains and full heavy and light chains are provided in Table 3, below.

TABLE 3

Amino acid sequences of the hypervariable regions (CDRs), variable domains (VH and VL) and full chains of bbmAb1. The DNA encoding the first VL of is set forth in SEQ ID NO: 102 and the DNA encoding the second VL is set forth in SEQ ID NO: 70. The DNA encoding the first VH is set forth in SEQ ID NO: 86 and the DNA encoding the second VH is set forth in SEQ ID NO: 54.

| bbmAb1 heavy chain 1 (from mAb1) | | |
|---|---|---|
| CDR1-1 | Kabat | SEQ ID NO: 76 |
| | Chothia | SEQ ID NO: 79 |
| | IMGT | SEQ ID NO: 82 |
| CDR2-1 | Kabat | SEQ ID NO: 77 |
| | Chothia | SEQ ID NO: 80 |
| | IMGT | SEQ ID NO: 83 |
| CDR3-1 | Kabat | SEQ ID NO: 78 |
| | Chothia | SEQ ID NO: 81 |
| | IMGT | SEQ ID NO: 84 |
| VH-1 | | SEQ ID NO: 85 |
| Heavy Chain-1 | | SEQ ID NO: 87 |
| bbmAb1 light chain 1 (from mAb1) | | |
| CDR1-1 | Kabat | SEQ ID NO: 92 |
| | Chothia | SEQ ID NO: 95 |
| | IMGT | SEQ ID NO: 98 |
| CDR2-1 | Kabat | SEQ ID NO: 93 |
| | Chothia | SEQ ID NO: 96 |
| | IMGT | SEQ ID NO: 99 |
| CDR3-1 | Kabat | SEQ ID NO: 94 |
| | Chothia | SEQ ID NO: 97 |
| | IMGT | SEQ ID NO: 100 |
| VL-1 | | SEQ ID NO: 101 |
| Light Chain-1 | | SEQ ID NO: 103 |
| bbmAb1 heavy chain 2 (from mAb2) | | |
| CDR1-2 | Kabat | SEQ ID NO: 44 |
| | Chothia | SEQ ID NO: 47 |
| | IMGT | SEQ ID NO: 50 |
| CDR2-2 | Kabat | SEQ ID NO: 45 |
| | Chothia | SEQ ID NO: 48 |
| | IMGT | SEQ ID NO: 51 |
| CDR3-2 | Kabat | SEQ ID NO: 46 |
| | Chothia | SEQ ID NO: 49 |
| | IMGT | SEQ ID NO: 52 |
| VH-2 | | SEQ ID NO: 53 |
| Heavy Chain-2 | | SEQ ID NO: 55 |
| bbmAb1 light chain 2 (from mAb2) | | |
| CDR1-2 | Kabat | SEQ ID NO: 60 |
| | Chothia | SEQ ID NO: 63 |
| | IMGT | SEQ ID NO: 66 |
| CDR2-2 | Kabat | SEQ ID NO: 61 |
| | Chothia | SEQ ID NO: 64 |
| | IMGT | SEQ ID NO: 67 |
| CDR3-2 | Kabat | SEQ ID NO: 62 |
| | Chothia | SEQ ID NO: 65 |
| | IMGT | SEQ ID NO: 68 |
| VL-2 | | SEQ ID NO: 69 |
| Light Chain-2 | | SEQ ID NO: 71 |

In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a first immunoglobulin heavy chain variable domain ($V_{H1}$) comprising hypervariable regions CDR1, CDR2 and CDR3, said CDR1 having the amino acid sequence SEQ ID NO:76, said CDR2 having the amino acid sequence SEQ ID NO:77, and said CDR3 having the amino acid sequence SEQ ID NO:78. In one embodiment, IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a first immunoglobulin heavy chain variable domain ($V_{H1}$) comprising hypervariable regions CDR1, CDR2 and CDR3, said CDR1 having the amino acid sequence SEQ ID NO:79, said CDR2 having the amino acid sequence SEQ ID NO: 80, and said CDR3 having the amino acid sequence SEQ ID NO:81. In one embodiment, IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a first immunoglobulin heavy chain variable domain ($V_{H1}$) comprising hypervariable regions CDR1, CDR2 and CDR3, said CDR1 having the amino acid sequence SEQ ID NO:82, said CDR2 having the amino acid sequence SEQ ID NO: 83, and said CDR3 having the amino acid sequence SEQ ID NO:84.

In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a second immunoglobulin heavy chain variable domain ($V_{H2}$) comprising hypervariable regions CDR1, CDR2 and CDR3, said CDR1 having the amino acid sequence SEQ ID NO:44, said CDR2 having the amino acid sequence SEQ ID NO:45, and said CDR3 having the amino acid sequence SEQ ID NO:46. In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a second immunoglobulin heavy chain variable domain ($V_{H2}$) comprising hypervariable regions CDR1, CDR2 and CDR3, said CDR1 having the amino acid sequence SEQ ID NO:47, said CDR2 having the amino acid sequence SEQ ID NO:48, and said CDR3 having the amino acid sequence SEQ ID NO:49. In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a second immunoglobulin heavy chain variable domain ($V_{H2}$) comprising hypervariable regions CDR1, CDR2 and CDR3, said CDR1 having the amino acid sequence SEQ ID NO:50, said CDR2 having the amino acid sequence SEQ ID NO:51, and said CDR3 having the amino acid sequence SEQ ID NO:52. In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a first immunoglobulin light chain variable domain ($V_{L1}$) comprising hypervariable regions CDR1, CDR2 and CDR3, said CDR1 having the amino acid sequence SEQ ID NO:92, said CDR2 having the amino acid sequence SEQ ID NO:93 and said CDR3 having the amino acid sequence SEQ ID NO:94. In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a first immunoglobulin light chain variable domain ($V_{L1}$) comprising hypervariable regions CDR1, CDR2 and CDR3, said CDR1 having the amino acid sequence SEQ ID NO:95, said CDR2 having the amino acid sequence SEQ ID NO: 96 and said CDR3 having the amino acid sequence SEQ ID NO:97. In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a first immunoglobulin light chain variable domain ($V_{L1}$) comprising hypervariable regions CDR1, CDR2 and CDR3, said CDR1 having the amino acid sequence SEQ ID NO:98, said CDR2 having the amino acid sequence SEQ ID NO: 99 and said CDR3 having the amino acid sequence SEQ ID NO:100.

In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a second immunoglobulin light chain variable domain ($V_{L2}$) comprising hypervariable regions CDR1, CDR2 and CDR3, said CDR1 having the amino acid sequence SEQ ID NO:60, said CDR2 having the amino acid sequence SEQ ID NO:61 and said CDR3 having the amino acid sequence SEQ ID NO:62. In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a second immunoglobulin light chain variable domain ($V_{L2}$) comprising hypervariable regions CDR1, CDR2 and CDR3, said CDR1 having the amino acid sequence SEQ ID NO:63, said CDR2 having the amino acid sequence SEQ ID NO: 64 and said CDR3 having the amino acid sequence SEQ ID NO:65. In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a second immunoglobulin light chain variable domain ($V_{L2}$) comprising hypervariable regions CDR1, CDR2 and CDR3, said CDR1 having the amino acid sequence SEQ ID NO:66, said CDR2 having the amino acid sequence SEQ ID NO: 67 and said CDR3 having the amino acid sequence SEQ ID NO:68.

In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a first immunoglobulin $V_{H1}$ domain and a first immunoglobulin $V_{L1}$ domain, wherein: a) the first immunoglobulin $V_{H1}$ domain comprises (e.g. in sequence): i) hypervariable regions CDR1, CDR2 and CDR3, said CDR1 having the amino acid sequence SEQ ID NO:76, said CDR2 having the amino acid sequence SEQ ID NO:77, and said CDR3 having the amino acid sequence SEQ ID NO:78; or ii) hypervariable regions CDR1, CDR2 and CDR3, said CDR1 having the amino acid sequence SEQ ID NO:79, said CDR2 having the amino acid sequence SEQ ID NO:80, and said CDR3 having the amino acid sequence SEQ ID NO:81; or iii) hypervariable regions CDR1, CDR2 and CDR3, said CDR1 having the amino acid sequence SEQ ID NO: 82, said CDR2 having the amino acid sequence SEQ ID NO:83, and said CDR3 having the amino acid sequence SEQ ID NO:84 and b) the first immunoglobulin $V_{L1}$ domain comprises (e.g. in sequence): i) hypervariable regions CDR1, CDR2 and CDR3, said CDR1 having the amino acid sequence SEQ ID NO:92, said CDR2 having the amino acid sequence SEQ ID NO:93, and said CDR3 having the amino acid sequence SEQ ID NO:94 or ii) hypervariable regions CDR1, CDR2 and CDR3, said CDR1 having the amino acid sequence SEQ ID NO:95, said CDR2 having the amino acid sequence SEQ ID NO:96, and said CDR3 having the amino acid sequence SEQ ID NO:97 or iii) hypervariable regions CDR1, CDR2 and CDR3, said CDR1 having the amino acid sequence SEQ ID NO: 98, said CDR2 having the amino acid sequence SEQ ID NO:99, and said CDR3 having the amino acid sequence SEQ ID NO:100.

In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a second immunoglobulin $V_{H2}$ domain and a second immunoglobulin $V_{L2}$ domain, wherein: a) the second immunoglobulin $V_{H2}$ domain comprises (e.g. in sequence): i) hypervariable regions CDR1, CDR2 and CDR3, said CDR1 having the amino acid sequence SEQ ID NO:44, said CDR2 having the amino acid sequence SEQ ID NO:45, and said CDR3 having the amino acid sequence SEQ ID NO: 46; or ii) hypervariable regions CDR1, CDR2 and CDR3, said CDR1 having the amino acid sequence SEQ ID NO:47, said CDR2 having the amino acid sequence SEQ ID NO: 48, and said CDR3 having the amino acid sequence SEQ ID NO:49; or iii) hypervariable regions CDR1, CDR2 and CDR3, said CDR1 having the amino acid sequence SEQ ID NO:50, said CDR2 having the amino acid sequence SEQ ID NO:51, and said CDR3 having the amino acid sequence SEQ ID NO:52 and b) the second immunoglobulin $V_{L2}$ domain comprises (e.g. in sequence): i) hypervariable regions CDR1, CDR2 and CDR3, said CDR1 having the amino acid sequence SEQ ID NO:60, said CDR2 having the amino acid sequence SEQ ID NO:61, and said CDR3 having the amino acid sequence SEQ ID NO:62 or ii) hypervariable regions CDR1, CDR2 and CDR3, said CDR1 having the amino acid sequence SEQ ID NO:63, said CDR2 having the amino acid sequence SEQ ID NO:64, and said CDR3 having the amino acid sequence SEQ ID NO:65 or iii) hypervariable regions CDR1, CDR2 and CDR3, said CDR1 having the amino acid sequence SEQ ID NO:66, said CDR2 having the amino acid sequence SEQ ID NO:67, and said CDR3 having the amino acid sequence SEQ ID NO:68.

In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises: a) a first immunoglobulin heavy chain variable domain ($V_{H1}$) comprising the amino acid sequence set forth as SEQ ID NO:85; b) a first immunoglobulin light chain variable domain ($V_{L1}$) comprising the amino acid sequence set forth as SEQ ID NO:101; c) a first immunoglobulin $V_{H1}$ domain comprising the amino acid sequence set forth as SEQ ID NO:85 and a first immunoglobulin $V_{L1}$ domain comprising the amino acid sequence set forth as SEQ ID NO: 101; d) a first immunoglobulin $V_{H1}$ domain comprising the hypervariable regions set forth as SEQ ID NO:76, SEQ ID NO: 77, and SEQ ID NO:78; e) a first immunoglobulin $V_{L1}$ domain comprising the hypervariable regions set forth as SEQ ID NO:92, SEQ ID NO:93 and SEQ ID NO:94; f) a first immunoglobulin $V_{H1}$ domain comprising the hypervariable regions set forth as SEQ ID NO: 79, SEQ ID NO:80 and SEQ ID NO:81; g) a first immunoglobulin V$_{L1}$ domain comprising the hypervariable regions set forth as SEQ ID NO:95, SEQ ID NO:96 and SEQ ID NO:97; h) a first immunoglobulin V$_{H1}$ domain comprising the hypervariable regions set forth as SEQ ID NO:76, SEQ ID NO:77, and SEQ ID NO:78 and a first immunoglobulin V$_{L1}$ domain comprising the hypervariable regions set forth as SEQ ID NO:92, SEQ ID NO:93 and SEQ ID NO:94; i) a first immunoglobulin V$_{H1}$ domain comprising the hypervariable regions set forth as SEQ ID NO:79, SEQ ID NO:80, and SEQ ID NO:81 and a first immunoglobulin Vu1 domain comprising the hypervariable regions set forth as SEQ ID NO: 95, SEQ ID NO:96 and SEQ ID NO:97; j) a first light chain comprising SEQ ID NO: 103; k) a first heavy chain comprising SEQ ID NO:87; or l) a first light chain comprising SEQ ID NO: 103 and a first heavy chain comprising SEQ ID NO:87.

In one embodiment, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises: a) a second immunoglobulin heavy chain variable domain (V$_{H2}$) comprising the amino acid sequence set forth as SEQ ID NO: 53; b) a second immunoglobulin light chain variable domain (V$_{L2}$) comprising the amino acid sequence set forth as SEQ ID NO:69; c) a second immunoglobulin V$_{H2}$ domain comprising the amino acid sequence set forth as SEQ ID NO:53 and a second immunoglobulin V$_{L2}$ domain comprising the amino acid sequence set forth as SEQ ID NO: 69; d) a second immunoglobulin V$_{H2}$ domain comprising the hypervariable regions set forth as SEQ ID NO:44, SEQ ID NO:45, and SEQ ID NO:46; e) a second immunoglobulin V$_{L2}$ domain comprising the hypervariable regions set forth as SEQ ID NO:60, SEQ ID NO: 61 and SEQ ID NO:62; f) a second immunoglobulin V$_{H2}$ domain comprising the hypervariable regions set forth as SEQ ID NO:47, SEQ ID NO:48 and SEQ ID NO:49; g) a second immunoglobulin V$_{L2}$ domain comprising the hypervariable regions set forth as SEQ ID NO:63, SEQ ID NO:64 and SEQ ID NO:65; h) a second immunoglobulin V$_{H2}$ domain comprising the hypervariable regions set forth as SEQ ID NO:44, SEQ ID NO:45, and SEQ ID NO:46 and a second immunoglobulin V$_{L2}$ domain comprising the hypervariable regions set forth as SEQ ID NO:60, SEQ ID NO:61 and SEQ ID NO:62; i) a second immunoglobulin V$_{H2}$ domain comprising the hypervariable regions set forth as SEQ ID NO: 47, SEQ ID NO:48, and SEQ ID NO:49 and a second immunoglobulin V$_{L2}$ domain comprising the hypervariable regions set forth as SEQ ID NO:63, SEQ ID NO:64 and SEQ ID NO: 65; j) a second light chain comprising SEQ ID NO:81; k) a second heavy chain comprising SEQ ID NO:55; or l) a second light chain comprising SEQ ID NO:81 and a second heavy chain comprising SEQ ID NO:55.

In some embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises three CDRs of SEQ ID NO:53. In other embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO:69. In other embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO:53 and the three CDRs of SEQ ID NO:69. In some embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO: 85. In other embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO:101. In other embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO:85 and the three CDRs of SEQ ID NO:101.

In some embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises a the three CDRs of SEQ ID NO:85. In other embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO:101. In other embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO:85 and the three CDRs of SEQ ID NO:101. In some embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO: 53. In other embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO: 69. In other embodiments, the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO: 53 and the three CDRs of SEQ ID NO:69. In an embodiment, the L-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, comprises the three CDRs of SEQ ID NO:85, the three CDRs of SEQ ID NO: 101, the three CDRs of SEQ ID NO: 53 and the three CDRs of SEQ ID NO:69.

In one embodiment, the first part of the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, is selected from a human IL-18 antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:76, said CDR2 having the amino acid sequence SEQ ID NO:77, and said CDR3 having the amino acid sequence SEQ ID NO:78; and b) an immunoglobulin light chain or fragment thereof which comprises a variable domain comprising, in sequence, the hypervariable regions CDR1, CDR2, and CDR3 and the constant part or fragment thereof of a human light chain, said CDR1 having the amino acid sequence SEQ ID NO:92, said CDR2 having the amino acid sequence SEQ ID NO: 93, and said CDR3 having the amino acid sequence SEQ ID NO:94. Furthermore the second part of the IL-18/IL-1β bispecific antibody is selected from a human IL-1β antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:44, said CDR2 having the amino acid sequence SEQ ID NO:45, and said CDR3 having the amino acid sequence SEQ ID NO:46; and b) an immunoglobulin light chain or fragment thereof which comprises a variable domain comprising, in sequence, the hypervariable regions CDR1, CDR2, and CDR3 and the constant part or fragment thereof of a human light chain, said CDR1 having the amino acid sequence SEQ ID NO:60, said CDR2 having the amino acid sequence SEQ ID NO: 61, and said CDR3 having the amino acid sequence SEQ ID NO:62.

In one embodiment, the first part of the IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, is selected from a human IL-18 antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:76, said CDR2 having the amino acid sequence SEQ ID NO:77 and said CDR3 having the amino acid sequence SEQ ID NO:78; and b) an immunoglobulin light chain or fragment thereof which comprises a variable domain comprising, in sequence, the hypervariable regions CDR1, CDR2, and CDR3 and the constant part or fragment thereof of a human light chain, said CDR1 having the amino acid sequence SEQ ID NO:92, said CDR2 having the amino acid sequence SEQ ID NO: 93, and said CDR3 having the amino acid sequence SEQ ID NO:94. Furthermore, the second part of the IL-18/IL-1β bispecific antibody is selected from a human IL-1β antibody that comprises at least: a) an immunoglobulin heavy chain or fragment thereof which comprises a variable domain comprising, in sequence, the hypervariable regions CDR1, CDR2 and CDR3 and the constant part or fragment thereof of a human heavy chain; said CDR1 having the amino acid sequence SEQ ID NO:44, said CDR2 having the amino acid sequence SEQ ID NO:45 and said CDR3 having the amino acid sequence SEQ ID NO:46; and b) an immunoglobulin light chain or fragment thereof which comprises a variable domain comprising, in sequence, the hypervariable regions CDR1, CDR2, and CDR3 and the constant part or fragment thereof of a human light chain, said CDR1 having the amino acid sequence SEQ ID NO:60, said CDR2 having the amino acid sequence SEQ ID NO: 61, and said CDR3 having the amino acid sequence SEQ ID NO:62.

The first $V_{H1}$ or $V_{L1}$ domain of an IL-18/IL-1β bispecific antibody used in the disclosed methods may have a first $V_{H1}$ and/or first $V_{L1}$ domains that are substantially identical to the $V_H$ or $V_L$ domains set forth in SEQ ID NO:85 and 101. An IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, as disclosed herein may comprise a first heavy chain that is substantially identical to that set forth as SEQ ID NO:87 and/or a first light chain that is substantially identical to that set forth as SEQ ID NO:103. An IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, as disclosed herein may comprise a first heavy chain that comprises SEQ ID NO:87 and a first light chain that comprises SEQ ID NO:103. An IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, as disclosed herein may comprise: a) a first heavy chain, comprising a variable domain having an amino acid sequence substantially identical to that shown in SEQ ID NO: 85 and the constant part of a human heavy chain having a hetero-dimerization modification; and b) a first light chain, comprising a variable domain having an amino acid sequence substantially identical to that shown in SEQ ID NO: 101 and the constant part of a human light chain. The constant part of the human heavy chain may be IgG1. In one embodiment, the IgG1 is a human IgG1 without effector mutations. In one embodiment, the human heavy chain IgG1 comprising a silencing mutation N297A, D265A or a combination of L234A and L235A. In one specific embodiment, the human heavy chain IgG1 comprises the silencing mutation which is a combination of L234A and L235A, according to SEQ ID NO:87.

The second $V_{H2}$ or $V_{L2}$ domain of an IL-18/IL-1β bispecific antibody used in the disclosed methods may have a second $V_{H2}$ and/or first $V_{L2}$ domains that are substantially identical to the $V_H$ or $V_L$ domains set forth in SEQ ID NO:53 and 69. An IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, as disclosed herein may comprise a second heavy chain that is substantially identical to that set forth as SEQ ID NO:55 and/or a second light chain that is substantially identical to that set forth as SEQ ID NO:71. An IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, as disclosed herein may comprise a second heavy chain that comprises SEQ ID NO:53 and a second light chain that comprises SEQ ID NO: 69. An IL-18/IL-1β bispecific antibody for use in (i) the disclosed treatment or prevention of cytokine release syndrome or cytokine storm syndrome or (ii) for use in the disclosed methods for the treatment or prevention of cytokine release syndrome or cytokine storm syndrome, as disclosed herein may comprise: a) a second heavy chain, comprising a variable domain having an amino acid sequence substantially identical to that shown in SEQ ID NO:53 and the constant part of a human heavy chain having a hetero-dimerization modification, which is complementary to the hetero-dimerization of the first heavy chain; and b) a second light chain, comprising a variable domain having an amino acid sequence substantially identical to that shown in SEQ ID NO:69 and the constant part of a human light chain. The constant part of the human heavy chain may be IgG1. In one embodiment, the IgG1 is a human IgG1 without effector mutations. In one embodiment, the human heavy chain IgG1 comprising a silencing mutation N297A, D265A or a combination of L234A and L235A. In one specific embodiment, the human heavy chain IgG1 comprises the silencing mutation which is a combination of L234A and L235A, according to SEQ ID NO:55.

Other preferred IL-18 antagonists (e.g. antibodies) for use as the first part of a bispecific antibody in the disclosed methods, kits and regimens are those set forth in U.S. Pat. No. 9,376,489, which is incorporated by reference herein in its entirety.

Other preferred IL-1β antagonists (e.g. antibodies) for use as the second part of a bispecific in the disclosed methods, kits and regimens are those set forth in U.S. Pat. No. 7,446,175 or U.S. Pat. No. 7,993,878 or U.S. Pat. No. 8,273,350, which are incorporated by reference herein in their entirety.

Example 2: In Vitro Activity of bbmAb1

Binding activity of bbmAb1 was tested in a variety of different cell assays.
(1) Materials and Methods
(a) for Solution Equilibrium Titration (SET) Assays
The following material was used:
  Recombinant human IL-18, biotinylated (BTP25828)
  Recombinant Cynomolgus monkey IL-1β (Novartis)
  Anti-human IgG antibody, SULFO-TAG labeled (Meso Scale discovery (MSD) #R32AJ-5). Goat anti-human Fab specific, conjugated with MSD SULFO-TAG NHS Ester (Jackson
  Immuno Research #109-005-097, MSD #R91AN-1) BSA (Sigma #A-9647)
  MSD read buffer T with surfactant (MSD #R92TC-1)
  Phosphate-buffered saline (PBS) 10× (Teknova #P0195) Tris-buffered saline, pH 7.5 (TBS) 10× (Teknova #T1680) Tween-20 (Fluka #93773)
  Polypropylene microtiter plate (MTP) (Greiner #781280) 384-well plates, standard (MSD #L21XA)
(b) for Cellular Assays and SET Assays
  mAb2 as described in section IL-1β antibody.
  mAb1 as described in section IL-18 antibody.
  bbmAb1 as described in Example 1.
  Recombinant human IL-18 (BTP 25829) purchased from MBL Int. Corp. (#B001-5)
  Recombinant marmoset IL-1β (Novartis)
  Recombinant marmoset IL-18 (Novartis)
  Recombinant human IL-12 (#573008) was purchased from Biolegend KG-1 cell line (ATCC #CCL-246)
  Normal human dermal fibrobasts (#CC-2509) were purchased from Lonza
  Marmoset skin fibroblasts (#42637F (510))
  HEK-Blue™ IL-18/IL-1β cells (#hkb-il18) were purchased from InvivoGen
  PBMC were isolated from buffy coats were obtained from the Blutspendezentrum Bern Marmoset blood was obtained from SILABE, Niederhausbergen
  IL-6 ELISA: Human (BioLegend, #430503); Marmoset (U-CyTech biosciences, CT974-5)
  IFNγ ELISA: Human (BD555142) and marmoset (U-CyTech biosciences #CT340A)
  QUANTI-Blue™ assays (#rep-qb1) for the detection of SEAP was purchased from InvivoGen
  Cell medium: RPMI 1640 (Invitrogen #31870) supplemented with 10% Foetal Bovine Serum (Invitrogen #10108-157), 1% L-Glutamine (Invitrogen #25030-03), 1% penicillin/streptomycin (Invitrogen #15140-148), 10 µM 2-Mercaptoethanol (Gibco #31350-010), 5 mM Hepes (Gibco #15630-080)
  Round-bottomed, tissue-culture treated 96-well plates (Costar #3799)
  Flat-bottomed, tissue-culture treated 96-well plates (Costar #3596)
  Ficoll-Pacque™ Plus (GE Healthcare Life Sciences #17-1440-02) PBS 1×, without Calcium & Magnesium (Gibco #14190094)
  Leucosep tubes with porous barrier, 50 ml, polypropylene (Greiner bio-one #227290)
  Falcon 15 ml polypropylene conical tubes (BD #352096)
  Falcon 50 ml polypropylene conical tubes (BD #352070)
(c) Affinity Measurements by SET
Set Individual Target Binding Assay 22 serial 1.6n dilutions of the antigens (highest conc.: huIL-18, 5 nM; marIL-18, 10 nM; huIL-1β, 0.5 nM; marIL-1β, 0.5 nM) were prepared in sample buffer (PBS containing 0.5% Bovine serum albumin (BSA) and 0.02% Tween-20) and a constant concentration of antibody was added (for IL-18 readout 10 pM, for IL-1β readout 1 pM). A volume of 60 µl/well of each antigen-antibody mix was distributed in duplicates to a 384-well polypropylene microtiter plate (MTP). Sample buffer served as negative control and a sample containing only antibody as positive control (Maximal electrochemiluminescence signal without antigen, $B_{max}$). The plate was sealed and incubated overnight (o/n, at least 16 h) at room temperature (RT) on a shaker.

IL-18 readout: A streptavidin coated 384-well MSD array MTP was coated with 30 µl/well biotinylated huIL-18 (0.1 µg/ml, PBS) and incubated for 1 h at RT on a shaker. IL-1β readout: A standard 384-well MSD array MTP was coated with 30 µl/well of huIL-1 (3 µg/ml, PBS) diluted in PBS as capture agent and incubated overnight at 4° C.

The plate was blocked with 50 µl/well blocking buffer (PBS containing 5% BSA) for 1 hour (h), at room temperature (RT). After washing (TBST, TBS containing 0.05% Tween 20), a volume of 30 µl/well of the equilibrated antigen-antibody mix was transferred from the polypropylene MTP to the coated MSD plate and incubated for 20 min at RT. After an additional wash step, 30 µl sulfo tag-labeled anti-IgG detection antibody (0.5 µg/ml) diluted in sample buffer were added to each well and incubated for 30 min at RT on a shaker. The MSD plate was washed and 35 µl/well MSD read buffer were added and incubated for 5 min at RT. Electrochemiluminescence (ECL) signals were generated and measured by the MSD Sector Imager 6000.

Set Simultaneous Target Binding Assays

The SET assay was performed a described above, except for Assay A: The equilibration process (antibody/antigen mix) was performed in presence of an excess of one target (500 pM of either IL18 or IL-1β) while assessing the $K_D$ of the other target. Assay B: The equilibration process (antibody/antigen mix) was performed with both targets in serial dilutions in one mix simultaneously (constant concentration of antibody 10 pM, highest antigen conc. see above). The same mix was then analyzed for its free antibody concentration on IL18 and IL-1β coated plates as described above.

The SET Data were exported to Xlfit, an MS Excel add-in software. Average ECL-signals were calculated from duplicate measurements within each assay. Data were baseline adjusted by subtracting the lowest value from all data points and plotted against the corresponding antigen concentration to generate titration curves. $K_D$ values were determined by fitting the plot with the following:

1:2 Binding Model for the Monospecific Ab $$y = \frac{2B_{max}}{[IgG]}\left\{\frac{[IgG]}{2} - \frac{\left(\frac{x+[IgG]+K_D}{2} - \sqrt{\frac{(x+[IgG]+K_D)^2}{4} - x[IgG]}\right)^2}{2[IgG]}\right\}$$

1:1 Binding Model for the Knob in Hole Bispecific Ab $$y = B_{max} - \left(\frac{B_{max}}{2[Fab]}\left([Fab] + x + K_D - \sqrt{([Fab] + x + K_D)^2 - 4x[Fab]}\right)\right)$$

wherein
y: blank subtracted ECL signal
$B_{max}$: maximal ECL signal at zero antigen concentration
[IgG]: applied antibody concentration
[Fab]: applied total Fab concentration
$K_D$: Dissociation equilibrium constant
x: applied antigen concentration (d) Cell Culture KG-1 cells were grown in RPMI 1640 supplemented with 10% fetal bovine serum, 1% L-Glutamine and 1% penicillin/streptomycin at a density of $2\times10^5$ to $1\times10^6$ viable cells/mL.

Normal human fibroblasts and marmoset fibroblasts were grown in FBM (Clonetics, CC-3131) including bFGF (1 ng/ml, CC-4065), insulin (5 µg/ml, CC-4021), and 2% FCS (CC-4101). As starving medium, Fibroblast Basal Medium (LONZA #CC-3131) was used. HEK-Blue™ IL-18/IL-1β cells were grown in Growth Medium (DMEM, 4.5 g/l glucose, 10% (v/v) fetal bovine serum, 50 U/ml penicillin, 50 mg/ml streptomycin, 100 mg/ml Normocin™, 2 mM L-glutamine supplemented with 30 µg/ml of Blasticidin, 200 µg/ml of HygroGold™ and 100 µg/ml of Zeocin™

Human peripheral blood mononuclear cells (PBMC) were freshly isolated from buffy coats using LeucoSep tubes according to the instructions of the manufacturer. In brief, 13 ml of Ficoll-Paque was preloaded in a 14 ml LeucoSep tube by centrifugation for 30 s at 1,000×g. The heparinized whole-blood samples were diluted with equal volumes of PBS, and 25 ml of the diluted blood was added to a LeucoSep tube. The cell separation tubes were centrifuged for 15 min at 800×g without break at room temperature. The cell suspension layer was collected, and the cells were washed twice in PBS (for 10 min at 640 and 470×g, respectively, for the two successive washes) and re-suspended in culture medium before counting.

Marmoset blood was collected in heparinized tubes and filtered using a 70 µm cell strainer (BD Biosciences #352350)

(e) IL-1β Neutralization Assays

The IL-1β induced IL-6 production assay in fibroblasts was conducted essentially as described (Gram 2000) with only minor modifications. Briefly, fibroblasts were seeded at a density of 5×103 cells per well (in 100 µl) in a 96 well flat bottom tissue culture plate. The following day, cells were starved for 5 h in starving medium before addition of the recombinant IL-1β/compound solution mix (IL-1β concentration indicated in the table). The IL-1β/compound solution mix was prepared beforehand by incubating recombinant IL-1β with a concentration range of compound for 30 min at 37° C. The cell supernatants were collected after o/n incubation at 37° C. and the amount of released IL-6 determined by ELISA. The IL-1β induced IL-6 production assay in PBMC was performed according to the following. PBMC were seeded at $3\times10^5$ cells per well (in 100 µl) in a 96 well tissue culture plate and incubated with a recombinant IL-1β/compound solution mix for 24 h at 37° C. (IL-1β concentration indicated in the table). The IL-1β/compound solution mix was prepared beforehand by incubating recombinant IL-1β with a concentration range of compound for 30 min at 37° C. The cell supernatants were collected after 24 h of stimulation and the amount of released IL-6 determined by ELISA.

(f) IL-18 Neutralization Assays

The assay was conducted essentially according to the following. KG-1 cells (starved for 1 h in PBS+1% FCS beforehand) or PBMC at a density of $3\times10^5$ per well were seeded into round bottom 96-well cell culture plates and incubated with a solution mix of recombinant IL-18/IL-12 together with a concentration range of compounds (IL-18/IL-12 concentrations indicated in the table). After an incubation of 24 h at 37° C., supernatants were collected and the amount of released IFNγ determined by ELISA. For the assays with marmoset blood 85 µl of blood per well were used.

(g) Dual IL1β/IL-18 Neutralization in HEK-Blue™ Cells

The assay was conducted essentially as described in the manufacturer's handling procedures. Briefly, the HEK-Blue™ cells were seeded at a density of $4\times10^4$ per well into 96-well cell culture plates and incubated with a solution mix of recombinant IL-1β and IL-18 (to produce a 1:1 SEAP signal) together with a concentration range of compounds. After an incubation of 24 h at 37° C., supernatants were collected and the amount of released SEAP determined by using the QUANTI-Blue™ method according to the manufacturer's instructions.

All Data were exported to EXCEL software and IC50 values calculated by plotting dose-response curves for the logistic curve fitting functions using either EXCEL/XLfit4 or GraphPad Prism software.

(2) Results (a) Affinities to Recombinant Human and Marmoset IL1β and IL-18

Binding affinities of bbmAb1 to human and marmoset recombinant IL-1β and IL-18 proteins were measured by solution equilibrium titration (SET) titration and the $K_D$ values generated were compared to those of mAb2 for IL-1β and mAb1 for IL-18 binding. Comparing binding affinities in the individual target binding assay, bbmAb1 showed a similar mean KD compared to mAb1 for human and marmoset IL-18 (Table 4). For human IL-1β binding the mean KD value was slightly higher for bbmAb1 (2.6 pM) compared to mAb2 (0.6 pM) but still in the same low pM range. Subsequent measurements in the simultaneous dual target binding assay (Table 5) confirmed that bbmAb1 binding KD values for IL-1β were similar to values of mAb2 with the pre-clinical as well as with the clinical grade material. Thus, bbmAb1 possesses binding affinities for both targets in humans and marmosets that are in similar to mAb2 and mAb1, respectively.

TABLE 4

Affinities to recombinant human (hu) and marmoset (mar) IL-1β and IL-18 measured by SET (individual target binding determination)

Independent IL-18/IL-1β affinity determination

| Samples | huIL-18 $K_D$ [pM] | marIL-18 $K_D$ [pM] | huIL-1β $K_D$ [pM] | marIL-1β $K_D$ [pM] |
|---|---|---|---|---|
| mAb1 | 9 ± 2 | 21 ± 3 | n/a | n/a |
| mAb2 | n/a | n/a | 0.6 ± 0.1 | 1.0 ± 0.7 |
| bbmAb1 | 12 ± 4 | 33 ± 7 | 2.6 ± 0.1 | 3.0 ± 2.4 |

In addition to the individual target binding results, simultaneous dual target binding affinities of bbmAb1 were investigated (Table 5) by applying either excess of one target during the assessment of the binding the $K_D$ values of the other target (Assay A) or by applying a mixture of both targets in serial dilutions (Assay B). Simultaneous IL-1β/IL-18 affinity determination showed no significant difference between Assay A (excess of one antigen) and Assay B (mixture of both antigens in serial dilutions) which proved that both targets are bound simultaneously without affecting the binding of the other target. Furthermore, the $K_D$ values obtained with the simultaneous dual binding assays were similar to the $K_D$ values obtained with the standard assay (Table 4; in the absence of the second antigen) which proved that bbmAb1 can bind both antigens independently. Thus, bbmAb1 binds simultaneously and independently both human IL-1β and IL-18 and fully cross-reacts with the corresponding marmoset proteins.

(b) Neutralizing Activity of bbmAb1 in Human and Marmoset Cell Assays

The neutralizing activity of bbmAb1 for both cytokines (IL1β and IL-18) was assessed mAb2mAb1). In addition, the potency of bbmAb1 for the neutralization of marmoset IL-1β and IL-18 using marmoset cell assay systems was assessed (see section d).

(c) Individual and Simultaneous IL-1β and IL-18 Neutralization in Human Cells

The neutralizing activity of bbmAb1 on IL-18 was assessed by the inhibition of recombinant IL-1β-induced IL-6 production in human dermal fibroblasts (IL-1β used at 6 pM) and in human PBMC (IL-1β used at 60 pM). The neutralizing activity of bbmAb1 on IL-18 was measured by the inhibition of recombinant IL-18-induced IFN-γ production in KG-1 cells and human PBMC (both cells activated with 3 nM recombinant human IL-18 together with 1 ng/ml of recombinant human IL-12). The inhibitory potency of bbmAb1 on IL-1β and IL-18 was always compared to that of either mAb2 or mAb1, respectively. Depending on the assays, the mean IC50 values of bbmAb1 were in sub-nM or single digit nM ranges and up to 2- to 4-fold higher in direct comparison against mAb2 (for IL-1β) and mAb1 (for IL-18), respectively (Table 6 and Table 7). The monovalent format of bbmAb1 as compared to the bivalent format of mAb2/mAb1 but also potentially the KiH mutations may be reasons for this slight difference in potency of bbmAb1.

TABLE 6

Mean IC50 values for IL-1β neutralization by bbmAb1 in comparison to mAb2 in human dermal fibroblasts and human PBMC.

| IL-1β inhibition | IL-6 prod.* derm. fibrobl. $IC_{50}$ [nM] | IL-6 prod.* PBMC $IC_{50}$ [nM] |
|---|---|---|
| mAb2 | 0.031 ± 0.006 | 0.29 ± 0.67 |
| bbmAb1 | 0.136 ± 0.045 | 1.35 ± 0.59 |

*Inhibition of IL-6 production in human dermal fibroblasts or PBMC stimulated with recombinant human IL-1β (6 pM for dermal fibroblasts and 60 pM for PBMC). Shown are mean values ± SEM (n = 3 PBMC and n = 6 human dermal fibroblasts)

TABLE 5

Affinities to recombinant human (hu) and marmoset (mar) IL-1β and IL-18 measured by SET (simultaneous target binding determination Simultaneous IL-18/IL-1β affinity determination

| Samples | huIL-18 $K_D$ [pM] Assay A | huIL-18 $K_D$ [pM] Assay B | marIL-18 $K_D$ [pM] Assay A | marIL-18 $K_D$ [pM] Assay B | huIL-1β $K_D$ [pM] Assay A | huIL-1β $K_D$ [pM] Assay B | marIL-1β $K_D$ [pM] Assay A | marIL-1β $K_D$ [pM] Assay B |
|---|---|---|---|---|---|---|---|---|
| mAb1 | 13.5 | 11.4 | 27.1 | 26.3 | n/a | No binding | n/a | No binding |
| mAb2 | n/a | No binding | n/a | No binding | 1.1 | 3.2 | 0.8 | 4.8 |
| bbmAb1 | 14.8 | 19.5 | 47.9 | 44.2 | 3 | 0.5 | 2 | 0.6 |

TABLE 7

Mean IC50 values for IL-18 neutralization by bbmAb1 in comparison to mAb1 in KG-1 cells and human PBMC.

| IL-18 inhibition | IFNγ prod.** KG-1 cells IC$_{50}$ [nM] | IFNγ prod.** PBMC IC$_{50}$ [nM] |
| --- | --- | --- |
| mAb1 | 0.035 ± 0.011 | 0.78 ± 0.49 |
| bbmAb1 | 0.071 ± 0.046 | 0.87 ± 0.51 |

**Inhibition of IFNγ production in KG-1 cells or PBMC stimulated with recombinant human IL-18 (3 nM) and human IL-12 (1 ng/ml). Shown are mean values ± SEM (n = 3 KG-1 and n = 4 PBMC)

bbmAb1 was able to neutralize simultaneously the bioactivity of both IL-1β and IL-18 as demonstrated with the HEK Blue™ reporter cells producing SEAP in response to a 1+1 stimulation with recombinant IL-1β and IL-18 (Table 8). A similar inhibition of SEAP in this assay system was only achievable by the combination of mAb2 and mAb1 but not by the use of the individual antibodies.

TABLE 8

Mean IC50 values for simultaneous neutralization of IL-1β and IL-18 on SEAP reporter activity in HEK Blue ™ cells. Shown are means ± SEM of n = 5 experiments.

| Inhibition of SEAP in HEK reporter cells stimulated simultaneously with IL-1β and IL-18 | IC$_{50}$ [nM] |
| --- | --- |
| mAb2 or mAb1 alone | >30 |
| mAb2 and mAb1 combined | 0.24 ± 0.09 |
| bbmAb1 | 0.71 ± 0.28 |

(d) Neutralizing Activity of bbmAb1 on Marmoset IL-1β and Marmoset IL-18 in Marmoset Cell Assays In order to demonstrate the inhibitory activity of bbmAb1 in marmoset, similar in vitro assays were performed with marmoset cells as with human cells however using recombinant marmoset IL-1β and IL-18 for stimulation. When assessing the inhibition of recombinant marmoset IL-1β-induced IL-6 production in marmoset dermal fibroblasts, bbmAb1 displayed sub-nM potency with 2- to 3-fold higher IC50 values compared to mAb2 (Table 9). Testing bbmAb1 with human dermal fibroblasts stimulated with marmoset IL-1β generated a similar inhibition profile as with human IL-6.

TABLE 9

Inhibition of recombinant marmoset IL-1β induced IL-6 production in marmoset and human fibroblasts by bbmAb1.

| Marmoset IL-1β | IL-6 prod.* marmoset dermal fibroblasts IC$_{50}$ [nM] | | IL-6 prod.* human derm. fibroblasts IC$_{50}$ [nM] |
| --- | --- | --- | --- |
| | Exp. A | Exp. B | Exp. C |
| bbmAb1 | 0.174 | 0.364 | 0.220 |
| mAb2 | 0.095 | 0.138 | 0.114 |

*Inhibition of IL-6 production in marmoset or human dermal fibroblasts stimulated with recombinant marmoset IL-1β (18 pM). Results of 3 individual experiments (A, B and C) are shown.

Single to double digit nM IC50 values of bbmAb1 confirmed the neutralizing activity of bbmAb1 for marmoset IL-18 tested in the IFNγ production assay with marmoset blood cells (Table 3-7). Testing bbmAb1 with human PBMC stimulated with marmoset IL-18 generated a similar inhibition profile when measuring the production of human IFNγ.

Thus, bbmAb1 was shown to be fully cross-reactive to marmoset IL-1β and marmoset IL-18 in functional assays using marmoset responder cells.

TABLE 10

Mean IC50 values for inhibition of recombinant marmoset IL-18 induced IFNγ production in marmoset whole blood or human PBMC.

| Marmoset IL-18 | IFNγ prod.** Marmoset blood IC$_{50}$ [nM] | IFNγ prod.** Human PBMC IC$_{50}$ [nM] | Marmoset IL-18 conc. used |
| --- | --- | --- | --- |
| bbmAb1 | 10.0 ± 4.1 | | 1 nM |
| mAb1 | 4.7 ± 2.6 | | 0.3 nM |
| mAb1 | 181 ± 108 | | 3 nM |
| mAb1 | | 6.6 ± 5.0 | 1 nM |

**Inhibition of IFNγ production in marmoset whole blood (n = 3 each compound/condition) or human PBMC (n = 6) stimulated with recombinant marmoset IL-18 (concentration indicated) & human IL-12 (10 ng/ml). Shown are mean values ± SEM It was demonstrated that bbmAb1, a KiH format IL-1β/IL-18 bi-specific mAb retains the high affinity binding as well as the cytokine neutralizing potency to the two individual targets IL-1β and IL-18 when compared to the original mAbs, mAb2 and mAb1, in a variety of different cell assays. The dual IL-1β and IL-18 neutralizing properties of bbmAb1 were not only demonstrated for the human cytokines/cells but also for the corresponding marmoset cytokines/cells, facilitating appropriate toxicology studies. The up to 2- to 4-fold higher IC50 values that were generated in some of the cellular assays for IL-1β and IL-18 neutralization may be the consequence of the monovalent binding of bbmAb1 as opposed to bi-valent binding of mAb2 and mAb1, respectively. Nevertheless, the dual cytokine neutralization by bbmAb1 may result in additive or synergistic inhibitory activities in vivo that may not be adequately represented in our in vitro cellular systems.

Example 3: Effects of Combined IL-1β and IL-18 Stimulation and Blockade in PBMC

Inflammasome activation-dependent cleavage of the effector cytokines IL-1β and IL-18 leads to the induction of secondary pro-inflammatory mediators and promotes immune cell recruitment/activation not only systemically but also at the site of inflammation. In two different mouse models for lethal systemic inflammation (a) LPS injection model and (b) FCAS mice (activating missense mutations in NLRP3), the simultaneous absence/inhibition of both IL-1β and IL-18 was more protective from lethality compared to the single IL-1β or single IL-18 absence/inhibition, demonstrating additive or synergistic mechanisms for immune activation (Brydges 2013, van den Berghe 2014). bbmAb1 is a human/marmoset IL-1β/IL-18 reactive bi-specific mAb with no rodent cross-reactivity and thus cannot be tested in mouse models. Therefore, we used LPS/IL-12 to mimic inflammasome-dependent pathway activation in vitro for the stimulation of human PBMC to reveal additive or synergistic inhibitory effects of combined IL-1β/IL-18 neutralization by bbmAb1 and performed a non-biased gene expression analysis using microarrays. As a complementary activity we also compared the gene expression profiles of PBMCs from different donors stimulated with either the combination of recombinant IL-1β and recombinant IL-18 or the single cytokines alone.

(3) Materials and Methods
(a) Cell Culture and ELISA
   RPMI 1640 (Invitrogen #31870 or Gibco #61870-010) supplemented with 10% Foetal Bovine Serum (Invitrogen #10108-157), 1% L-Glutamine (Invitrogen #25030-03), 1% penicillin/streptomycin (Invitrogen #15140-148), 10M 2-Mercaptoethanol (Gibco #31350-010), 5 mM Hepes (Gibco #15630-080)

Recombinant Human IL-1β was purchased from Sino Biological Inc. (#10139-HNAE-5)
Recombinant human IL-18 was purchased from MBL (#B001-5)
Recombinant human IL-12 was purchased from Biolegend (#573008)
IFNγ ELISA: MAX Standard Set, BioLegend, #430103 or BD OptEIA human IFNγ ELISA Set, BD #555142
IL-6 ELISA: MAX Standard Set, BioLegend, #430503
IL-26 ELISA: Cloud Clone Corp #SEB695Hu
mAb2 as described in section IL-1β antibody.
mAb1 as described in section IL-18 antibody.
bbmAb1 as described in Example 1.
LPS from *Salmonella enterica* serotype *enteritidis*, Sigma #L7770
PBMC were isolated from buffy coats that were obtained from the Blutspendezentrum Bern Round-bottomed, tissue-culture treated 96-well plates (Costar #3799) Flat-bottomed, tissue-culture treated 96-well plates (Costar #3596) Ficoll-Pacque™ Plus (GE Healthcare Life Sciences #17-1440-02) PBS 1×, without Calcium & Magnesium (Gibco #14190094)
Falcon 15 ml polypropylene conical tubes (BD #352096) Falcon 50 ml polypropylene conical tubes (BD #352070)
Leucosep™ tubes with porous barrier, 50 ml, Greiner bio-one #227290
Cell strainer 70 μM, BD Biosciences #352350
Trypanblue, Sigma #T8154
RNA isolation, quantity and quality measurements and qPCR:
Nuclease-free water, Ambion #AM9938
Rnase Zap, Ambion #AM9780
1.5 ml Eppendorf tubes, sterile, Rnase & Dnase free
RLT buffer, Qiagen #1015762
Rneasy Mini Kit, Qiagen #74104
RNase-Free DNase Set, Qiagen #79254
Agilent RNA 6000 Nano Kit, Agilent #5067-1511
Chip priming station, Agilent #5065-4401
IKA vortex mixer
RNaseZAP®, Ambion #9780
Agilent 2100 Bioanalyzer
High Capacity cDNA reverse transcription kit, Applied Biosystems, #PN4374966
Nase-free, Thin-Walled, forsted Lid 0.2 ml PCR tubes, Ambion #AM12225
MicroAmp Optical 384 well reaction plate, Applied Biosystems #4309849
TaqMan GenEx Master Mix, Applied Biosystems #4369514
PCR primer (Applied Biosystems)

| Target | Assay ID Taqman | color/quencher |
|---|---|---|
| IFNγ | Hs00989291_m1 | FAM-MGB |
| IL-26 | Hs00218189_m1 | FAM-MGB |
| RPL27 | Hs03044961_g1 | FAM-MGB |
| HPRT1 | Hs02800695_m1 | FAM-MGB |

PBMC preparation: PBMCs were isolated from buffy coat by means of Ficoll-Paque gradient centrifugations in Leucosep tubes according to the manufacturer's instructions. Briefly, 15 mL of Histopaque was put in 50 mL Leucosep™ tubes and centrifuged for 30 sec at 1300 rpm at RT. With a pipette, 30 ml of a diluted suspension of the buffy coat was added on the top of the Histopaque solution and centrifuged during 15 min at RT at 1000 g without break. Plasma was discarded (approx. 20 ml) and the interface ring collected (=human PBMC) and transferred in a 50 ml falcon tube. The tube was filled with 50 ml of sterile PBS and centrifuged once at 1200 rpm during 5 min at RT. This centrifugation was repeated 2 times. The supernatant was gently discarded and cells re-suspended in 50 ml of PBS with 2% FCS and 2 mM EDTA. The cell suspension was filtered using a 70 μm cell strainer and cells counted using trypan blue staining (500 μL of trypan blue+200 μL of cells+300 μL of PBS).

LPS/IL-12 stimulation of PBMC: Cytokine production in supernatants was prepared according to the following. 250 000 cells/well in 100 μl final volume were distributed in 96-well round bottom plates. LPS was used at concentrations between 0.3 μg/ml and 3000 μg/ml together with recombinant IL-12 at 10 ng/ml. Supernatants were harvested after 24 h at 37° C. and 10% $CO_2$.

RNA extraction from cell pellets was performed according to the following. $3\times10^6$ cells/well in 1000 μl final volume were distributed in flat bottom 24-well plates. LPS was used at 3 μg/ml together with recombinant IL-12 at 10 ng/ml. Cells were harvested after 24 h at 37° C. and 10% $CO_2$.

Stimulation of PBMC with recombinant cytokines: $7\times10^6$ PBMC per well of a 12-well plate were used in 1.5 ml final of complete RPMI medium. Recombinant cytokines were added at the following final concentrations: 10 ng/ml of recombinant IL-1β, 3 nM of recombinant IL-18, 1 ng/ml of recombinant IL-12. Both, supernatants as well as cells were collected after 4 h and 24 h at 37° C. and 10% $CO_2$.

RNA isolation, quantity and quality assessments: Cells were pelleted and the pellet lysed in 350 μl of Qiagen RTL buffer with 2% β-mercaptoethanol and frozen at −20° C. or −80° C. until all samples of the study have been collected. The RNA isolation was performed using the Qiagen standard protocol. Briefly, 350 μl of 70% Ethanol was added in all samples prior to the transfer to the RNeasy spin column and centrifuged for 15 s at 8000 g. After discarding the flow-through, 350 μl of buffer RW1 was added and the column centrifuged for 15 s at 8000 g to wash the spin column membrane. DNase I incubation mix solution was prepared according to the manufacturer's instructions and added to the RNeasy spin column and incubated for 15 min at RT. After washes with 350 μl and 500 μl of buffer RW1, the RNeasy spin column was placed in new 2 ml collection tube and centrifuged at full speed for 1 min. RNA was finally collected by adding 35 μl RNase-free water directly to the spin column membrane and a centrifugation for 1 min at 8000 g to elute the RNA. The amount of RNA was measured using Nanodrop ND-1000 and the RNA was stored at −20° C. RIN measurements were performed for the RNA quality assessment according to manufacturer's instructions. Briefly 1 μl of RNA or ladder were pipetted into an Agilent RNA 6000 Nano chip and measured by using the Agilent 2100 Bioanalyser.

Cytokine Gene Expression Analysis by qPCR:

The method was performed corresponding to the manufacturer's instructions. Briefly, 400 ng of RNA was reverse transcribed according to the instructions using the High-Capacity cDNA Reverse Transcription Kit. The cDNA solutions were diluted 1/10 in RNA/DNA free water and 1 μl cDNA was transferred into a 384-well reaction plate and then mixed with 1 μl of 20× TaqMan® Gene Expression Assay target FAM gene and 10 μl of 2× TaqMan® Gene Expression Master Mix and 10 μl RNA/DNA free water. The plate was loaded onto the Applied Biosystems ViiA™ 7 Real-Time PCR System and the following instrument settings were used:

| Plate document/experiment parameters | Thermal cycling conditions | | |
|---|---|---|---|
| | Stage | Temp (° C.) | Time (mm:ss) |
| Rxn. Volume: 20 µL | Hold | 50 | 2:00 |
| Ramp rate: Fast | Hold | 95 | 0:20 |
| | Cycle (40 cycles) | 95 | 0:01 |
| | | 60 | 0:20 |

The house keeping genes used for this study were HPRT1 and RLP27. The following formula was used to calculate the relative expression levels of target genes:

1) $Ct[Ref] = (Ct[HPRT] + Ct[RLP27])/2$

2) $dCt[Ref] = 40 - Ct[Ref]$

3) $dCt[\text{Target}] = Ct[\text{Target}] - Ct[Ref]$

4) $ddCt = dCt[Ref] - dCt[\text{Target}]$

5) Relative target gene expression = $2\wedge ddCt$

Microarrays was performed according to the following. Samples were processed by CiToxLAB France on Affymetrix HG_U133_Plus2 microarrays. They were RMA normalized and analyzed in GeneSpring 11.5.1 (Agilent Technologies, Santa Clara, CA). Pathway analysis was done using Ingenuity Pathway Analysis (IPA) and Nextbio (Illumina). The two datasets were treated independently.

Initially, the data were subject to standard quality control (QC) by CiToxLAB, in-house QC by using an R script (MA_AffyQC.R) in Rstudio suite and in GeneSpring (PCA, hybridization controls). Subsequently, it was filtered to eliminate unreliable expression levels: Entities (probesets) were kept where at least 100 percent of samples in any 1 of the experimental conditions have values above the 20th percentile.

Differentially expressed genes (DEG) were identified using the "filter on volcano plot" feature in GeneSpring. Using the filtered genes (expression between 20.0-100.0th percentiles) with an unpaired T-test, probesets with a corrected p-value below 0.05 and a fold change above 2.0 were considered differentially expressed. Where possible, i.e. in the study with LPS (NUID-0000-0202-4150) a Benjamini-Hochberg Multiple Testing Correction was used.

For cytokine stimulation experiments, synergism was calculated using the following formula: Signal A+B/(Signal A+Signal B−Control)≥1.5

The respective signatures (or DEG lists) were used to calculate p-values with a Fisher's exact test which represent the statistical significance of observing an overlap between the signature and the 'disease gene list' (lesional vs non-lesional) of public datasets. To do so, the lists were uploaded into Illumina Base Space Correlation Engine (former Nextbio) and compared using the Meta-Analysis feature and keyword search for diseases.

All Data were exported to EXCEL software and IC50 values calculated by plotting dose-response curves for the logistic curve fitting functions using either EXCEL/XLfit4 or GraphPad Prism software. Differences between treatment groups were analyzed by one-way ANOVA followed by Dunnett's multiple comparison using GraphPad Prism software and results were considered statistically significant at p<0.05.

(4) Results (a) bbmAb1 is Highly Efficacious in Inhibiting LPS/IL-12 Induced IFNγ Production in Whole Blood Exposure of human whole blood to LPS supplemented with 10 ng/ml IL-12 results in an IFNγ response that is largely but not exclusively dependent on the "native" IL-18 produced by the blood cells. The addition of IL-12 enhances the LPS induced IFNγ responses, likely by up-regulating IL-18 receptors on responder cells.

In the experimental conditions used, IL-18 neutralization with mAb1 lead only to an incomplete inhibition of IFNγ production whereas IL-1β blockade (using mAb2) had only small effects on the IFNγ response. Interestingly, the combined inhibition of IL-1β and IL-18 either by bbmAb1 or the combination of mAb2 and mAb1 was more profoundly and completely inhibiting IFNγ production compared to the single cytokine neutralization.

Apart from IFNγ, none of the other cytokines tested (IL-2, -4, -6, -8, -10, -13 and TNFα) were additively inhibited by the combined neutralization of IL-1β and IL-18 in our cell assay (data not shown). The potency of bbmAb1 was in the same range as the combination (combo) of mAb2 and mAb1, considering the monovalent format of the bispecific molecule.

(b) IFNγ is Additively Inhibited by bbmAb1 (i.e. Combined IL-1β/IL-18 Inhibition) Compared to Single IL-1β or IL-18 Inhibition in LPS/IL-12 Activated Human PBMC An unbiased transcriptomics evaluation was required in order to reveal further additive effects (apart of IFNγ) by combined IL-1β/IL-18 inhibition using bbmAb1. Since whole blood is not optimal for transcriptomics analysis we adapted the LPS/IL-12 stimulation assay conditions, described in the materials and method section above, to human PBMC samples. By using PBMCs from a total of 9 donors, we could confirm that bbmAb1 additively inhibited IFNγ protein secretion into the supernatants of the PBMCs. Compared to whole blood experiments, IFNγ production was inhibited at approximatively 10-fold lower concentrations of the respective mAbs used. Importantly, a similar inhibition pattern was demonstrated at the mRNA level for IFNγ which confirmed the suitability of the samples for a non-biased microarray based gene expression analysis. Data shows the inhibition of LPS (0.3 µg/ml)/IL-12 induced IFNγ protein production and IFNγ gene expression by bbmAb1, mAb2 and mAb1 (at 10 nM conc. each) in human PBMC.

The Affymetrix microarray was conducted with n=5 individual donors from PBMCs that were sampled from the LPS/IL-12 stimulation experiments described in the materials and method section above. Unfortunately, the overall assessment of the gene expression profiles evidenced a strong LPS/IL-12 stimulation effect and the PCA showed clustering per donor rather than compound within the stimulated or unstimulated groups. Nevertheless, comparing the LPS/IL-12 stimulated samples with the stimulated plus bbmAb1 for differentially expressed genes revealed a shortlist of genes that are downregulated by the combined IL-1β/IL-18 blockade with bbmAb1 (Table 11). Apart from the strong downregulation of the IFNγ gene that re-validated our microarray data, also the IL-26 gene was a further cytokine gene additively inhibited by bbmAb1 compared to the single IL-1β inhibition (by mAb2) or IL-18 inhibition (by mAb1). Microarray data derived gene expression levels for IFNγ and IL-26 and the inhibition by bbmAb1, mAb2 and mAb1 (10 nM each) in LPS (0.3 µg/ml)/IL-12 stimulated PBMC at 24 h was observed.

TABLE 11

Differentially expressed genes (downregulated genes only between the bbmAb1 and control group in LPS/IL-12 stimulated samples).

| Probe Set ID | Gene Symbol | Entrez Gene | p-value | FC |
|---|---|---|---|---|
| 222974_at | IL22 | 50616 | 0.03188 | 6.6 |
| 221111_at | IL26 | 55801 | 0.00224 | 5.2 |
| 223939_at | SUCNR1 | 56670 | 0.00234 | 4.0 |
| 1560791_at | | OTTHUMG00000010886 | 0.03660 | 3.7 |
| 211122_s_at | CXCL11 | 6373 | 0.02954 | 3.5 |
| 203915_at | CXCL9 | 4283 | 0.02211 | 3.4 |
| 235229_at | | | 0.02400 | 3.3 |
| 210163_at | CXCL11 | 6373 | 0.02707 | 3.2 |
| 210354_at | IFNG | 3458 | 0.00007 | 2.9 |
| 243541_at | IL31RA | 133396 | 0.01200 | 2.5 |
| 236003_x_at | OR2I1P | | 0.04942 | 2.4 |
| 203131_at | PDGFRA | 5156 | 0.00161 | 2.4 |
| 219991_at | SLC2A9 | 56606 | 0.00191 | 2.4 |
| 201860_s_at | PLAT | 5327 | 0.00139 | 2.3 |
| 205692_s_at | CD38 | 952 | 0.04855 | 2.3 |
| 1555600_s_at | APOL4 | 80832 | 0.02610 | 2.3 |
| 215305_at | PDGFRA | 5156 | 0.01180 | 2.2 |
| 236191_at | | | 0.04037 | 2.1 |
| 204533_at | CXCL10 | 3627 | 0.04847 | 2.1 |
| 229915_at | FAM26F | 441168 | 0.02912 | 2.0 |
| 210072_at | CCL19 | 6363 | 0.02827 | 2.0 |
| 236101_at | | | 0.03246 | 2.0 |

FC = fold change.

(c) IL-26 is Another Pro-Inflammatory Cytokine Additively Inhibited by bbmAb1 in LPS/IL-12 Stimulated PBMC To further confirm that LPS/IL-12 driven IL-26 gene expression and protein production is most efficiently inhibited by combined IL-1β/IL-18 blockade using bbmAb1, the study was extended to a total of n=9 PBMC donors and investigated IL-26 gene expression by qPCR and IL-26 protein production by ELISA. The results largely confirmed the inhibition of IL-26 gene expression obtained with the microarray approach. Interestingly, IL-26 protein levels in supernatants were only partly reduced at 24 h by the addition of the mAbs. The reasons for this differences are unknown, could however be related to kinetic differences between IL-26 gene expression and protein production as well as differences in the consumption of IL-26 compared to IFNγ. Nevertheless, bbmAb1 was superior in reducing IL-26 protein levels in the PBMC supernatants compared to mAb2 and mAb1. Results demonstrated the inhibition of LPS (0.3 μg/ml)/IL-12 induced IL-26 gene expression (by qPCR) and IL-26 protein levels by bbmAb1, mAb2 and mAb1 (10 nM each) in human PBMC.

(d) IL1β/IL18 Signaling Signatures Correlate with Disease

Previously established PBMC culture conditions where recombinant IL-1β stimulation resulted in either IL-6 production or recombinant IL-18/IL-12 stimulation resulted in IFNγ production was combined to reveal additive or synergistic downstream target genes or signatures (data not shown). With PBMCs from n=4 donors sampled at two different time points (6 h and 24 h) an Affymetrix microarray evaluation for unbiased assessment of the gene expression profiles was conducted. Genes that were synergistically upregulated at 6 h and at 24 h with the combined stimulation by IL-1β and IL-18 were revealed (data not shown). The addition of IL-12 to the IL-1β/IL-18 combination largely increased the synergy for a series of upregulated genes. The generated signalling signatures of single or combined IL-1β/IL-18 pathway stimulation (UP-regulated genes only) were used to interrogate dataset from patients across several autoimmune diseases. For example, correlation to public sarcoidosis datasets was observed. P-values (calculated with a Fisher's exact test) show a significant correlation to several public studies comparing healthy to diseased tissues from sarcoidosis patients. Tissues include skin as well as lung, lacrimal glands and anterior orbit. Across all datasets, the combination of IL1β/IL18 signaling shows the best correlation to disease, followed by IL-1β and IL-18. IL-1β/IL-18 differentially up-regulated genes (DEG) in PBMC (x-axis) compared to 5 different sarcoidosis tissue 'diseased vs healthy' DEG. P-values (y-axis) represent the statistical significance of observing an overlap between the signature and the 'disease gene list'. Black bar is skin from cutaneous sarcoidosis lesion vs skin from healthy patients. Light grey bar is skin from cutaneous sarcoidosis lesion vs non-lesioned skin. White bar is lacrimal glands from sarcoidosis patients vs normal. Dark grey bar is anterior orbit tissues from sarcoidosis patients vs normal. Striped bar is lung samples with progressive fibrotic, pulmonary sarcoidosis vs nodular self-limiting pulmonary sarcoidosis.

(e) Conclusion

LPS and recombinant IL-12 was used to mimic pathogen associated molecular pattern (PAMP)-dependent NLRP3 inflammasome activation within the first 24 h of in vitro culture. It was demonstrated that combined inhibition of IL-1β and IL-18, by using bbmAb1, acts additively to decrease/inhibit IFNγ production in PBMC stimulated with LPS/IL-12. IL-12 was previously described to act synergistically with IL-18 to induce IFNγ production in T, B, NK cells, macrophages and dendritic cells (as reviewed by Nakanishi, 2001) but now an additional stimulatory effect of IL-1β on IFNγ production could be demonstrated under the experimental conditions used. Thus, the co-incubation of PBMC with LPS/IL-12 drives efficiently the production of "native" IL-1β and IL-18 which contribute both to a strong IFNγ response. By using unbiased microarray transcriptomics, additional genes were identified that were additively down-regulated by combined IL-1β/IL-18 neutralization vs. single IL-1β or IL-18 blockade. Amongst those was IL-26, a member of the IL-20 cytokine subfamily (IL-19, IL-20, IL-22, IL-24, and IL-26), which is conserved in most vertebrate species but absent in most rodent strains (including mice and rats) (Donnelly 2010). It signals through a heterodimeric receptor complex composed of the IL-20R1 and IL-10R2 chains. IL-26 receptors are primarily expressed on non-hematopoietic cell types, particularly epithelial cells. Increased levels of IL-26 were reported in serum and particularly in the synovial fluid of RA patients where it could act as factor to promote Th17 cell growth and differentiation. Unfortunately, the discovery of further genes/pathways induced by the combined blockade of IL-1β and IL-18 was hampered by the strong effect of the LPS/IL-12 stimulation of the PBMC samples. Nevertheless, both IFNγ and IL-26 and to some extend also IL-22 were also among the genes that were synergistically upregulated by the combined stimulation with recombinant IL-1β and IL-18 in PBMC, confirming that these two factors are downstream effectors in this activation pathway. Thus, the IL-20 subfamily of cytokines (including IL-26 and IL-22) seems to be strongly dependent on the simultaneous signals from IL-1β and IL-18. With all due caution about selectivity of the individual signalling signatures as well as potential efficacy of blocking, these comparisons are useful to show that the respective pathways are active in various inflammatory diseases.

Example 4: Therapeutic Use

A three-period multicenter study, with a, randomized-withdrawal, double-blind, placebo-controlled design in Period 2 to evaluate the clinical efficacy, safety and tolerability of bbmAb1 in NLRC4-GOF patients

| | Protocol summary |
|---|---|
| Full Title | A three-period multicenter study, with a, randomized-withdrawal, double-blind, placebo-controlled design in Period 2 to evaluate the clinical efficacy, safety and tolerability of bbmAb1 in NLRC4-GOF patients |
| Brief title | Study to evaluate the efficacy and safety of bbmAb1 in NLRC4-GOF patients |
| Sponsor and Clinical Phase | Novartis Phase II |
| Investigation type | Drug |
| Study type | Interventional |
| Purpose and rationale | The study is a phase 2 trial designed to evaluate the clinical efficacy, safety and tolerability of bbmAb1 in patients with NLRC4-Gain of Function (GOF). |
| Primary Objective(s) | The primary objective is to determine the efficacy of bbmAb1 in prevention of flares in NLRC4-GOF patients. |
| Secondary Objectives | The secondary objectives of the study are:<br>To evaluate the safety and tolerability of bbmAb1 in patients with NLRC4-GOF.<br>To evaluate the efficacy of bbmAb1 to improve the clinical status of NLRC4-GOF patients.<br>To evaluate the efficacy of bbmAb1 to achieve serological remission.<br>To evaluate the effects of bbmAb1 on concomitant glucocorticoid administration.<br>To evaluate the effect of bbmAb1 on the time to first flare in patients with NLRC4-GOF.<br>To evaluate the efficacy of bbmAb1 to improve the signs and symptoms of NLRC4-GOF.<br>To evaluate the effect of bbmAb1 on patient reported outcomes in patients with NLRC4-GOF overtime. |
| Study design | This is a three-period study, with an open-label, single-arm active treatment in Period 1 followed by a randomized-withdrawal, double-blinded, placebo-controlled design in Period 2, and an open label, long-term safety follow-up in Period 3. The total study duration is approximately 3-4 years. The study includes:<br>Screening Period of approximately 30 days.<br>Baseline Period that may be combined with Day 1 prior to dosing.<br>Period 1. Open-Label Treatment Period to identify responders to bbmAb1. Period 1 is divided into 3 sub-parts:<br>Period 1a, a 4-week treatment phase to stabilize patients on bbmAb1 treatment.<br>Period 1b, a 20-week phase to gradually taper the dose of concomitant glucocorticoid treatment and discontinue cyclosporin treatment while on continued bbmAb1 treatment.<br>Period 1c, a 4-week phase to maintain patients on stable low doses of glucocorticoids while on continued bbmAb1 treatment.<br>Period 2. Randomized Withdrawal Period consists of a 24-week randomized treatment withdrawal period to primarily assess the efficacy of bbmAb1 compared to placebo.<br>Period 3. Long-Term Safety, Open-Label Treatment consists of a 3-year long term-safety, open-label treatment with bbmAb1 following withdrawal or completion of Period 2.<br>End of Study/Safety Follow-up: will be performed 16 weeks after the last dose of study treatment. |
| Study population | This study will enroll approximately 8 male or female pediatric patients (≤17 years) with NLRC4-GOF associated disease in Period 1 of the study, in order to randomize approximately 8 patients in Period 2 of the study. |
| Key Inclusion criteria | 1. Male and female patients aged ≤17 years weighing at least 3 kg, at the time of Screening which begins when parent(s)/legal guardian(s) have provided written informed consent.<br>2. Written informed consent by parent(s)/legal guardian(s) for the pediatric patients and assent by the pediatric patient (depending on local requirements) must be obtained before any study-specific assessment is performed.<br>3. Patients with genetic diagnosis of NLRC4-GOF (this analysis may be performed as part of Screening procedures if not already available).<br>4. Clinical history and investigations consistent with autoinflammation with infantile enterocolitis (AIFEC/NLRC4-GOF), including elevated IL-18 levels (this analysis may be performed as part of Screening procedures if not already available).<br>5. At first treatment, evidence of active disease as assessed by:<br>a. PGA of disease activity > minimal<br>and<br>b. Ferritin >600 ng/ml<br>or<br>c. elevation of CRP >20 mg/l. |

| | Protocol summary |
|---|---|
| Key Exclusion criteria | 1. History of hypersensitivity to any of the study drugs or to drugs of similar chemical classes or to any of the excipients.<br>2. Signs and symptoms, in the judgment of the investigator, of clinically significant systemic recurrent and/or evidence of active bacterial, fungal, parasitic or viral infections.<br>COVID-19 specific: If in line with health and governmental authority guidance, it is highly recommended that testing to exclude COVID-19 using PCR or comparable approved methodology be completed within 1 week prior to first dosing.<br>3. Any conditions or significant medical problems, which in the opinion of the investigator places the patient at unacceptable risk for bbmAb1 therapy<br>4. Previous treatment with anti-rejection and/or immunomodulatory drugs within the past 28 days or 5 half-lives (whichever is the longer) for immunomodulatory therapeutic antibodies (or as listed in the prohibited medications section) prior to bbmAb1 treatment. The exceptions are:<br>Stable dose of glucocorticoids ≤1.0 mg/kg/day (maximum 60 mg/day for children over 60 kg) in 1-2 divided doses of oral prednisone (or equivalent) for at least 3 days prior to treatment with bbmAb1<br>Stable dose of cyclosporin ≤5 mg/kg/day for at least 3 days prior to treatment with bbmAb1<br>Anakinra, canakinumab, emapalumab and/or investigational IL-18/IL-1/IFN-γ binding or blocking therapy, must be discontinued (see prohibited medication section). As soon as the criteria for evidence of active disease, patients can receive bbmAb1 treatment (per inclusion 7).<br>5. Participation in any other investigational trials within 4 weeks prior to dosing or longer if required by local regulation with the exception of treatment with anakinra, canakinumab, emapalumab and/or investigation IL-18/IL-1/IFN-γ binding or blocking therapy.<br>6. A positive HIV test result at Screening. Evidence of prior testing within 3 months is sufficient.<br>7. A positive Hepatitis B surface antigen (HBsAg) or Hepatitis C test result. Evidence of prior testing within 3 months is sufficient.<br>8. Presence of tuberculosis infection as defined by a positive TB test at Screening. Evidence of prior testing within 3 months is sufficient.<br>9. Live vaccinations within 1 month prior to bbmAb1 treatment, during the trial, and up to 3 months following the last dose.<br>10. History of malignancy of any organ system (other than localized basal cell carcinoma of the skin or in-situ cervical cancer), treated or untreated, within the past 5 years, regardless of whether there is evidence of local recurrence or metastases.<br>11. Pregnant or nursing (lactating) females, where pregnancy is defined as the state of a female after conception and until the termination of gestation, confirmed by a positive hCG laboratory test<br>12. Female patients of child-bearing potential (or Tanner stage 2 or above) who are or might become sexually active, must be informed of the potential teratogenic risk with bbmAb1 and the need and agree to use highly effective contraceptive methods to prevent pregnancy while on bbmAb1 therapy |
| Study treatment | Period 1 - Open-Label Treatment Period<br>bbmAb1 10 mg/kg q2w i.v.<br>Period 2 - Randomized Withdrawal Period<br>In a ratio of 1:1, responsive patients will be assigned to either:<br>bbmAb1 10 mg/kg q2w i.v., or<br>Matching placebo q2w i.v.<br>Period 3 - Long Term Safety<br>BBMAB1 10 mg/kg q2w i.v. |
| Treatment of interest | The randomized study treatment (the investigational treatment of BBMAB1 or placebo). |
| Efficacy assessments | Physician Global Assessment of Disease (PGA)<br>Response to treatment criteria through PGA and inflammatory markers (complete or partial response, and flare criteria)<br>Inflammatory markers (CRP and ferritin)<br>Patient's/Parent's global assessment of disease activity (PPGA)<br>Physician's Severity Assessment of Disease Signs and Symptoms |
| Key safety assessments | Physical examination (complete and short)<br>Vital signs<br>Growth (height/length and weight, head circumference)<br>Laboratory evaluations including hematology, chemistry, coagulation<br>ECG<br>Pregnancy and assessment of fertility<br>Tanner staging<br>Adverse event monitoring |

| | Protocol summary |
|---|---|
| Other assessments | Immunogenicity (IG)<br>Pharmacodynamic biomarkers (include but are not limited to total IL-1β, total IL-18, free IL-18, IL-18BP)<br>Immune pharmacodynamic or disease biomarkers (including but are not limited to CXCL9, CXCL10 (IP-10), IL-6, sIL2R<br>Serum concentrations of BBMAB1 (PK)<br>Protein profiling of serum samples<br>Genetic variants of relevant genes<br>Calprotectin fecal concentrations |
| Data analysis | The primary endpoint for assessing the efficacy of BBMAB1 compared to placebo is the proportion of patients with disease flare during the 24 week randomized withdrawal phase, where flare is assessed by the PGA, ferritin and/or CRP. The two treatment groups will be compared using the Fisher's exact test. The overall difference in proportions between treatment groups will be estimated. The following statistical hypothesis will be tested:<br>$H_0$: difference in proportions = 0, i.e. the probability of having disease flare is the same for both groups, versus<br>$H_A$: difference in proportions ≠ 0, i.e. the probability of having disease flare is different for both groups<br>In addition to the exact two-sided p-value, the two-sided 95% confidence interval (Clopper – Pearson) for the difference in proportions will be calculated. |
| Key words | NLRC4-GOF, AIFEC, enterocolitis, autoinflammation, MAS (Macrophage Activation Syndrome) |

1. Introduction
1.1. Background

In an infant who had presented NLRC4-GOF acutely six weeks after birth, the combination of anti-IL-1β (10 mg/kg/day of the IL-1 receptor antagonist anakinra) and recombinant IL-18BP (tadekinigalfa, administered under an emergency compassionate-use Investigational New Drug authorization from the FDA) was reported as clinically efficacious. The infant's clinical improvement within 48-72 hours was associated with a reduction of free IL-18 and CRP (indicating neutralization of IL-1β) in circulation emphasizing the importance of neutralization of both free IL-18 and IL-1β to treat the 10 disease. Approximately 11 days after commencing the combination treatment the patient returned to enteral feeding and was successfully gradually weaned off cyclosporin and glucocorticoids. The patient was reported to be well after 11 months of combined IL-1β and IL-18 blockade, having been vaccinated (except live vaccines), tolerating well typical childhood infections (Canna et al 2017).

Another NLRC4-GOF patient who presented at 11 days of age with high grade fever, urticaria-like rash and elevated CRP was treated over a 10-week period with multiple immunosuppressive without response, only when treated with a combination of anakinra (IL-1 receptor antagonist) and rhIL-18BP there was a clinical improvement, though end organ damage limited further treatment indicating the importance of early treatment of patients to prevent irreversible organ damage (Moghaddas et al 2018).

Summary

These cases in infants have prompted an evaluation of IL-18BP (tadekinigalfa) treatment in combination with standard of care including either anakinra or canakinumab in an ongoing clinical trial in pediatric patients (aged from birth to 17 years) with NLRC4-GOF (NCT03113760). In comparison, a bispecific antibody that simultaneously targets IL-18 and IL-1β is expected to allow for a significantly reduced dose frequency in NLRC4-GOF pediatric patients, with administration every 2 weeks and treatment with a single agent compared to the more complex investigational combination requiring anti-IL-1β (every two weeks for canakinumab or every day for anakinra) potentially with glucocorticoids, cyclosporin and IL-18BP (every two days). In addition, for bbmAb1, the present inventors hypothesize that combined simultaneous IL-1β and IL-18 neutralization could more potently attenuate IFN-γ (and other pro-inflammatory cytokines) production compared to individual neutralization of IL-1β or IL-18 by either anti-IL-1 or anti-IL-18 mAb's.

BBMAB1

BBMAB1 is a heterodimeric Fc, monovalent format bispecific IgG1 monoclonal antibody (mAb) composed of Novartis clinical stage anti-IL-1β (ACZ885) and anti-IL-18 mAbs in a single molecule. By simultaneously targeting and neutralising both inflammasome effector cytokines IL-1β and IL-18, BBMAB1 has potential for superior clinical efficacy in autoinflammatory conditions where the inflammasome is overactivated and where both IL-1β and IL-18 directly contribute to the disease pathophysiology, such as in NLRC4-GOF inflammasomopathy.

Non-Clinical Data
Non-Clinical Pharmacology

BBMAB1 binds simultaneously to both IL-1β and IL-18 with single to double digit pM affinities resulting in sub-nM inhibition of the cytokine signals in most cellular assays. Although BBMAB1 has monovalent binding to IL-1β and IL-18, the in vitro potencies for human IL-1β and IL-18 neutralization by BBMAB1 are in the same ranges as the bivalent canakinumab and CMK389, with similar inhibitory activity on primary marmoset cells.

Clinical Data
Clinical Human Pharmacokinetics

Preliminary pharmacokinetic data from the ongoing FIH trial in healthy volunteers (HV's) were in line with predictions based on marmoset monkey data and modelling (i.e., typical of a human IgG1 immunoglobulin). Specifically, BBMAB1 had a terminal half-life of approximately 20 days. Peak concentration of BBMAB1 was observed shortly after the end of the i.v. infusion (approximately 3.5 hours). Evaluation of the preliminary data showed that BBMAB1 displayed linear PK properties with dose-proportional exposure (Cmax and AUC) and constant clearance in the tested dose range of 0.1 to 10 mg/kg. The bioavailability of BBMAB1 when administered subcutaneously (s.c) at a dose of 100 mg was estimated to be 70% in humans. There was no observed immunogenicity in response to BBMAB1.

2. Objectives and Endpoints

TABLE 0-12

Objectives and related endpoints

| Objective(s) | Endpoint(s) |
|---|---|
| Primary objective(s) To determine the efficacy of BBMAB1 in prevention of flares in NLRC4-GOF patients | Endpoint(s) for primary objective(s) Occurrence of disease flare in BBMAB1 treated patients compared with placebo during the 24-week Randomized Withdrawal Period assessed by PGA and inflammatory markers |
| Secondary objective(s) To evaluate the safety and tolerability of BBMAB1 in patients with NLRC4-GOF | Endpoint(s) for secondary objective(s) All safety endpoints (including physical examination findings, growth, vital signs, ECG parameters, safety laboratory, and adverse events) |
| To evaluate the immunogenicity (IG) of BBMAB1 in patients with NLRC4-GOF | Confirmation and titer of anti-BBMAB1 antibodies |
| To evaluate the efficacy of BBMAB1 to improve the clinical status of NLRC4-GOF patients | Response by Day 29, end of Period 1 and 2 defined by PGA and inflammatory markers |
| To evaluate the efficacy of BBMAB1 to achieve serological remission | Serological remission at Day 29, end of Period 1 and 2 defined by inflammatory markers |
| To evaluate the effects of BBMAB1 on concomitant glucocorticoid administration | Glucocorticoid therapy to <0.2 mg/kg by end of Period 1 |
| To evaluate the effect of BBMAB1 on the time to first flare in patients with NLRC4-GOF | The time to first flare observed during the 24-week Randomized Withdrawal Period |
| To evaluate the efficacy of BBMAB1 to improve the signs and symptoms of NLRC4-GOF | Physician Severity Assessment of Disease Signs and Symptoms scale |
| To evaluate the effect of BBMAB1 on patient reported outcomes in patients with NLRC4-GOF over time | Patient's/Parent's global assessment of disease activity (PPGA) scale |

Primary Estimands

The primary clinical question of interest is:

What is the effect of continuation of BBMAB1 treatment in patients with NLRC4-GOF who have achieved a complete clinical response after approximately 28 weeks of BBMAB1 treatment despite discontinuation of glucocorticoid on disease flares over 24 weeks?

The primary estimand includes the following components:

1. Population: Patients with NLRC4-GOF who have achieved complete response after approximately 28 weeks of BBMAB1 treatment and have discontinued cyclosporin and glucocorticoids or are on a maintenance/replacement dose (<0.2 mg/kg/day) of glucocorticoids.
2. Endpoint: Occurrence of disease flare within 24 weeks.
3. Treatment of interest: The randomized study treatment (the investigational treatment of BBMAB1 or placebo).
4. Handling of intercurrent events: The treatment policy strategy will be adopted for primary analysis thus treatment discontinuation due to any reason other than occurrence of a disease flare will be ignored. Patients who discontinue treatment prematurely (not due to disease flare) in Period 2 will be analyzed in the same manner as those that continue the treatment as planned.
5. Summary: Difference in proportions of patients with disease flare between treatment groups.

3. Study Design

As depicted in FIG. 2, this is a three-period study, with an open-label, single-arm active treatment in Period 1 followed by a randomized-withdrawal, placebo-controlled, double-blinded design in Period 2 and an open label, long-term safety follow up in Period 3. Approximately 8 patients with a confirmed diagnosis of NLRC4-GOF will be included in to Period 1 of the study in order to randomize approximately 8 patients into Period 2 of the study. The total study duration from Screening until end of study (EoS) is expected to be between 3-4 years.

This three-period study includes:

Screening:

Period of approximately 30 days to confirm that the study inclusion and exclusion criteria are met. The Screening Period also allows for safe discontinuation or stabilization of doses of permitted medications in Period 1. The required assessments may be conducted over several days if it is in the best interest of the patient, or for logistical reasons. Laboratory tests that have been completed as part of the patient's routine care in the days preceding Screening may be used to avoid taking additional blood samples from the patient, providing the results are available.

The Screening window may be extended in the following situations (providing Informed Consent has been obtained):

in order to allow enough time to prove presence of active disease following discontinuation of current treatment as outlined in the inclusion and exclusion criteria.

for patients with no documented molecular diagnosis of NLRC4 mutation, to allow results from the molecular diagnosis of NLRC4 mutation to be available. All other Screening assessments (apart from Informed Consent) should be performed after the molecular diagnosis is available and within the Screening window.

Baseline:

Patients who meet the eligibility criteria will be admitted, if not already hospitalized, and assessed at a Baseline visit; this may be conducted on Day-1 or may be combined with Day 1 prior to dosing.

To mitigate potential SARS-CoV-2 infections among patients, guidance and requirements provided by the local regulatory authorities or local site-specific SOPs will be followed (e.g., patients may be screened for SARS-CoV-2 by PCR or comparable approved methodology prior to admission at the study/hospital site for any overnight stays following local site-specific SOPs).

All Baseline safety evaluation results must be available prior to dosing. Laboratory tests that have been completed as part of the patient's routine care in the days preceding Baseline may be used to avoid taking additional blood samples from the patient, providing the results are available.

Period 1, Open Label Treatment Period:

Period 1 is an Open-Label Treatment Period to identify responders to BBMAB1 treatment and to allow for these patients to taper their glucocorticoid dose and/or discontinue cyclosporin treatment. Period 1 is separated into 3 sub-parts (Period 1a, 1b and 1c).

Patients that meet the eligibility criteria will enter Period 1 and receive their first dose of BBMAB1 (10 mg/kg) as an i.v. infusion on Day 1 in Period 1a. Due to the nature of the disease, it is anticipated that patients may remain hospitalized for the duration of Period 1, however, this is not mandatory and investigators should use their judgement on when a patient can be discharged based on the patient's condition. During Period 1, patients will undergo the efficacy, PK and PD assessments as outlined in the assessment schedule (Table 8-1).

Period 1a

The duration of Period 1a is 4 weeks with BBMAB1 dosing every 2 weeks.

For patients currently on stable doses of glucocorticoids and/or cyclosporin, these doses will remain stable throughout Period 1a. No tapering of glucocorticoids or cyclosporin is allowed.

At Day 29 (Week 4) an assessment of response will be completed using the PGA, CRP and ferritin and those patients with at least a partial response will continue into Period 1b of the study. Patients who have not achieved a partial response during Period 1a will be withdrawn from the study.

If a patient discontinues during Period 1a, the patient should return within approximately 1 month of discontinuation to complete the End of Period 1 assessments (i.e. Period 1c, Week 28 in the assessment schedule) as the End of Treatment visit.

Refer to Section 8.3.5 for partial and complete response criteria.

Period 1b (Glucocorticoid Tapering and Cyclosporin Discontinuation)

The duration of Period 1b is a maximum of 20 weeks with BBMAB1 dosing every 2 weeks. Patients will enter Period 1b after they have successfully completed Period 1a.

Patients on a stable dose of a glucocorticoid will be gradually tapered down to the lowest dose possible for 4 weeks prior to randomization at the start of the Randomized Withdrawal Period (Period 2). Similarly, any patients on a stable dose of cyclosporin will have the dose reduced with the aim of achieving discontinuation of cyclosporin for 4 weeks prior to randomization at the start of the Randomized Withdrawal Period (Period 2). Guidelines for tapering glucocorticoids, discontinuing cyclosporin and eligibility for patients to move to Period 1c and Period 2 are given in Section 6.2.1.1.

Weekly site phone calls to patients/parents/caregivers will be performed for patients who are not hospitalized during Period 1b to monitor the response during the glucocorticoid tapering.

Patients who meet the eligibility criteria to move to Period 1c earlier than Week 24 may move to Period 1c earlier but must complete the assessments listed for Week 24 as detailed in the assessment schedule before moving to Period 1c.

For patients who are glucocorticoid and cyclosporin free at study entry (Period 1a) i.e. require no glucocorticoid tapering or cyclosporin discontinuation in Period 1b, on completion of Period 1a patients will enter Period 1b and only complete the assessments and treatment as listed for Week 22 and Week 24 of Period 1b before moving to Period 1c. This will ensure that all patients receive a minimum of 12 weeks treatment with BBMAB1 in Period 1 of the study.

Patients who are unable to reduce their glucocorticoid dose or stop treatment with cyclosporin by Week 24 may be discontinued from the study. If a patient discontinues during Period 1b, the patient should return within approximately 1 month of discontinuation to complete the End of Period 1 assessments (i.e. Period 1c, Week 28 in the assessment schedule) as the End of Treatment visit. Patients who have achieved a partial response (with or without the glucocorticoid tapering, but having discontinued cyclosporin) as assessed at the End of Period 1 visit, may enroll straight into Period 3 open label treatment at the investigator's and family's discretion.

Refer to Section 8.3.5 for partial and complete response criteria.

Period 1c

The duration of Period 1c is 4 weeks with BBMAB1 dosing every 2 weeks.

Patients will enter Period 1c at the time of their next scheduled BBMAB1 dose after they have successfully completed Period 1b.

Any patients continuing glucocorticoid treatment must maintain a stable dose for the full duration of Period 1c. No tapering of glucocorticoids is allowed in Period 1c, no treatment with cyclosporin is allowed in Period 1c.

The purpose of Period 1c is to ensure that all patients who have stopped cyclosporin treatment and/or tapered glucocorticoids and are maintained on a low dose of glucocorticoids are clinically stable for at least 4 weeks before entering Period 2.

At the end of Period 1c (Day 197, Week 28) an assessment of response will be completed using the PGA, CRP and ferritin and those patients with a complete response will be randomized into Period 2 of the study. Patients who have not met the complete response criteria but have achieved a partial response (with or without the glucocorticoid tapering, but having discontinued cyclosporin) may enroll straight into Period 3 open label treatment at the investigator's and family's discretion.

If a patient discontinues during Period 1c, the patient should return within approximately 1 month of discontinuation to complete the End of Period 1 assessments (i.e. Period 1c, Week 28 in the assessment schedule) as the End of Treatment visit.

Refer to Section 8.3.5 for partial and complete response criteria.

Period 2, Randomized Withdrawal Period:

Period 2 consists of a 24-week placebo-controlled, double-blind, randomized withdrawal period, primarily to assess the efficacy of BBMAB1 compared to placebo. At the beginning of Period 2 BBMAB1 responders (complete response to treatment at the end of the open label treatment in Period 1) will be randomized in a ratio of 1:1 to BBMAB1 treatment (i.e. continue with 10 mg/kg) or placebo.

The first scheduled blinded dosing following randomization in Period 2 will be 2 weeks after the last dose in Period 1c and will continue with dosing every 2 weeks until either disease flare occurs or 24 weeks has elapsed in Period 2. It is anticipated that patients may remain hospitalized for duration of Period 2, however, this is not mandatory and investigators should use their judgement on when a patient can be discharged based on the patient's condition.

If a patient meets the flare criteria in Period 2, an unscheduled visit should be performed as detailed in the assessment schedule, blinded treatment will be stopped and patients transferred to open label BBMAB1 treatment in order to continue the remainder of Period 2.

If a patient discontinues during Period 2, the patient should return within approximately 1 month of discontinuation to complete the End of Period 2 assessments (i.e. Period 2, Week 24 in the assessment schedule) as the End of Treatment visit.

Complete response criteria and flare criteria are outlined in Section 8.3.5.

Period 3, Long Term Safety, Open Label Treatment:

Period 3 consists of a 3-year long-term safety phase, with open-label BBMAB1 treatment (10 mg/kg).

The first scheduled dosing in Period 3 will be 2 weeks after the last dose in Period 1 or Period 2 and will continue with dosing every 2 weeks.

Scheduled visits in Period 3 have a reduced frequency but dosing will continue every 2 weeks. As such, home-dosing using a mobile nurse may be utilized where possible to administer BBMAB1 dose at home in-between the scheduled visits (every 12 weeks for the first year, and then every 26 weeks) outlined in the assessment schedule. In this case, the weight from the previous dosing day may be used for the dose calculation. It is not anticipated that patients will be hospitalized during Period 3, but may be possible to accommodate the visit and dosing schedule as deemed necessary by the investigator.

For patients on a maintenance dose of glucocorticoids it is recommended to consider further tapering of glucocorticoids to complete discontinuation if possible. All patients who do not maintain a minimum partial response may be discontinued unless their loss of response is considered a consequence of glucocorticoid tapering.

If a patient discontinues during Period 3, the patient should return within approximately 1 month of discontinuation to complete the End of Period 3 assessments (i.e. Period 3, Week 152 in the assessment schedule) as the End of Treatment visit.

The Screening and Baseline visits will be used to confirm that the study inclusion and exclusion criteria are met and for performing Baseline clinical observations and biological sampling. The patients who are enrolled in this study may have been treated with anakinra, canakinumab, emapalumab and/or investigational IL-18/IL-1/IFN-□□binding or blocking therapy and may be screened. Entry into the study will take place within approximately 30 days of Screening with BBMAB1 treatment administered as soon as the criteria for active disease are fulfilled. This run-in phase for previously treated patients holds a reduced time for wash-out compared to classical designs, but is considered justified due to the fact subjects may require emergent enrollment to BBMAB1 after other treatment options have failed.

Period 1 is an open-label, active treatment period to identify NLRC4-GOF patients who respond to BBMAB1 treatment and then allow patients on glucocorticoids and/or cyclosporin to taper/discontinue these therapies. Period 1a patients will initially be treated with two doses of BBMAB1 to ensure they respond to treatment at Day 29 and specifically, achieve simultaneous control of MAS and resolution of gut clinical manifestations (enterocolitis) over several weeks. In Period 1b, apparent BBMAB1 responders on cyclosporin and glucocorticoids will discontinue cyclosporin and gradually taper off or reduce glucocorticoids to a maintenance/replacement dose over a maximum duration of 20 weeks to avoid the long-term morbidity associated with both treatments in pediatric populations. Period 1c ensures patients are clinically stable for at least 4 weeks off glucocorticoids or on a maintenance/replacement dose prior to assessment of response to BBMAB1 treatment at the end of Period 1.

At the start of the Randomized Withdrawal Period (Period 2) patients with a complete response to BBMAB1 and have discontinued glucocorticoids or on a maintenance/replacement dose will be randomized 1:1 ratio in a double-blind manner to receive either treatment with BBMAB1 or matching placebo. This design allows patients who have BBMAB1 treatment withdrawn (placebo patients) to immediately re-start BBMAB1 treatment after they have reached the study endpoint (occurrence of disease flare), thereby addressing both clinical concerns and patient preferences about placebo assignment by minimizing the time that patients are on potentially non effective therapy. All patients who flare at any time during Period 2, blinded treatment will be stopped and patients transferred to open label BBMAB1 treatment in order to continue the remainder of Period 2 at both investigator's and family's discretion. The 1:1 randomization ratio was chosen to maximize the statistical power for the primary analysis whilst minimizing the overall sample size given the rarity of the condition. Blinding is justified to prevent conscious or unconscious bias in the study design and how it is conducted. The duration of the Randomized Withdrawal Period of the study, is based on clinical trial experience of flares in similar pediatric populations with autoinflammatory conditions treated with canakinumab (e.g. CAPS and SJIA) and from modeling of free IL-18 where levels are anticipated to increase to result in a flare of NLRC4-GOF in the absence of effective therapy.

The Long-Term Safety, Open Label Treatment (Period 3) in patients who have responded to BBMAB1, will allow them to continue with BBMAB1 treatment and provide long term safety data.

Rationale for Dose/Regimen

Figure 3:
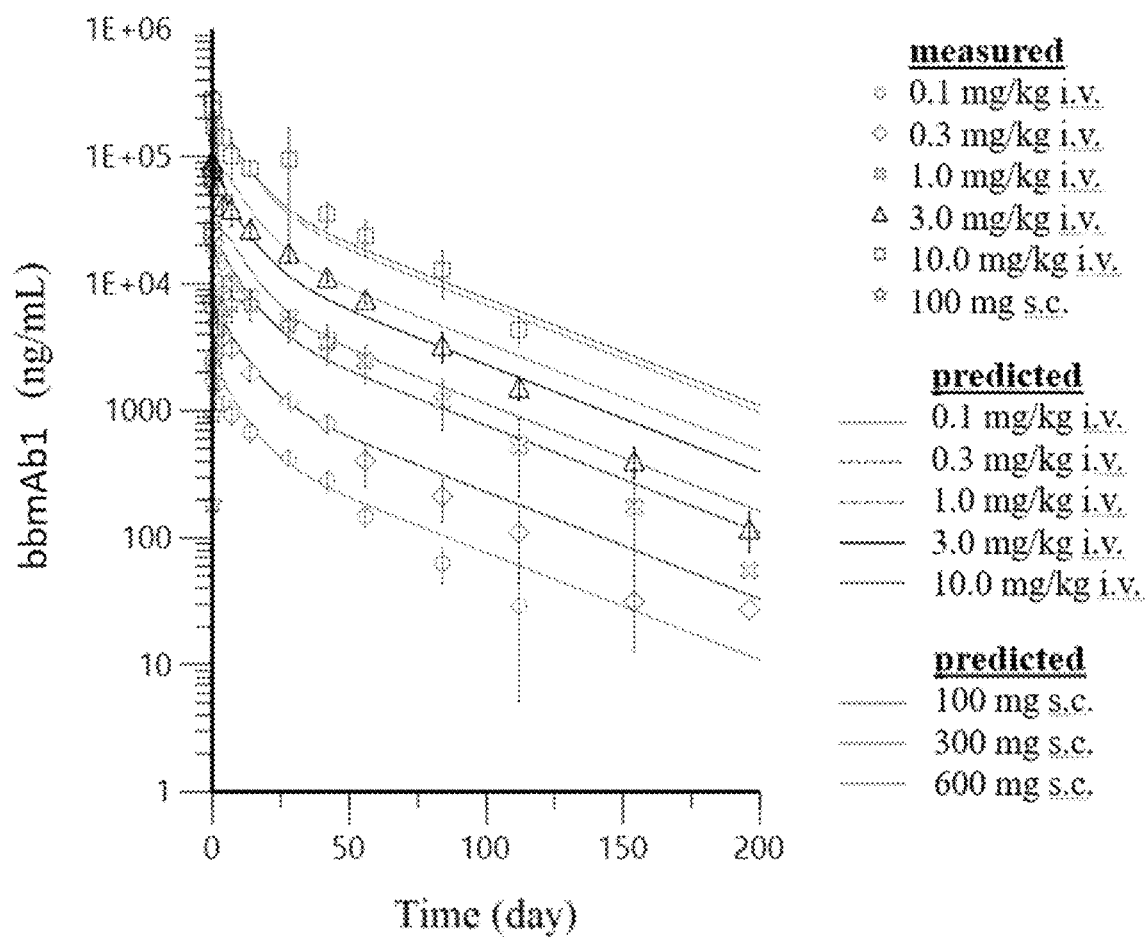
FIG. 3 depicts a profile of bbmAb1 serum concentration over time as predicted (lines) and as measured (data points) from a first in human healthy volunteer study.

BBMAB1 is currently evaluated in a FIH single dose ascending study up to 10 mg/kg i.v. in healthy volunteers and in certain patients having an inflammatory disorder without any drug related SAEs; the PK of BBMAB1 in humans is as expected for a typical IgG1 antibody binding to a soluble ligand cytokine target. In a preplanned PK analysis of the FIH study to enable subcutaneous dosing, BBMAB1 showed a dose proportional increase in exposure matching the predicted human PK. BBMAB1 peak serum concentration was observed shortly following its i.v. infusion. The median Tmax was approximately 0.146 day, or approximately 3.5 hours, from the start of the infusion. The Cmax and AUC0-inf increased with increasing doses in a dose-proportional manner. BBMAB1 concentrations decreased exponentially with a mean terminal elimination half-life (T1/2) ranging from 21.1 to 26.3 days. Volume of distribution was low with the mean Vz between 0.066 and 0.083 L/kg. Additionally BBMAB1 was administered subcutaneously at a dose of 100 mg, Cmax of approximately 7 μg/mL at about 9 days post dose was observed. Bioavailability was estimated to be 70% by comparing AUCinf divided by dose of the 100 mg s.c. to AUCinf divided by dose of the 1 mg/kg i.v. (FIG. 3). There was no observed immunogenicity in response to BBMAB1.

4. Rationale

Rationale for Dose/Regimen

Pediatric patients with an NLRC4-GOF inflammasomopathy have grossly and chronically elevated free IL-18 in serum. The dynamics of free IL-18 potentially limit the efficacy of the bispecific antibody and therefore guide the dosing principle in NLRC4-GOF patients. Under normal physiological conditions almost all circulating IL-18 is biologically inactive bound to its binding protein (IL-18BP), however, in severe inflammatory conditions, such as NLRC4-GOF inflammasomopathy, the levels of IL-18 exceeds the available IL-18BP, resulting in a higher fraction of free/bioactive IL-18 to drive pathology. By utilizing measurements of total IL-18, IL-18BP and free IL-18 (mean 38.8 μg/ml) from pediatric patients with NLRC4-GOF mutations (Weiss et al 2018) a BBMAB1 dose of 10 mg mg/kg i.v. is expected to achieve rapid and sustained reduction of free IL-18 in NLRC4-GOF pediatric patients.

The model used to predict the dynamics of the anti-IL-18/IL-1β bispecific antibody and its targets in serum consists of a general competitive binding model (Yan et al 2012) describing the free and total IL-18 dynamics for the IL-18 arm and the previously published model of canakinumab (Chakraborty et al 2012) with parameters adapted to BBMAB1 for the IL-1β arm. Parameters for baseline values of free IL-18, total IL-18 and IL-18BP in serum from patients across several autoimmune diseases including NLRC4-GOF (Weiss et al 2018) and in-house measurements were used for model adjustment and a body weight of 3 kg for a newborn patient was assumed. Based on the simulation of the effect of BBMAB1 on free IL-18 when given intravenously, full control (neutralization) of free IL-18 at a dose of 10 mg/kg is anticipated for approximately 14 days while also neutralizing IL-1β to fully control the inflammatory syndrome, to allow for reversal of gastrointestinal pathology and control of MAS in NLRC4-GOF pediatric patients during treatment.

The simulations of the effects of BBMAB1 in NLRC4-GOF patients on free IL-18 and IL-1β with 10 mg/kg suggest immediate and durable responses. In comparison, to the 2 mg/kg q2d dose of rhIL-18BP (tadekinigalfa) (Tak et al 2006), therapeutic range shown in grey shading (FIG. 4), that has been reported to be clinically efficacious in NLRC4-GOF infants (Canna et al 2017, Moghaddas et al 2018) and is currently undergoing evaluation in phase 3 study (NCT03113760), a 10 mg/kg q2W dose of BBMAB1 is predicted to neutralize free IL-18 equivalently at 2 weeks and then to fully suppress free/bioactive IL-18 to an undetectable levels similar to healthy individuals in subsequent weeks.

Figure 4:
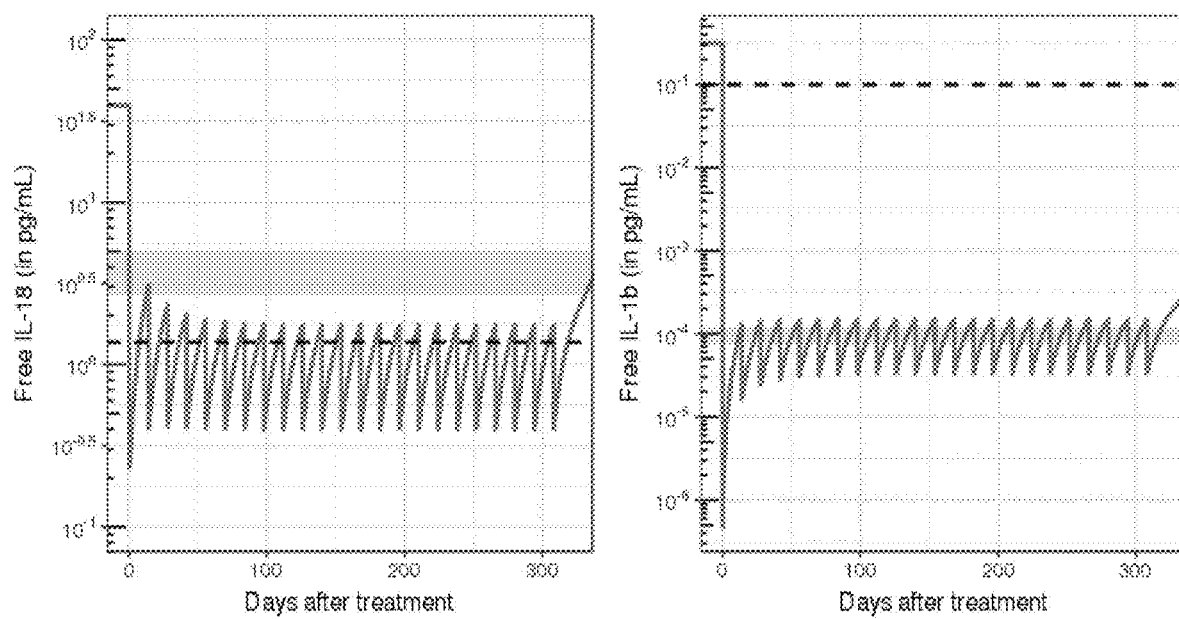
FIG. 4 depicts predicted free IL-18 and IL-1β concentrations after administration of a bispecific antibody targeting both IL-1β and IL-18, e.g., bbmAb1, at 10 mg/kg i.v. relative to recombinant IL-18 BP and canakinumab treatment (grey shading). The dashed line refers to the lower limit of quantification (LLOQ).

The inflammasomopathy with most clinical relevance to NLRC4-GOF is CAPS, caused by NLRP3-GOF mutations which results in grossly elevated IL-1β levels that can be efficaciously treated with canakinumab. The efficacious dose of BBMAB1 to neutralize IL-1β has been estimated from the treatment of adult and pediatric CAPS patients with canakinumab. The steady-state range of a clinical effective dose of 3 mg/kg s.c. q2w administered to treat pediatric patients with severe CAPS is shown as reference in gray shading (FIG. 4).

The BBMAB1 dose of 10 mg/kg i.v. q2w for this study is further justified by;

The dose is predicted to lead to rapid and simultaneous neutralization of free IL-18 and IL-1β to rapidly induce a clinical response in NLRC4-GOF patients where hyper-elevated levels of IL-1β and IL-18 have been measured and are expected in pediatric patients enrolled in this study.

The 10 mg/kg i.v single dose was administered to healthy volunteers in the FIH to establish the safety of this dose to enable the treatment of patients with gain of function mutations leading to overexpression of IL-1β and IL-18 (e.g., NLRC4 mutations (Romberg et al 2014). This dose in healthy volunteers has provided several months of combined IL-18 and IL-1β inhibition and is currently administered to COVID-19 patients with no identified safety concerns.

Modeling of IL-18BP treatment of NLRC4-GOF pediatric patients to estimate clinically efficacious BBMAB1 dose suggests that patients should achieve a sustained clinical response at 10 mg/kg i.v. q2w with neutralization of free IL-18 for approximately 14 days—lower doses with greater dose intervals may not achieve a complete response and risk patients flaring due to inadequate treatment.

The clinical experience of canakinumab treatment in pediatric patients with severe CAPS, where these patients, in particular pediatric patients less than age 2 may require higher than usual doses (greater than canakinumab 8 mg/kg) to attain full clinical response and may require more frequent dose titration compared to adults.

Allometric scaling of pop-PK parameters of BBMAB1 from 70-kg human to 3-kg newborn predicts a higher clearance per weight in neonates and young infants. Therefore expected lower exposure per dose provides a rational for a high dose in pediatric population to maximize clinical responses. No significant accumulation is anticipated at the proposed dose of 10 mg/kg i.v. q2w after multiple dosing in this population. Similarly, body weight based clearance (L/day/kg) was found increased and exposure of canakinumab decreased in younger pediatric patients (Zhung et al 2019).

The systemic exposure in the study is expected to be considerably lower than the exposures reached in the 26-week marmoset study, with a predicted exposure ratio to non-clinical NOEL exposure of 14.4-fold for AUC and 14.4-fold for Cmax for a 3 kg newborn.

In the NHP 26-week toxicology study, 100 mg/kg, twice a week had no adverse events with no observed effect level.

In summary, the dose of 10 mg/kg q2w has been identified as likely efficacious, while having minimal risk in the pediatric population based on available data and given grossly elevated levels of cytokines in individual NLRC4-GOF pediatric patients, due to the rarity and novelty of the phenotype (orphan) and clinical experience to date of BBMAB1.

The pediatric patients enrolled in this study will have diagnosis of NLRC4-GOF with clinical evidence of active disease with a history of enterocolitis, ephemeral maculopapular and/or urticarial rashes, fever, cytopenias, liver dysfunction and coagulopathies. Currently, apart from supportive medical care and non-specific immunosuppression that is of limited benefit in this population, there are no approved therapeutics that directly and specifically target the underlying inflammatory process to improve the overall clinical outcome.

5. Study Population

Inclusion Criteria

Patients eligible for inclusion in this study must meet all of the following criteria:
1. Male and female patients aged≤17 years weighing at least 3 kg, at time of Screening.
2. Written informed consent by parent(s)/legal guardian(s) for the pediatric patients and assent by the pediatric patient (depending on local requirements) must be obtained before any study-specific assessment is performed.
3. Patients with genetic diagnosis of NLRC4-GOF (this analysis may be performed as part of Screening procedures if not already available).
4. Clinical history and investigations consistent with autoinflammation and infantile enterocolitis (AIFEC/NLRC4-GOF), including elevated IL-18 levels (this analysis may be performed as part of Screening procedures if not already available).
5. At first treatment (Day 1 of Period 1), evidence of active disease as assessed by:
   a. PGA of disease activity >minimal and
   b. Ferritin >600 ng/ml or
   c. elevation of CRP >20 mg/l.

Exclusion Criteria

Patients meeting any of the following criteria are not eligible for inclusion in this study:
1. History of hypersensitivity to any of the study drugs or to drugs of similar chemical classes or to any of the excipients.
2. Signs and symptoms, in the judgment of the investigator, of clinically significant systemic recurrent and/or evidence of active bacterial, fungal, or viral infections. Infections are considered controlled if appropriate therapy has been instituted and, at the time of Screening, no signs of infection progression are present. Progression of infection is defined as hemodynamic instability attributable to sepsis, new symptoms, worsening physical signs or radiographic findings attributable to infection. Persisting fever without other signs or symptoms will not be interpreted as progressing infection.
3. COVID-19 specific: If in line with health and governmental authority guidance, it is highly recommended that PCR or comparable approved methodology for COVID-19 be completed within 1 week prior to first dosing. If testing is performed, negative test results are required prior to enrolment into the study. Additional testing may occur at the discretion of the investigating physician. COVID-19 testing should be completed via nasal or throat swabs or other approved route for pediatric patients. If testing is not performed, the investigator must document their discussion with the patient/parent/caregiver regarding testing, and the rationale for not testing, in the source documentation. This requirement may be ignored if the pandemic is declared ended by the country where the site is located and resumed if the pandemic recurs.
4. Any conditions or significant medical problems, which in the opinion of the investigator places the patient at unacceptable risk for BBMAB1 therapy (this can be discussed with Novartis on a case by case basis in case of uncertainty).
5. Previous treatment with anti-rejection and/or immunomodulatory drugs within the past 28 days or 5 half-lives (whichever is the longer) for immunomodulatory therapeutic antibodies (or as listed in Section 6.2.2 prohibited treatments) prior to BBMAB1 treatment.
6. The exceptions are:
7. Stable dose of glucocorticoids≤1.0 mg/kg/day (maximum 60 mg/day for children over 60 kg) in 1-2 doses of oral prednisone (or equivalent) for at least 3 days prior to treatment with BBMAB1
8. Stable dose of cyclosporin≤5 mg/kg/day for at least 3 days prior to treatment with BBMAB1
9. Anakinra, canakinumab, emapalumab and/or investigational IL-18/IL-1/IFN-γ binding or blocking therapy, must be discontinued (See Section 6.2.2). As soon as the criteria for evidence of active disease, patients can receive BBMAB1 treatment (per inclusion 7).
10. Participation in any other investigational trials within 4 weeks prior to dosing or longer if required by local regulation with the exception of treatment with anakinra, canakinumab, emapalumab and/or investigation IL-18/IL-1/IFN-γ binding or blocking therapy.
11. A positive HIV test result (ELISA and Western blot) at Screening. Evidence of prior testing within 3 months is sufficient.
12. A positive Hepatitis B surface antigen (HBsAg) or Hepatitis C test result. Evidence of prior testing within 3 months is sufficient.
13. Presence of tuberculosis infection as defined by a positive TB test at Screening. Evidence of prior testing within 3 months is sufficient.
14. Live vaccinations within 1 month prior to BBMAB1 treatment, during the trial, and up to 3 months following the last dose.
15. History of malignancy of any organ system (other than localized basal cell carcinoma of the skin or in-situ cervical cancer), treated or untreated, within the past 5 years, regardless of whether there is evidence of local recurrence or metastases.
16. Pregnant or nursing (lactating) females, where pregnancy is defined as the state of a female after conception and until the termination of gestation, confirmed by a positive hCG laboratory test.
17. Female patients of child-bearing potential (or Tanner stage 2 or above) who are or might become sexually active, must be informed of the potential teratogenic risk with BBMAB1 and the need and agree to use highly effective contraceptive methods to prevent pregnancy while on BBMAB1 therapy; Highly effective contraception (abstinence, oral, injected or implanted hormonal methods of contraception or placement of an intrauterine device (IUD) or intrauterine system (IUS) or other forms of hormonal contraception that have comparable efficacy (failure rate <1%), for example hormone vaginal ring or transdermal hormone contraception) must be used during the study and for 5 months after stopping treatment with BBMAB1, when it is predicted that IL-18 and IL-1β will not be neutralized by BBMAB1. The decision on the contraceptive method should be reviewed at least every 3 months to evaluate the individual need and compatibility of the method chosen.

6. Treatment 6.1. Study Treatment

Details on the requirements for storage and management of study treatment, and instructions to be followed for patient numbering, prescribing/dispensing, and taking study treatment are outlined in the Pharmacy Manual.

6.1.1. Investigational and Control Drugs

BBMAB1 is still in development, the investigational and control drug will be same as administered in the Phase 1 study and Phase 2 study. The investigational drug, BBMAB1 and the matching placebo will be prepared by Novartis and supplied as open labeled bulk medication to the unblinded site pharmacist (Table 6-1). An unblinded pharmacist or authorized designee is required to dispense the study drug. Drug will be administered over approximately 120 minutes as i.v. infusion at the clinical site by the study personnel in accordance with the specified study procedures.

During an epidemic or pandemic (e.g. COVID-19 pandemic) that limits or prevents on-site study visits, visits by site staff to a patient's home may be arranged in order to continue study treatment per protocol, as permitted by local regulations.

TABLE 0-13

| Investigational drug | | | | |
|---|---|---|---|---|
| Investigational Drug(Name and Strength) | Pharmaceutical Dosage Form | Route of Administration | Supply Type | Sponsor (global or local) |
| BBMAB1 100 mg/mL | Concentrate for solution for infusion | Intravenous use | Open label patient specific supply; vials | Sponsor (global) |
| Matching Placebo | Concentrate for solution for infusion | Intravenous use | Open label patient specific supply; vials | Sponsor (global) |

6.1.2. Additional Study Treatments

No other treatment beyond they investigational drug are included in this trial. Administered supportive treatment in addition to study treatment will be supplied by the investigational site.

6.1.3. Treatment Arms/Group

Period 1—Open Label Treatment Period
  Patients will be assigned at Day 1 to a dose of BBMAB1 10 mg/kg q2w i.v.
Period 2—Randomized Withdrawal Period
  Responsive patients will be assigned at randomization to one of the following treatment arms/groups in a ratio of 1:1 at the end of Period 1:
  BBMAB1 10 mg/kg i.v. q2w
  Matching placebo i.v. q2w
Period 3—Long Term Safety
  Patients will be assigned at the end of Period 2 to a dose of BBMAB1 10 mg/kg q2w i.v.

6.1.4. Post-Trial Access

Novartis will offer to provide the BBMAB1 to a patient who completes participation in the study for as long as there is evidence of clinical benefit for the patient, as required or permitted by local legislation, or until:
  the Investigator discontinues treatment,
  the product or an alternative treatment becomes available commercially.

6.2. Other Treatment(s)

6.2.1. Concomitant Therapy

All key medications, procedures, and significant non-drug therapies (including physical therapy and blood transfusions) administered for the treatment of NLRC4-GOF in the six months (if available) before the patient was enrolled into the study should be recorded on the appropriate Case Report Forms.

All medications, procedures, and significant non-drug therapies (including physical therapy and blood transfusions) administered after the patient was enrolled into the study must be recorded on the appropriate Case Report Forms.

Each concomitant drug must be individually assessed against all exclusion criteria/prohibited medication. If in doubt, the investigator should contact the Novartis medical monitor before enrolling a patient or allowing a new medication to be started. If the patient is already enrolled, contact Novartis to determine if the patient should continue participation in the study.

During the course of the study and also prior to Screening, patients may receive gastric protection, folic acid, paracetamol, NSAIDs, analgesics, antibiotics, vasopressors and nutrition supplementation (e.g. vitamins, liquid supplements, enteral nutrition, total parenteral nutrition) and other agents/treatments where these form part of supportive treatment of NLRC4-GOF at their participating site (per medical judgement).

6.2.1.1. Permitted Concomitant Therapy Requiring Caution and/or Action

Period 1—Glucocorticoids Taper

During the 4-week treatment in Period 1a to stabilize patients on BBMAB1, patients on stable doses of glucocorticoids are permitted entry into the study and receive the first dose of i.v. dose of BBMAB1 (10 mg/kg). The glucocorticoids dose should be maintained for the full duration of Period 1a until at least Day 29.

Following Day 29, investigators should introduce a glucocorticoid taper to gradually decrease the dose with the aim of achieving discontinuation of glucocorticoids (per medical judgment) or a stable maintenance dose of ≤0.2 mg/kg/day of glucocorticoids (prednisone or equivalent) for 4 weeks prior to randomization at the start of the Randomized Withdrawal Period (Period 2).

Steroid tapering after Day 29 may be initiated if a patient has achieved at least a partial response (Section 8.3.5).

TABLE 6-14

| Glucocorticoids tapering guidline | |
|---|---|
| Prednisone (or equivalent) dose | Amount of reduction |
| >0.2 mg/kg/day | Taper at 0.1 mg/kg per week until at dose of 0.1 mg/kg/day |
| 0.1 mg/kg/day | Taper to dose of 0.05 mg/kg/day and take for every 24 hours for 1 week |
| ≤0.05 mg/kg/day | Alternate dosing days (i.e. take dose every 48 hours) for 2 weeks and then discontinue |

Tapering can be further continued if:
  1. Between study visits during the weekly site phone calls patient/parents do not report any loss of response based on response to phone scripted questionnaire.
  2. During site visits the patient maintains at least a partial response to BBMAB1.
Glucocorticoid tapering will continue until one of the following occurs first:
  1. Patient achieved discontinuation of glucocorticoids and is steroid free.
  2. Patient has reached maximal duration of 20 weeks for the glucocorticoid taper.
  3. Patient has failed three glucocorticoid tapering attempts.

All patients whom fail to maintain at least a partial response to BBMAB1 may be discontinued from the study unless the loss of response is considered a consequence of glucocorticoid tapering.
1. If the patient loses response to BBMAB1 while tapering glucocorticoids, the glucocorticoid dose will be increased to the previous level and the patient will be permitted to remain in Period 1b; the increased steroid dose will be maintained for at least 2 weeks. If the patients fails to respond for more than 2 weeks after the initial event after increasing to the previous steroid dose, the patient may be discontinued from the study.
2. For patients who lose response during tapering, a subsequent attempt of steroid tapering may occur only if the patient has been on stable steroid dose for at least 2 weeks and patient at least has a partial response.

Patients will be eligible for direct entry into Period 2 of the study if one of the following is met:
1. Any patient who achieved discontinuation of glucocorticoids and is steroid free for 4 weeks.
2. Patient who achieved a stable maintenance dose of <0.2 mg/kg/day of glucocorticoids (prednisone or equivalent) for 4 weeks.

Patients on prolonged glucocorticoids treatment may on occasional require stress dose steroids (e.g. for childhood infection or medical procedures) as per local guidance unrelated to NLRC4-GOF. Investigators should document their clinical rationale for administration of stress dose steroids in the case report forms and contact the Novartis medical monitor if in doubt (Section 6.2.1).

If a patient discontinues during Period 1, the End of Period 1 assessments (i.e. Period 1c, Week 28 in the assessment schedule) should be completed as the End of Treatment visit. Patients who have achieved a partial response (with or without the glucocorticoid tapering but having discontinued cyclosporin) as assessed at the End of Period 1 visit, may enroll straight into Period 3 open label treatment at the investigator's and family's discretion.

Period 2—Glucocorticoids (Randomized Withdrawal Period)

During Period 2, patients who achieved a stable maintenance dose of ≤0.2 mg/kg/day of glucocorticoids (prednisone or equivalent) in Period 1c should be maintained on this dose and no tapering of glucocorticoids is allowed in Period 2.

Rescue Medication—Glucocorticoids

Patients who flare (see Section 8.3.5) are permitted to receive increases of glucocorticoid maintenance doses or intermittent glucocorticoid treatment as rescue medication for a limited period as per medical judgement and local guidance.

Period 1—Cyclosporin Discontinuation

During the 4-week treatment in Period 1a to stabilize patients on BBMAB1, patients on stable doses of cyclosporin are permitted to receive BBMAB1 treatment. The cyclosporin dose should be maintained stable by investigators for the full duration of Period 1a until at least Day 29.

Following Day 29, investigators should gradually decrease the cyclosporin dose (per medical judgment) with the aim of achieving discontinuation of cyclosporin for 4 weeks prior to randomization at the start of the Randomized Withdrawal Period (Period 2).

Reduction in cyclosporin may be initiated if a patient has achieved at least a partial response (Section 8.3.5).

Cyclosporin dose reduction will continue until one of the following occurs first:

Patient achieved discontinuation of cyclosporin.

Patient has reached maximal duration of 20 weeks for cyclosporin discontinuation.

Patient has failed three attempts at cyclosporin discontinuation.

Patients will be eligible for direct entry into Period 2 of the study if they have discontinued cyclosporin for 4 weeks.

All patients who fail to maintain at least a partial response to BBMAB1 and discontinue cyclosporin may be discontinued from the study. Patients who have achieved a partial response (with or without the glucocorticoid tapering, but having discontinued cyclosporin) as assessed at the End of Period 1 visit, may enroll straight into Period 3 open label treatment at the investigator's and family's discretion.

If a patient discontinues during Period 1, the End of Period 1 assessments (i.e. Period 1c, Week 28 in the assessment schedule) should be completed as the End of Treatment visit. Patients who have achieved a partial response (with or without the glucocorticoid tapering but having discontinued cyclosporin) as assessed at the End of Period 1 visit, may enroll straight into Period 3 open label treatment at the investigator's and family's discretion.

Contraception

Use of oral, injected or implanted hormonal methods of contraception are allowed while on BBMAB1.

6.2.2. Prohibited Medication

The following treatments are NOT allowed prior to Day 1 (time intervals prior to Day 1 are detailed below) AND during the entire study:

Etanercept in the 4 weeks prior to Day 1

Adalimumab in the 8 weeks prior to Day 1

Infliximab in the 12 weeks prior to Day 1

Tocilizumab in the 8 weeks prior to Day 1.

Vedolizumab in the 12 weeks prior to Day 1.

i.v. immunoglobulin (i.v. Ig) in the 8 weeks prior to Day 1

Any other investigational or non-investigational immunomodulatory therapeutic antibodies in past 30 days or 5 half-lives (whichever is the longer) prior to Day 1

Leflunomide in the 4 weeks prior to Day 1.

Thalidomide in the 4 weeks prior to Day 1

6-Mercaptopurine, azathioprine, cyclophosphamide, or chlorambucil in the 12 weeks prior to Day 1

Tacrolimus in the 4 weeks prior to Day 1

Colchicine, dapsone, mycophenolate mofetil in the 4 weeks prior to Day 1

Ruxolitinib and other JAK inhibitors 4 weeks prior to Day 1

Any other investigational or non-investigational anti-rejection and immunomodulatory drugs within the past 28 days prior to Day 1

Patients on treatment with glucocorticoids may continue as needed depending on the clinical condition of the patient. The dose of glucocorticoids should be stable for at least 3 days before treatment with BBMAB1 (see Section 6.2.1.1 for glucocorticoid taper during Period 1).

Patients on treatment with cyclosporin may continue as needed depending on the clinical condition of the patient. The dose of cyclosporin should be stable for at least 3 days before treatment with BBMAB1 (see Section 6.2.1.1 for cyclosporin discontinuation during Period 1).

Patients on treatment with Anakinra, canakinumab, emapalumab and/or investigational IL-18/IL-1/IFN-γ binding or blocking therapy, need to discontinue this treatment. As soon as the criteria for evidence of active disease (Section 5.1 Inclusion Criteria), patients can receive BBMAB1 treatment. This run-in phase reduces the classical wash-out phase to a medically meaningful time and avoids unnecessary suffering for the patient in case a predefined wash-out period per protocol is too long for an individual patient.

No live vaccinations within 4 weeks prior to Period 1, Day 1, during the trial, and up to 3 months following the last dose. Approved killed, inactivated, peptide, DNA and RNA vaccines may be permitted according to the investigator's discretion and per local guidance.

Novartis qualified medical personnel will be readily available to advise investigators on trial related medical questions about concomitant therapy and prohibited medications 6.2.3. Rescue Medication Increase of glucocorticoids maintenance dose or intermittent steroid treatment may be used as rescue therapy. Information regarding the administration of glucocorticoids to study patients is found in Section 6.2.1.1, which describes use and tapering of glucocorticoids during this study.

Use of rescue medication must be recorded on the concomitant medications page in the CRF.

Patients who do not improve with treatment, do not meet the partial response criteria at Day 29 in Period 1, or flare, not due to glucocorticoids tapering during Period 1c, may discontinue to study and be treated as per medical judgement and local practice. Patients who have achieved at least a partial response and discontinued cyclosporin may be eligible to enter Part 3 where they will receive BBMAB1.

Instruction for Prescribing and Taking Study Treatment

TABLE 0-15

| Dose and treatment schedule | | |
| --- | --- | --- |
| Investigational Drug (Name and Strength) | Dose | Frequency and/or Regimen |
| BBMAB1 100 mg/mL | 10 mg/kg | q2w by i.v. infusion over 120 minutes |
| Placebo 0 mg/mL | 0 mg/kg | *q2w by i.v. infusion over 120 minutes (Period 2 only) |

8. Visit Schedule and Assessments

The Assessment Schedule (Table 8-1) lists all of the assessments when they are performed. All data obtained from these assessments must be supported in the patient's source documentation.

Patients should be seen for all visits/assessments as outlined in the assessment schedule (Table 8-1) or as close to the designated day/time as possible.

Missed or rescheduled visits should not lead to automatic discontinuation. Patients who prematurely discontinue the study for any reason should be scheduled for a visit as soon as possible, at which time all of the assessments listed for the final visit will be performed. At this final visit, all dispensed investigational product should be reconciled, and the adverse event and concomitant medications recorded on the CRF.

In Period 3, in order to maintain q2w dosing in-between scheduled study visits as outlined in Table 8-1, home dosing visits by a mobile nurse may be possible, depending on local regulations and capabilities. At each dosing, weight will be measured and any AEs will be evaluated (AE assessment will be performed by the investigator or appropriate delegated study team member based on information obtained from the mobile nurse). The weight from the previous dosing day may be used for the dose calculation for a home dosing visit.

If an epidemic or pandemic (e.g. COVID-19 pandemic) limits or prevents on-site study visits, alternative methods of providing continuing care may be implemented. Phone calls, virtual contacts (e.g. teleconsult) to the patient or visits by site staff to a patient's home depending on local regulations and capabilities, can replace on-site study visits, for the duration of the pandemic until it is safe for the patient to visit the site again.

TABLE 0-16

Assessment Schedule

| | Screening | | Period 1, Open Label Treatment Period | | | | | | | |
|---|---|---|---|---|---|---|---|---|---|---|
| | | | Period 1a | | | | Period 1, Open Label Treatment Period | | Period 1b[3] | |
| | Screening[1] | Baseline[2] | 1 | 2 | 3 | 4 | 6 | 8 | 10 |
| | −30 to −2 | −1 | 0 | 8 ± 2 | 15 ± 2 | 22 ± 2 | 29 ± 2 Weeks | 43 ± 2 | 57 ± 2 | 71 ± 2 |
| | | | | Days | | | | | | |
| Hospitalization[8] | X | | | | | | | | | |
| Randomization | X | | | | | | | | | |
| Informed consent | X | | | | | | | | | |
| Genetic consent[9] | X | | | | | | | | | |
| Inclusion/Exclusion criteria | X[10] | | X | | | | | | | |
| Demography | X[10] | | | | | | | | | |
| Medical history/current medical conditions | X[10] | X | | | | | | | | |
| Prior and concomitant medication (including vaccination status) | X[10] | X | | | | | | | | |
| Surgical and Medical procedures | X | | | | | | | | | |
| NLRC4-GOF medical history and diagnosis[11] | S | | | | | | | | | |
| Hepatitis, HIV and TB Screen[12] | S | S | | | S | | S | S | | S |
| Physical examination[13] | X | X | X | X | X | X | X | X | | X |
| Body height/length[14] | X | X | | | | | | | | |
| Head circumference[15] | X | X | | | | | | | | |
| Body weight | X | X | X | X | X | X | X | X | | X |
| Body temperature | X | X | X | X | X | X | X | X | | X |
| Blood Pressure and Pulse Rate | X | X | X | X | X | X | X | X | | X |
| ECG evaluation[16] | X | X | | | | | | | | |
| Sexual Maturation (Tanner Stage)[17] | S | | | | | | | | | |
| Assessment of fertility[18] | S | | | | | | | As needed[18] | | |
| Pregnancy test (for females Tanner stage 2 and above) (Serum) | S | S | | | S | | S | S | | S |
| Blood chemistry[19] | X | X | X | X | X | X | X | X | | X |
| Inflammatory markers: CRP and ferritin[20] | X | X | X | X | X | X | X | X | | X |
| Coagulation panel[19] | X | X | X | | X | | X | X | | X |
| Hematology[19] | X | X | X | X | X | X | X | X | | X |
| Drug administration record (BBMAB1) | | | | | | | | X | | |
| Weekly phone call | | | | | | | | As required[21] | | |
| Assessment of flares (time to first flare) | | | | | | | | | | |
| Nutrition record[22] | X | X | X | X | X | X | X | X | | X |
| Stool calprotectin[23] | | | | | | | | | | |
| Physician's global assessment of disease activity (PGA) | X | X | X | X | X | X | X | X | | X |

TABLE 0-16-continued

Assessment Schedule

| Assessment | 85 ± 2 | 99 ± 2 | 113 ± 2 | 127 ± 2 | 141 ± 2 | 155 ± 2 | 169 ± 2 | 183 ± 2 | 197 ± 2[4] |
|---|---|---|---|---|---|---|---|---|---|
| Physicians' severity assessment of disease signs & symptoms | X | X | X | X | X | X | X | X | X |
| Patient's/Parent's global assessment of disease activity (PPGA) | X | X | X | X | X | X | X | X |  |
| PK blood collection[30] | X | X | X[25] | X[29] | X[26,29] |  |  |  |  |
| Immunogenicity sample collection (measure anti-drug antibodies against BBMAB1)[26,27,30] | X | X |  |  | X[26] |  |  |  |  |
| Target capture biomarkers (IL-1β, total IL-18, free IL-18, IL-18BP)[26,30] | X |  |  |  | X[26] |  |  |  |  |
| Exploratory immune biomarkers (CXCL9, CXCL10 (IP-10), IL-6, sIL2R)[26,30] | X |  |  |  | X[26] |  |  |  |  |
| Exploratory profiling biomarkers (serum): Proteomics profiling[26,30] | X |  |  |  | X[26] |  |  |  |  |
| DNA blood collection[28,30] | X |  |  |  |  |  |  |  |  |
| Glucocorticoid taper and cyclosporin dose discontinuation |  |  |  |  |  | As required | | | |
| Adverse events/serious adverse events |  |  |  |  |  | As required | | | |
| Study completion information |  |  |  |  |  |  |  |  | X |

| Period | | | | | | | | | |
|---|---|---|---|---|---|---|---|---|---|
| Treatment Period | | | | | | | | | |
| Visit Name | | | | | | | | | |
| | Period 1b[3] | | | | | Period 1, Open Label Treatment Period | | Period 1c | |
| Days | 85 ± 2 | 99 ± 2 | 113 ± 2 | 127 ± 2 | 141 ± 2 | 155 ± 2 | 169 ± 2 | 183 ± 2 | 197 ± 2[4] |
| Weeks | 12 | 14 | 16 | 18 | 20 | 22 | 24 | 26 | 28 |
| Hospitalization[8] | S | S | S | S | S | As required | S | S | S |
| Randomization |  |  |  |  |  |  |  |  |  |
| Informed consent |  |  |  |  |  |  |  |  |  |
| Genetic consent[9] |  |  |  |  |  |  |  |  |  |
| Inclusion/Exclusion criteria |  |  |  |  |  |  |  |  |  |
| Demography |  |  |  |  |  |  |  |  |  |
| Medical history/current medical conditions |  |  |  |  |  |  |  |  |  |
| Prior and concomitant medication (including vaccination status) |  |  |  |  |  | As required | | | |
| Surgical and Medical procedures |  |  |  |  |  | As required | | | |
| NLRC4-GOF medical history and diagnosis[11] |  |  |  |  |  |  |  |  |  |
| Hepatitis, HIV and TB Screen[12] |  |  |  |  |  |  |  |  |  |
| Physical examination[13] | S | S | S | S | S | S | S | S | S |
| Body height/length[14] | X | X |  |  |  | X |  | X |  |
| Body weight | X | X | X | X | X | X | X | X | X |
| Head circumference[15] | X | X | X | X | X |  | X | X | X |
| Body temperature | X | X | X | X | X | X | X | X | X |
| ECG evaluation[16] |  |  |  |  |  |  |  |  |  |
| Blood Pressure and Pulse Rate | X | X | X | X | X | X | X | X | X |
| Sexual Maturation (Tanner Stage)[17] |  |  |  |  |  | As needed[18] | | | |
| Assessment of fertility[18] |  |  |  |  |  |  |  |  | X |
| Pregnancy test (for females Tanner stage 2 and above) (Serum) | S | S | S | S | S | S | S | S | S |

TABLE 0-16-continued

Assessment Schedule

| Assessment | 0 | 1 | 2 | 4 | 6 | 8 | 10 | 12 | 14 | 16 | 18 | 20 | 22 | 24⁴ |
|---|---|---|---|---|---|---|---|---|---|---|---|---|---|---|
| Blood chemistry[19] | | X | X | X | X | X | X | X | X | X | X | X | X | X |
| Inflammatory markers: CRP and ferritin[20] | | X | | X | | X | | X | | X | | X | | X |
| Coagulation panel[19] | | | X | X | X | X | X | X | X | | X | | X | X |
| Hematology[19] | | X | X | X | X | X | X | X | X | X | X | X | X | X |
| Drug administration record (BBMAB1) | | | | X | X | X | X | X | X | X | X | X | | |
| Weekly phone call | | | | | | | | | | | | | | |
| Assessment of flares (time to first flare) | | | | | | | | | As required[21] | | | | | |
| Nutrition record[22] | | X | | X | X | X | X | X | X | X | X | X | | X |
| Stool calprotectin[23] | | X | | X | X | X | X | X | X | X | X | X | | X |
| Physician's global assessment of disease activity (PGA) | | X | | X | X | X | X | X | X | X | X | X | | X |
| Patient's/Parent's global assessment of disease activity (PPGA) | | | | | | X | | | | X | X | | | X |
| PK blood collection[30] | | | | | X[26,29] | X[26,29] | | | X[26] | X[26] | | X[25,29] | | |
| Immunogenicity sample collection (measure anti-drug antibodies against BBMAB1)[26,27,30] | | | | | X[26,29] | | | | X[26] | | | | | |
| Target capture biomarkers (IL-1β, total IL-18, free IL-18, IL-18BP)[26,30] | | | | | X[26,29] | | | | X[26] | | | | | |
| Exploratory immune biomarkers (CXCL9, CXCL10 (IP-10), IL-6, sIL2R)[26,30] | | | | | X[26,29] | | | | X[26] | | | | | |
| Exploratory profiling biomarkers (serum): Proteomics profiling[26,30] | | | | | | | | | | | | | | |
| DNA blood collection[28,30] | | | | | | | | | | | | | | |
| Glucocorticoid taper and cyclosporin dose discontinuation | | | | | | As required | | | | | | | | |
| Adverse events/serious adverse events | | | | | | | | As required | | | | | | |
| Study completion information | | | | | | | | | | | | | | |

Period 2, Randomized Withdrawal Period

| | | Period | | | | | | | | | | | | |
|---|---|---|---|---|---|---|---|---|---|---|---|---|---|---|
| | | Treatment Period | | | | | | | | | | | | |
| Visit Name | | Period 2, Randomized Withdrawal Period[5,6] | | | | | | | | | | | | |
| | 0 | 1 | 2 | 4 | 6 | 8 | 10 | 12 | 14 | 16 | 18 | 20 | 22 | 24⁴ |
| Days | | 15 ± 3 | 29 ± 3 | 43 ± 3 | 57 ± 3 | 71 ± 3 | 85 ± 3 | 99 ± 3 | 113 ± 3 | 127 ± 3 | 141 ± 3 | 155 ± 3 | 169 ± 3 | |
| Weeks | | 2 | 4 | 6 | 8 | 10 | 12 | 14 | 16 | 18 | 20 | 22 | 24 | |
| Hospitalization[8] | | | | | | | | | | | | | | |
| Randomization | X | | | | | | | | | | | | | |
| Informed consent | | | | | | | | | | | | | | |
| Genetic consent[9] | | | | | | | | | | | | | | |
| Inclusion/Exclusion criteria | | | | | | | | | | | | | | |
| Demography | | | | | | | | | | | | | | |
| Medical history/current medical conditions | | | | | | | | | | | | | | |
| Prior and concomitant medication (including vaccination status) | | | | | | | | As required | | | | | | |
| Surgical and Medical procedures | | | | | | | | As required | | | | | | |
| NLRC4-GOF medical history and diagnosis[11] | | | | | | | | | | | | | | |

TABLE 0-16-continued

Assessment Schedule

| Assessment | | | | | | | | | | | | |
|---|---|---|---|---|---|---|---|---|---|---|---|---|
| Hepatitis, HIV and TB Screen[12] | S | | | | | | | | | | | |
| Physical examination[13] | X | S | | X | S | S | S | S | S | S | S | S |
| Body height/length[14] | X | X | X | | X | X | X | X | X | X | X | X |
| Head circumference[15] | X | X | X | | X | X | X | X | X | X | X | X |
| Body temperature | X | X | X | X | X | X | X | X | X | X | X | X |
| Blood Pressure and Pulse Rate | X | X | X | X | X | X | X | X | X | X | X | X |
| ECG evaluation[16] | X | | | | | | | | | | | X |
| Sexual Maturation (Tanner Stage)[17] | | S | | | S | | | S | | S | | |
| Assessment of fertility[18] | | | | As needed[18] | | | | | | | | |
| Pregnancy test (for females Tanner stage 2 and above) (Serum) | X | S | | S | S | X | X | X | X | X | X | X |
| Blood chemistry[19] | X | X | X | X | X | X | X | X | X | X | X | X |
| Inflammatory markers: CRP and ferritin[20] | X | X | X | X | X | X | X | X | X | X | X | X |
| Coagulation panel[19] | X | X | X | X | X | X | X | X | X | X | X | X |
| Hematology[19] | X | X | X | X | X | X | X | X | X | X | X | X |
| Drug administration record (BBMAB1) | X | | X | X | X | X | X | X | X | X | X | X |
| Weekly phone call | | | | | | | | | | | | |
| Assessment of flares (time to first flare) | | | | As required | | | | | | | | |
| Nutrition record[22] | X | X | X | X | X | X | X | X | X | X | X | X |
| Stool calprotectin[23] | X | X | X | X | X | X | X | X | X | X | X | X |
| Physician's global assessment of disease activity (PGA) | X | | X | X | X | X | X | X | X | X | X | X |
| Physicians' severity assessment of disease signs & symptoms | | | | | | | | | | | | |
| Patient's/Parent's global assessment of disease activity (PPGA) | | | | | | | | | | | | |
| PK blood collection[30] | | X[26] | | X[26,29] | | | | | | | | X[26] |
| Immunogenicity sample collection (measure anti-drug antibodies against BBMAB1)[26,27,30] | | X[26] | | X[26,29] | | | | | | | | X[26] |
| Target capture biomarkers (IL-1β, total IL-18, free IL-18, IL-18BP)[26,30] | | X[26] | | X[26,29] | | | | | | | | X[26] |
| Exploratory immune biomarkers (CXCL9, CXCL10 (IP-10), IL-6, sIL2R)[26,30] | | X[26] | | X[26,29] | | | | | | | | X[26] |
| Exploratory profiling biomarkers (serum): Proteomics profiling[26,30] | | | | X[28] | | | | | | | | |
| DNA blood collection[28,30] | | | | | | | | | | | | |
| Glucocorticoid taper and cyclosporin dose discontinuation | | | | As required | | | | | | | | |
| Adverse events/serious adverse events | | | | | | | | | | | | |
| Study completion information | | | | | | | | | | | | |

TABLE 0-16-continued

Assessment Schedule

| | Period 3, Long Term Safety, Open Label Treatment | | | | | | | | | | |
|---|---|---|---|---|---|---|---|---|---|---|---|
| | Treatment Period | | | | | | | | | Unscheduled | Post-treatment follow-up |
| | Visit Name | | | | | | | | | | |
| | Period 3, Long Term Safety, Open Label Treatment⁵ | | | | | | | | | Unscheduled⁶ | Follow-up⁷ |
| | Days | | | | | | | | | | |
| | 1 | 85 ± 7 | 169 ± 7 | 253 ± 7 | 337 ± 14 | 519 ± 14 | 701 ± 14 | 883 ± 14 | 1065 ± 14 | NA | 1177 ± 14 |
| | Weeks | | | | | | | | | | |
| | 0 | 12 | 24 | 36 | 48 | 74 | 100 | 126 | 152⁴ | NA | 168 |
| Hospitalization⁸ | S | | | | | | As required | | | X | X |
| Randomization | | | | | | | | | | | |
| Informed consent⁹ | | | | | | | | | | | |
| Genetic consent⁹ | | | | | | | | | | | |
| Inclusion/Exclusion criteria | | | | | | | | | | | |
| Demography | | | | | | | | | | | |
| Medical history/current medical conditions | | | | | | | | | | | |
| Prior and concomitant medication (including vaccination status) | | | | | As required | As required | | | | X | X |
| Surgical and Medical procedures | | | | | | | | | | X | |
| NLRC4-GOF medical history and diagnosis¹¹ | | | | | | | | | | | |
| Hepatitis, HIV and TB Screen¹² | | | | | | | | | | | |
| Physical examination¹³ | S | S | S | S | S | S | S | S | S | X | X |
| Body height/length¹⁴ | X | X | X | X | X | X | X | X | X | X | X |
| Body weight | X | X | X | X | X | X | X | X | X | X | X |
| Head circumference¹⁵ | X | X | X | X | X | X | X | X | X | X | X |
| Body temperature | X | X | X | X | X | X | X | X | X | X | X |
| Blood Pressure and Pulse Rate | X | X | X | X | X | X | X | X | X | X | X |
| ECG evaluation¹⁶ | | | | | | | X | X | X | | X |
| Sexual Maturation (Tanner Staging)¹⁷ | | | X | | | | | | | | |
| Assessment of fertility¹⁸ | | | | | | | As needed¹⁸ | | | | |
| Pregnancy test (for females Tanner stage 2 and above) (Serum) | S | S | S | S | S | S | S | S | S | S | S |
| Blood chemistry¹⁹ | X | X | X | X | X | X | X | X | X | X | X |
| Inflammatory markers: CRP and ferritin²⁰ | X | X | X | X | X | X | X | X | X | X | X |
| Coagulation panel¹⁹ | X | X | X | X | X | X | X | X | X | X | X |
| Hematology¹⁹ | X | X | X | X | X | X | X | X | X | X | X |
| Drug administration record (BBMAB1) | | | | | | | q2w²⁴ | | | | |
| Weekly phone call | | | | | | | | | | | |
| Assessment of flares (time to first flare) | | | | | | | | | | | |
| Nutrition record²² | | | | | | | | | | | |
| Stool calprotectin²³ | X | X | X | X | X | X | X | X | X | X | X |
| Physician's global assessment of disease activity (PGA) | X | X | X | X | X | X | X | X | X | X | X |
| Physicians' severity assessment of disease signs & symptoms | | | | | | | | | | X | X |
| Patient's/Parent's global assessment of disease activity (PPGA) | | | | | | | | | | X | X |

TABLE 0-16-continued

Assessment Schedule

| | | | |
|---|---|---|---|
| PK blood collection[30] | X[25,29] | | X |
| Immunogenicity sample collection (measure anti-drug antibodies against BBMAB1)[26,27,30] | X[26] | | X[29] |
| Target capture biomarkers (IL-1β, total IL-18, free IL-18, IL-18BP)[26,30] | X[26] | | X[29] |
| Exploratory immune biomarkers (CXCL9, CXCL10 (IP-10), IL-6, sIL2R)[26,30] | X[26] | | X[29] |
| Exploratory protein profiling biomarkers (serum)[25,30] | X[26] | | X[29] |
| DNA blood collection[28,30] | | | |
| Glucocorticoid taper and cyclosporin dose discontinuation | | As appropriate | |
| Adverse events/serious adverse events | | As required | X |
| Study completion information | | | X |

X Assessment to be recorded in the clinical database or received electronically from a vendor.
S Assessment to be recorded in the source documentation only.
[1] Evidence of active disease must be present before the first dosing as assessed by PGA of disease activity > minimal and Ferritin > 600 ng/ml and/or elevation of CPR > 20 mg/l. Screening window may be extended in order to allow enough time to prove presence of active disease.
[2] Baseline assessments may be performed pre-dose on Day 1.
[3] Visits may be skipped if glucocorticoid tapering/cyclosporin discontinuation criteria has been achieved earlier as described in Secion 6.2.1.1, but assessments from Period 1b Week 24 must be completed. For patients free from glucocorticoids/cyclosporin on study entry, a minimum of 4 weeks in Period 1b must be completed (i.e. on completion of Period 1a, move to Period 1b Week 22 and Week 24 in the assessment schedule) before moving to Period 1c.
[4] End of Treatment visit: Week 28 is the End of Period 1. Week 152 is the End of Period 2. Week 24 is the End of Period 2 visit that should be performed for all patients including those who discontinue early from Period 3.
[5] If a patient flares in Period 2 blinded treatment may be stopped and open label BBMAB1 treatment may be given for the remainder of Period 2.
[6] In case of a flare in-between scheduled visits, an unscheduled visit assessment should be performed.
[7] If a patient discontinues early from the study, the assessments in the Follow-up visit should be performed 16 weeks after the last dose of study treatment.
[8] Based on the Investigator's judgement, patients can be hospitalized for dosing. Hospitalizations for this reason will not be recorded as a SAE.
[9] Optional consent.
[10] NLRC4-GOF treatment, surgical/medical procedures information should be collected from the previous 6 months where possible.
[11] Detailed medical history of the patient's condition should be documented to demonstrate how the patient's condition has been managed and diagnosed (Section 8.2). Molecular diagnosis of NLRC4 mutation and IL-18 must occur at Screening if not already available in the patient history. The Screening window may be extended in order to allow results from Molecular diagnosis of NLRC4 mutation to be available, all other Screening assessments (apart from Informed Consent) should be performed after the Molecular diagnosis is available and within the Screening window.
[12] Test result from the previous 3 months can be accepted if already available in the patient history. TB testing includes QuantiFERON ® or Chest X-ray.
[13] A short (abbreviated) physical examination can be conducted except at Screening, Period 1 D 29 and Week 28, Period 2 Week 24, and at the Follow up visit.
[14] Length for small infants less than 2 years old.
[15] Head (Occipito-Frontal) circumference should be measured for all patients aged 3 years and under (age at the time of Screening and until the patient turns 3 years old).
[16] At Screening, an ECG performed within the previous 3 months may be used if already available in the patient history. An ECG may be conducted at any point throughout the study if deemed necessary in the judgement of the Investigator.
[17] for children ≥8 years of age until reach stage 5.
[18] Females with Tanner stage 2 and above: should be reviewed at least every 3 months to evaluate the need and compatibility of the method of contraception and need for pregnancy testing.
[19] Safety laboratory assessments will be performed at the local laboratory. Safety blood samples have priority over the PK, IG and Biomarker sample collection where TBV may be limited. Additional safety laboratory assessments can be done based on the investigators judgement according to standard of care.
[20] Where possible, CRP and ferritin should be included as part of SoC chemistry sampling, rather than collecting a seperate sample.
[21] Weekly site phone calls to patients/parents/caregivers will be performed for patients not hospitalized during Period 1b to monitor response during the glucocorticoid tapering.
[22] Only for hospitalized patients.
[23] Sample collection at home 1-2 days prior to clinic visit if possible. Keep sample ambient or as per local laboratory guidance.
[24] Study drug administration will continue every 2 weeks. Home nursing visits by a mobile nurse may be possible, depending on local regulations and capabilities. Weight and AEs will be assessed at each dosing. AE assessment will be performed by the investigator or appropriate delegated study team member based on information obtained from the mobile nurse. Weight from the previous dosing day may be used for the dose calculation for a home dosing visit.
[25] PK sampling immediately after infusion on Day indicated (see Section 9.1.1).
[26] Pre-dose.
[27] In case of suspected allergic hypersensitivity, the patient should return to the site and a sample to assess immunogenicity will be collected.
[28] Only collected if optional consent given. Can be collected any time during the study.
[29] Optional sample (only if patient weight is above 5 kg).
[30] Priority list for the analytics (in case limited amount of blood is available): minimum PK > IG > target capture biomarkers > immune biomarkers > protein profiling > DNA, for Baseline PK, IG and biomarker must be analyzed.

8.1. Screening
Screening

It is permissible to re-screen a patient if s/he fails the initial Screening; however, each case must be discussed and agreed with the Sponsor on a case-by-case basis. Patients who are re-screened must be re-consented and a re-screening CRF must be completed.

In the case where a safety laboratory assessment at Screening is outside of the range specified in the exclusion criteria, the assessment may be repeated once prior to entering treatment. If the repeat value remains outside of the specified ranges, the patient must be excluded from the study.

8.1.1. Eligibility Screening
8.1.1.1. Hepatitis Screen, HIV Screen

Where appropriate, patients may be screened for Hepatitis B surface antigen (HBsAg) and, if standard local practice, Hepatitis B core antigen (HBcAg). Screening for Hepatitis C will be based in HCV antibodies and if positive, HCV RNA levels should be determined. Negative test results from the previous 3 months may be used if available.

Evaluation for HIV seropositivity will be performed, and, if positive, confirmation by a second technique available at the laboratory site e.g. Western blot. Appropriate counseling will be made available by the Investigator in the event of a positive confirmatory test. Notification of state and federal authorities, as required by law, will be the responsibility of the Investigator. Negative test results from the previous 3 months may be used if available.

8.1.2. Tuberculosis (TB) Testing

In order to evaluate the TB status of the patient, a TB test may be performed at Screening as per local regulations/ guidelines using one of the following methods:
QuantiFERON®-TB assay
Chest x-ray Negative test results from the previous 3 months may be used if available. Any significant findings will be recorded in the Relevant medical history/Current medical conditions section of the eCRF as necessary.

8.1.3. Information to be Collected on Screening Failures

Patients (or parent/legal guardian) who sign an informed consent/assent form and where the patient subsequently found to be ineligible will be considered a screen failure. The reason for screen failure should be entered on the applicable Case Report Form (Disposition form). The visit information, demographic information, informed consent, Inclusion/Exclusion, NLRC4-GOF medical history and Disposition pages must also be completed for screen failure patient. No other data will be entered into the clinical database for patients who are screen failures, unless the patient experienced a serious adverse event during the Screening phase. Adverse events that are not SAEs will be followed by the investigator and only recorded in the patient's source data.

Patients (or parent/legal guardian) who sign an informed consent/assent form and where the patient is considered eligible but fail to be started on treatment for any reason will be considered an early terminator. The reason for early termination should be captured on the appropriate disposition Case Report Form (Disposition page). If a patient (or parent/legal guardian) voluntarily withdraws participation from the study during the Screening phase then visit information, demographic information, informed consent, NLRC4-GOF medical history, Inclusion/Exclusion pages, Withdrawal of Informed Consent and Disposition must be completed.

8.2. Patient Demographics/Other Baseline Characteristics
Demographic Information Country-specific regulations should be considered for the collection of demographic and baseline characteristics in alignment with CRF. Patient race and ethnicity are collected and analyzed to identify variations in safety or efficacy due to these factors as well as to assess the diversity of the study population as required by Health Authorities.

Patient demographics: year of birth (age), sex, race, predominant ethnicity (if permitted) and relevant medical history/current medical conditions (until date of signature of informed consent) will be recorded in the eCRF. Where possible, the diagnosis and not symptoms should be recorded. Vaccination status should be recorded as part of the collection of medical history/current medical conditions.

Nlrc4-GOF Medical History and Diagnosis

A detailed medical history of the patient's condition should be documented in the eCRF to demonstrate how the patient's condition has been managed and diagnosed. Details (including dates of assessments) should include:
  presenting symptoms
  molecular diagnosis of NLRC4-GOF (can be performed by site per local approved procedures for diagnosis at Screening if not already available)
  IL-18 assay level (can be performed by site per local approved procedures for diagnosis at Screening if not already available)
  treatment interventions and outcomes/response
  time to and number of flares
  laboratory values of clinical significance e.g. cytokines, CRP, ferritin
  nutritional support
  hospitalization
  family history
  any other investigations
  any other clinically relevant information considered clinically relevant to support the wider understanding of the disease or diagnosis As outlined in Section 6.2.1 Concomitant Therapy, all key medications, procedures, and significant non-drug therapies (including physical therapy and blood transfusions) administered for the treatment of NLRC4-GOF in the 6 months before the patient was enrolled into the study should be recorded if possible.

See the protocol Section 6.2.1 Concomitant Therapy for further details on what information must be recorded on the appropriate page of the eCRF.

8.3. Efficacy

Efficacy assessments will be performed at the timepoints defined in the Assessment Schedule (Table 8-1).

If an epidemic or pandemic (e.g. COVID-19 pandemic) limits or prevents on-site study visits, alternative methods of providing continuing care and collecting efficacy assessments may be implemented.

8.3.1. Physician Global Assessment of Disease Activity (PGA)

Physician Global Assessment (PGA) of disease (Appendix 4) will be evaluated at the timepoints outlined in the Assessment Schedule (Table 8-1).

PGA will be performed prior to the CRP results being available from the local laboratory in order to prevent bias in the evaluation. It is encouraged that one investigator assess the same patient throughout the study to ensure consistency between assessments.

The physician's global assessment will be based on a 5-point scale:
  0=Absent (no) disease associated clinical signs and symptoms 1=Minimal disease associated signs and symptoms
2=Mild disease associated signs and symptoms
3=Moderate disease associated signs and symptoms
4=Severe disease associated signs and symptoms 8.3.2. Physician's Severity Assessment of Disease Signs and Symptoms Physician's severity assessment of key disease-specific signs and symptoms (Appendix 5) will be assessed at the timepoints outlined in the Assessment Schedule (Table 8-1).

It is encouraged that one investigator assess the same patient throughout the study to ensure consistency between assessments. The following signs and symptoms will be assessed:

Abdominal pain
Diarrhea
Skin disease
Fever
Tachycardia

Physician's severity assessment of key disease-specific signs and symptoms will be based on a 5-point scale:
0=Absent
1=Minimal
2=Mild
3=Moderate
4=Severe 8.3.3. Inflammatory Markers CRP and ferritin will be measured as shown in Table 8-1 by the local laboratory. Where possible, analysis should be included as part of the routine safety laboratory monitoring to avoid additional sample collection.

8.3.4. Patient's/Parent's Global Assessment of Disease Activity (PPGA)

Patient's assessment of disease activity (PPGA) will be collected on a paper CRF to be transcribed into the electronic CRF (Appendix 6).

The PPGA should be completed prior to any clinical assessments at any given visit. This instrument needs to be filled out at the timepoints outlined in Table 8-1 by the patient or parent/caregiver depending on the age of the patient, as per local guidance. Where possible, a parent/caregiver can assist. However, the same evaluator (same patient or parent/caregiver) should perform the assessment throughout the study for consistency.

Patients or parents/caregivers will be instructed to complete the PPGA.

The investigator or site staff should not give verbal or non-verbal cues to influence the answers to the PPGA. The investigator or site staff will only be allowed to review the instrument for completeness.

The PPGA is based on a 5-point scale:
0=Absent (no) disease associated clinical signs and symptoms
1=Minimal disease associated signs and symptoms
2=Mild disease associated signs and symptoms
3=Moderate disease associated signs and symptoms
4=Severe disease associated signs and symptoms 8.3.5. Response to Treatment Criteria Response to treatment will be collected through the PGA (Section 8.3.1) and inflammatory markers (Section 8.3.3).

Period 1

Complete response: A patient is considered to have a complete response if (to be assessed on the same day):
The physician global assessment of disease activity is minimal or better and
There is either a 60% or greater reduction from Baseline or a normalization of either ferritin (<400 ng/ml) and/or CRP (<10 mg/L).

Partial response criteria: A patient is considered to have an incomplete (partial) response if (to be assessed on the same day):
The physician global assessment of disease activity improvement over Baseline by one step and
There is either a 30% or greater reduction from Baseline of either ferritin or CRP.

Period 2

Flare criteria: A patient is considered to have a flare if (to be assessed on the same day):
Physician global assessment of disease activity >minimal and
There is either a 60% or greater increase from entry levels in Period 2 or in patients who have normalized their levels an increase in ferritin >2500 ng/ml and/or elevation of CRP>20 mg/L.

Investigators when accessing the inflammatory markers for the response to treatment criteria, should as per medical judgment exclude alternative common causes of changes in CRP or ferritin (e.g. childhood infections, iron supplementation, blood transfusions) in this pediatric study population.

TABLE 0-17

Clinical Laboratory Safety Assessments (local) *

| Test Category | Test Name |
| --- | --- |
| Hematology | Hematocrit, Hemoglobin, Platelets, Red blood cells, White blood cells, Basophils, Eosinophils, Lymphocytes, Monocytes, Neutrophils (absolute value preferred, percentages are acceptable) |
| Chemistry | Albumin (ALB), Alkaline phosphatase, ALT, AST, Gamma-glutamyl-transferase (GGT), Lactate dehydrogenase (LDH), Bicarbonate, Calcium, Magnesium, Phosphorus, Chloride, Sodium, Potassium, Creatinine, Creatinine kinase, Total Bilirubin (TBL), Total Protein, Blood Urea Nitrogen (BUN) or Urea, Uric Acid, Amylase, Lipase, Glucose (non-fasting), CRP, Ferritin, D-dimer |
| Coagulation | Prothrombin time (PT), International normalized ration (INR), Partial thromboplastin time (PPT), Activated partial thromboplastin time (APTT) |
| Hepatitis markers | HIV, Hepatitis B and C (Screening) |
| Additional tests | Stool calprotectin TB-test (Screening) |
| Pregnancy Test | Serum pregnancy test (based on the assessment of fertility) |

9. Efficacy and/or Pharmacodynamic Endpoint(s)

The FAS of respective study periods will be used for analyses in this section.

The following secondary efficacy endpoints will be analyzed:
response at Day 29, end of Periods 1 and 2.
serological remission at Day 29, end of Periods 1 and 2
glucocorticoid therapy to <0.2 mg/kg/day in Period 1
Time to first flare in Period 2
Physician's severity assessment of NLRC4 GOF disease signs and symptoms
Patient's/parent's global assessment of NLRC4 GOF disease activity
Physician's global assessment of NLRC4 GOF disease activity The proportion of patients who respond to BBMAB1 treatment on Day 29 and thereafter until the end of Period 1, will be calculated. The definition of an BBMAB1 treatment complete responder is given in Section 8.3.5 of the protocol.

The proportion of patients with complete response will also be evaluated at the end of Period 2.

The inflammatory markers (CRP and ferritin) will be summarized by treatment and visit.

The proportion of patients who achieve serological remission will be evaluated at Day 29, end of Period 1 and 2.

The proportion of patients who achieve glucocorticoid taper and cyclosporin reduction after Day 29 until end of Period 1 will be calculated. The definition of the glucocorticoid taper and cyclosporin reduction is given in Section 6.2.1.1 of the protocol.

Flare

Flare will be assessed by Physician's global assessment of disease activity, ferritin and/or CRP as given in flare criteria in Section 8.3.5 of the protocol.

The time to first flare will be summarized by treatment for Period 2. Kaplan Meier graphs with separate lines by treatment group will be provided for graphical presentation.

Other Efficacy Endpoints

Summary statistics for the absolute values and change from Baseline in the Physician's severity assessment of disease sign and symptoms, Patient's/parent's global assessment of disease activity and Physician's global assessment of disease activity will be provided by treatment and visit. Frequency tables for each symptom assessed by the physician and patient/parent will be presented by visit. The frequency distribution of the severity scores (absent, minimal, mild, moderate, severe) will be calculated by treatment and visit.

10. References

Anon (2004) The Fourth Report on the Diagnosis, Evalutation, and Treatment of High Blood Pressure in Children and Adolescents. Pediatrics; 114 Suppl 2:555-576.

Anon (2017) The Hospital for Sick Children Research Ethics Board Blood Sampling Guidelines (internet) Available at: www.sickkids.ca/Research/Research-Ethics/forms-guidelines-templates/index.html (Accessed on 6 Oct. 2020).

Baracaglia C, Gatto A, Pardeo M, et al (2015) Anti interferon-gamma (IFNγ) monoclonal antibody treatment in a patient carrying an NLRC4 mutation and severe hemophagocytic lymphohistiocytosis. Pediatric Rheumatology; 13 (Suppl 1): 068.

Barsalou J, Blincoe A, Fernandez 1, et al (2008) Rapamycin as an adjunctive therapy for NLRC4 associated macrophage activation syndrome. Front Immunol; 9:2162.

Blondell R D, Roster M B, Dave K C (1999) Disorders of puberty. Am Fam Physician; 60 (1): 209-18, 223-4.

Booshehri L M and Hoffman H M (2019) CAPS and NLRP3. J Clin Immunol; 39:277-286.

Canna S W, Almeida de Jesus A, Gouni S, et al (2014) An activating NLRC4 inflammasome mutation causes autoinflammation with recurrent macrophage activation syndrome. Nat Genet; 10:1140-1146.

Canna S W, Girard C, Malle L, et al (2017) Life-threatening NLRC4-associated hyperinflammation successfully treated with IL-18 inhibition. J Allergy Clin Immunol; 139:1698-1701.

Chakraborty A, Tannenbaum S, Rordorf C, et al (2012) Pharmacokinetic and pharmacodynamic properties of canakinumab, a human anti-interleukin-1β monoclonal antibody. Clinical pharmacokinetics; 51 (6), pp.e1-e18.

Chear C T, Nallusamy R, Canna S W, et al (2020) A novel de novo NLRC4 mutation reinforces the likely pathogenicity of specific LRR domain mutation. Clin Immunol; 211:108328.

FDA (2007) Guidance for Industry. Drug-Induced Liver Injury: Pre-marketing Clinical Evaluation (Draft Guidance) (internet) Available from: evs.nci.nih.gov/ftp1/CT-CAE/Related/UCM072278.pdf (Accessed 8 Oct. 2020).

Feld L G and Corey H (2007) Hypertension in Childhood. Pediatric in Review; 28:283-98.

Fleming S, Thompson M, Stevens R, et al (2011) Normal ranges of heart rate and respiratory rate in children from birth to 18 years of age: a systematic review of observational studies. Lancet; 19;377 (9770): 1011-8.

Girard C, Rech J, Brown M, et al (2016) Elevated serum levels of free interleukin-18 in adult-onset Still's disease. Rheumatology; 55:2237-2247.

Kofoed E M and Vance R E (2011) Innate immune recognition of bacterial ligands by NAIPs determines inflammasome specificity. Nature; 477:592-595.

Kou R, and Shuei L (2009) Bradypnea, Encylopedia of Molecular Mechanisms of Disease p 241-243.

Liang J, Alfano D N, Squires J E, et al (2017) Autoinflammation With Hemophagocytic Lymphohistiocytosis, Hepatosplenomegaly, Fetal Thrombotic Vasculopathy, and Congenital Anemia and Ascites. Pediatr Dev Pathol; 20 (6): 498-505.

Miao E A, Mao D P, Yudkovsky N, et al (2010) Innate immune detection of the type III secretion apparatus through the NLRC4 inflammasome. Proc Natl Acad Sci USA; 107:3076-3080.

Moghaddas F, Zeng P, Zhang Y, et al (2018) Autoinflammatory mutation in NLRC4 reveals a leucine-rich repeat (LRR)-LRR oligomerization interface. J Allergy Clin Immunol; 142:1956-1967 e1956.

Romberg N, Al Moussawi K, Nelson-Williams C, et al (2014) Mutation of NLRC4 causes a syndrome of enterocolitis and autoinflammation. Nature Genetics; 46 (10): 1135-1139.

Romberg N, Vogel T P and Canna S W (2017) NLRC4 inflammasomopathies. Curr Opin Allergy Clin Immunol; 17:398-404.

Tak P P, Bacchi M and Bertolino M (2006) Pharmacokinetics of IL-18 binding protein in healthy volunteers and subjects with rheumatoid arthritis or plaque psoriasis. Eur J Drug Metab Pharmacokinet; 31:109-116.

Weiss E S, Girard-Guyonvarc'h C, Holzinger D, et al (2018) Interleukin-18 diagnostically distinguishes and pathogenically promotes human and murine macrophage activation syndrome. Blood; 131 (13): 1442-1455.

WHO (2020) The WHO Child Growth Standards (internet) Available from: www.who.int/childgrowth/en/(Accessed 6 Oct. 2020)

Yan X, Chen Y and Krzyzanski W (2012) Methods of solving rapid binding target-mediated drug disposition model for two drugs competing for the same receptor. Journal of pharmacokinetics and pharmacodynamics; 39 (5), pp 543-60.

Zhao Y, Yang J, Shi J et al (2011) The NLRC4 inflammasome receptors for bacterial flagellin and type III secretion apparatus. Nature; 477:596-600.

Appendices

Appendix 1: Clinically notable laboratory values and vital signs

The following defined notable laboratory or vital sign abnormalities will be communicated at the same time as they are available to investigators to Novartis. Novartis will determine if further consultations with Investigator(s) are appropriate.

Newly Occurring Selected Notable Laboratory Abnormalities in Pediatric Patients (<16 Years of Age):

Albumin: <LLN
>3×-, 5×-, 10×-, and 20×ULN elevations of AST, ALT, and either ALT or AST*
Any elevations of bilirubin; elevated bilirubin to >1.5× ULN, and to >2×ULN*
Any elevations of ALP>1.5×ULN*
Elevation of ALT and/or AST (>3×ULN) accompanied by elevated bilirubin (>1.5×ULN, >2×ULN)*
Gamma-Glutamyltransferase (GGT): >3×ULN
Creatinine (serum): ≥1.5×ULN
Potassium: ≥5.5 mmol/L, or ≤3.5 mmol/L
Magnesium: ≥1.2 mmol/L, or ≤0.7 mmol/L
Sodium: ≥150 mmol/L, or ≤130 mmol/L
Hemoglobin: ≥2 g/dL decrease from Baseline, or <8.5 g/dL
Platelet count: <Lower Limit of Normal (LLN)
White blood cell count: ≤0.8×LLN or ≥1.2×ULN
Neutrophils: ≤0.9×LLN or ≥1.2×ULN
Eosinophils: ≥1.1×ULN
Lymphocytes: <LLN or ≥1.1×ULN
Protein urine dipstick: Positive (Trace, ≥+)

Notable Vital Signs Abnormalities in Pediatric Patients (<16 Years of Age):
Systolic/diastolic blood pressure[1]:
High: ≥95th percentile of the age and height group
Low: ≤5th percentile of the age and height group
Oral body temperature (° C.)
High: ≥38.4° C.
Low: ≤35.0° C.
Pulse (bpm): refer to Table 16-1

TABLE 0-18

Abnormal pulse rate (bpm) in pediatric population[2]

| Age | High | Low |
|---|---|---|
| 1-6 months | >160 | <120 |
| 6-12 months | >150 | <110 |
| 12-18 months | >140 | <103 |
| 18-24 months | >135 | <98 |
| 2-3 years | >128 | <92 |
| 3-4 years | >123 | <86 |
| 4-6 years | >117 | <81 |
| 6-8 years | >111 | <74 |
| 8-12 years | >103 | <67 |
| 12-15 years | >96 | <62 |
| ≥15 years | >92 | <58 |

Weight:
High: increase from Baseline[3] of ≥2 BMI-for-age percentile categories[4]
Low: decrease from Baseline[3] of ≥2 BMI-for-age percentile categories[4]
Respiratory rate: refer to Table 16-2

TABLE 0-19

Abnormal respiratory rate (breaths per minute) in pediatric population[2, 5]

| Age | High | Low |
|---|---|---|
| 1-6 months | >55 | <33 |
| 6-12 months | >50 | <30 |
| 12-18 months | >46 | <28 |
| 18-24 months | >40 | <25 |
| 2-3 years | >34 | <22 |
| 3-4 years | >29 | <21 |
| 4-6 years | >27 | <20 |
| 6-8 years | >24 | <18 |
| 8-12 years | >22 | <16 |

TABLE 0-19-continued

Abnormal respiratory rate (breaths per minute) in pediatric population[2, 5]

| Age | High | Low |
|---|---|---|
| 12-15 years | >21 | <15 |
| ≥15 years | >20 | <13 |

[1]Blood pressure percentiles are calculated for each blood BP record using the method described in Appendix B of The Fourth Report on the Diagnosis, Evaluation and Treatment of High Blood Pressure in Children and Adolescents (Anon 2004).
[2]Fleming S et al 2011.
[3]Baseline BMI-for-age weight status categories are underweight (less than the 5th percentile), healthy weight (5th percentile to less than the 85th percentile), overweight (85th to less than the 95th percentile) and obese (equal to or greater than the 95th percentile);
[4]BMI-for-age percentiles categories (P3, P5, P10, P25, P50, P75, P85, P90, P95, P97) are obtained from the WHO Growth Charts (www.who.int/childgrowth/en/) (WHO 2020);
Note: For patients less than 2 years old, growth charts are based on recumbent length instead of height;
[5]Kou R and Shuei L 2009.
Note: Only post-Baseline values will be flagged as notable abnormalities Newly Occurring Selected Notable Laboratory Abnormalities in Adult Patients (≥16 Years of Age):
Albumin: <LLN
3×-, 5×-, 10×-, and 20×ULN elevations of AST, ALT, and either ALT or AST*
Any elevations of bilirubin; elevated bilirubin to >1.5× ULN, and to >2×ULN*.
Any elevations of ALP>1.5×ULN
Elevation of AST and/or ALT (>3×ULN) accompanied by elevated bilirubin (>1.5×ULN, >2×ULN)
Gamma-Glutamyltransferase (GGT): >3×ULN
Creatinine (serum): ≥1.5×ULN
Creatinine clearance: (Cockroft-Gault formula)[5]: ≥25% decrease from Baseline
Potassium: ≥5.5 mmol/L, or ≤3.0 mmol/L
Magnesium: ≥1.5 mmol/L, or ≤0.5 mmol/L
Sodium: ≥150 mmol/L, or ≤130 mmol/L
Calcium: ≥1.2×ULN or <Lower Limit of Normal (LLN)
Hemoglobin: ≥2 g/dL decrease from Baseline, or <10.0 g/dL
Platelet count: <LLN
White blood cell count: ≤0.8×LLN or ≥1.2×ULN
Neutrophils: ≤0.9×LLN or ≥1.2×ULN
Eosinophils: ≥1.1×ULN
Lymphocytes: <LLN or ≥1.1×ULN
Protein urine dipstick: ≥++

Newly Occurring Selected Notable Vital Signs Abnormalities in Adult Patients (≥16 Years of Age):
Systolic/Diastolic blood pressure: ≥25% decrease or ≥25% increase from Baseline or to ≥140/90
Pulse: ≥110 bpm with ≥15% change from Baseline, or <50 bpm with ≥15% change from Baseline

*Source: Draft October 2007 FDA Guidance for Industry Drug-Induced Liver Injury: Premarketing Clinical Evaluation (FDA 2007)

Cockroft-Gault formula (Men): Creatinine clearance (mL/min)=[((140−age (years))×weight (kg))/(serum creatinine (µmol/L)/88.4) (mg/dL)×72]

Cockroft-Gault formula (Women): Creatinine clearance (mL/min)=[((140−age (years))×weight (kg))/(serum creatinine (μmol/L)/88.4) (mg/dL)×72]×0.85

Note: Only post-Baseline values will be flagged as notable abnormalities

TABLE 0-20

Recommended Dimensions for Blood Pressure Cuff Bladders

| Age Range | Width [cm] | Length [cm] | Maximum Arm Circumference [cm]* |
|---|---|---|---|
| Newborn | 4 | 8 | 10 |
| Infant | 6 | 12 | 15 |
| Child | 9 | 18 | 22 |
| Small adult | 10 | 24 | 26 |
| Adult | 13 | 30 | 34 |
| Large adult | 16 | 38 | 44 |

*calculated so that the bladder can encircle even the largest arm by at least 80%

Source: Feld and Corey Pediatrics in review (2007)

Appendix 2: Anaphylaxis

Anaphylaxis is highly likely when any one of the following 3 criteria are fulfilled:
1. Acute onset of an illness (minutes to several hours) with involvement of the skin, mucosal tissue, or both (e.g., generalized hives, pruritus or flushing, swollen lips-tongue-uvula)
   AND AT LEAST ONE OF THE FOLLOWING:
   a. Respiratory compromise (e.g., dyspnea, wheeze-bronchospasm, stridor, reduced PEF, hypoxemia)
   b. Reduced BP or associated symptoms of end-organ dysfunction (e.g., hypotonia [collapse], syncope, incontinence)
2. Two or more of the following that occur rapidly after exposure to a likely allergen for that patient (minutes to several hours):
   a. Involvement of the skin mucosal tissue (e.g., generalized hives, pruritus or flushing, swollen lips-tongue-uvula)
   b. Respiratory compromise (e.g., dyspnea, wheeze-bronchospasm, stridor, reduced PEF, hypoxemia)
   c. Reduced BP or associated symptoms (e.g., hypotonia [collapse], syncope, incontinence)
   d. Persistent gastrointestinal symptoms (e.g., crampy abdominal pain, vomiting)
3. Reduced BP after exposure to known allergen for that patient (minutes to several hours)
   a. Adults: systolic BP of less than 90 mm Hg or greater than 30% decrease from Baseline.

Appendix 3: The Toronto Hospital for Sick Children Research Ethics Board (REB) Blood Sampling Guidelines The following recommendations by the Toronto Hospital for Sick Children Research Ethics Board will be used to guide the investigator on the maximum blood volume collected during the study. Investigators should closely monitor total blood collection to ensure that the limits outlined in the guidance or per local restrictions from the IRB/EC are adhered to.

For research of infants, children and adolescents, the guidance allows total blood-drawing of up to 5% of the patient's total blood volume over an eight week period, on a single occasion or in divided portions.

TABLE 0-21

Blood volume changes with age, thus amount available per kg will be:

| | Calculation of 5% Blood Volume by weight |
|---|---|
| Neonates (*4% of TBV) | *3.0 mL/kg |
| 1 month to 10 years | 4.0 mL/kg |
| 10-15 years | 3.7 mL/kg |
| Greater than 15 years | 3.6 mL/kg |

Adapted from The Hospital for Sick Children Research Ethics Board Blood Sampling Guide (Anon 2017).

Example 5

One adult and one infant patient, each exhibiting signs and symptoms of NLRC4-GOF, were intravenously administered the bbMab1 bispecific antibody targeting both IL-1b and IL-18 simultaneously at a dose of 10 mg/kg every two weeks. The clinical response was evaluated by PGA as described above. Both patients exhibited a clinical and serological response. Serological remission is observed. Both patients exhibited a reduction in inflammatory markers. For example, both patients exhibited a reduction in serum CRP. One patient exhibited a reduction in serum ferritin.

Sequence Table

Useful amino acid and nucleotide sequences for practicing the invention are disclosed in Table 22.

TABLE 22

Sequences according to embodiments of the invention

| SEQ ID NUMBER | Ab region | Sequence |
|---|---|---|
| mAb1 | | |
| SEQ ID NO: 1 (Kabat) | HCDR1 | SYAIS |
| SEQ ID NO: 2 (Kabat) | HCDR2 | NIIPMTGQTYYAQKFQG |
| SEQ ID NO: 3 (Kabat) | HCDR3 | AAYHPLVFDN |
| SEQ ID NO: 4 (Chothia) | HCDR1 | GGTFKSY |
| SEQ ID NO: 5 (Chothia) | HCDR2 | IPMTGQ |
| SEQ ID NO: 6 (Chothia) | HCDR3 | AAYHPLVFDN |
| SEQ ID NO: 7 | VH | EVQLVQSGAEVKKPGSSVKVSCKASG GTFKSYAISWVRQAPGQGLEWMGNIIP MTGQTYYAQKFQGRVTITADESTSTAY |

TABLE 22-continued

Sequences according to embodiments of the invention

| SEQ ID NUMBER | Ab region | Sequence |
| --- | --- | --- |
| | | MELSSLRSEDTAVYYCARAAYHPLVFD<br>NWGQGTLVTVSS |
| SEQ ID NO: 8 | DNA VH | GAGGTGCAGCTGGTGCAGAGCGGCG<br>CCGAGGTGAAGAAGCCCGGCAGCAG<br>CGTGAAGGTGAGCTGCAAGGCCAGC<br>GGCGGCACCTTCAAGAGCTACGCCA<br>TCAGCTGGGTGAGGCAGGCCCCCGG<br>CCAGGGCCTGGAGTGGATGGGCAAC<br>ATCATCCCCATGACCGGCCAGACCTA<br>CTACGCCCAGAAGTTCCAGGGCAGG<br>GTGACCATCACCGCCGACGAGAGCA<br>CCAGCACCGCCTACATGGAGCTGAG<br>CAGCCTGAGGAGCGAGGACACCGCC<br>GTGTACTACTGCGCCCAGGGCCGCCT<br>ACCACCCCCTGGTGTTCGACAACTG<br>GGCCAGGGCACCCTGGTGACCGTGA<br>GCAGC |
| SEQ ID NO: 9 | Heavy Chain | EVQLVQSGAEVKKPGSSVKVSCKASG<br>GTFKSYAISWVRQAPGQGLEWMGNIIP<br>MTGQTYYAQKFQGRVTITADESTSTAY<br>MELSSLRSEDTAVYYCARAAYHPLVFD<br>NWGQGTLVTVSSASTKGPSVFPLAPS<br>SKSTSGGTAALGCLVKDYFPEPVTVS<br>WNSGALTSGVHTFPAVLQSSGLYSLSS<br>WTVPSSSLGTQTYICNVNHKPSNTKV<br>DKRVEPKSCDKTHTCPPCPAPEAAGG<br>PSVFLFPPKPKDTLMISRTPEVTCVVVD<br>VSHEDPEVKFNWYVDGVEVHNAKTKP<br>REEQYNSTYRVVSVLTVLHQDWLNGK<br>EYKCKVSNKALPAPIEKTISKAKGQPRE<br>PQVYTLPPSREEMTKNQVSLTCLVKGF<br>YPSDIAVEWESNGQPENNYKTTPPVLD<br>SDGSFFLYSKLTVDKSRWQQGNVFSC<br>SVMHEALHNHYTQKSLSLSPGK |
| SEQ ID NO: 10 | DNA Heavy Chain | GAGGTGCAGCTGGTGCAGAGCGGCGCCGAGG<br>TGAAGAAGCCCGGCAGCAGCGTGAAGGTG<br>AGCTGCAAGGCCAGCGGCGGCACCTTCAAGA<br>GCTACGCCATCAGCTGGGTGAGGCAGGCC<br>CCCGGCCAGGGCCTGGAGTGGATGGGCAACA<br>TCATCCCCATGACCGGCCAGACCTACTAC<br>GCCCAGAAGTTCCAGGGCAGGGTGACCATCAC<br>CGCCGACGAGAGCACCAGCACCGCCTAC<br>ATGGAGCTGAGCAGCCTGAGGAGCGAGGACA<br>CCGCCGTGTACTACTGCGCCAGGGCCGCC<br>TACCACCCCTGGTGTTCGACAACTGGGGCCA<br>GGGCACCCTGGTGACCGTGAGCAGCGCC<br>AGCACCAAGGGCCCCAGCGTGTTCCCCCTGGC<br>CCCCAGCAGCAAGAGCACCAGCGGCGGC<br>ACCGCCGCCCTGGGCTGCCTGGTGAAGGACTA<br>CTTCCCCGAGCCCGTGACCGTGAGCTGG<br>AACAGCGGCGCCCTGACCAGCGGCGTGCACA<br>CCTTCCCCGCCGTGCTGCAGAGCAGCGGC<br>CTGTACAGCCTGAGCAGCGTGGTGACCGTGCC<br>CAGCAGCAGCCTGGGCACCCAGACCTAC<br>ATCTGCAACGTGAACCACAAGCCCAGCAACAC<br>CAAGGTGGACAAGAGGGTGGAGCCCAAG<br>AGCTGCGACAAGACCCACACCTGCCCCCCCTG<br>CCCCGCCCCCGAGGCCGCCGGCGGCCCC<br>AGCGTGTTCCTGTTCCCCCCCAAGCCCAAGGA<br>CACCCTGATGATCAGCAGGACCCCCGAG<br>GTGACCTGCGTGGTGGTGGACGTGAGCCACG<br>AGGACCCCGAGGTGAAGTTCAACTGGTAC<br>GTGGACGGCGTGGAGGTGCACAACGCCAAGA<br>CCAAGCCCAGGGAGGAGCAGTACAACAGC<br>ACCTACAGGGTGGTGAGCGTGCTGACCGTGCT<br>GCACCAGGACTGGCTGAACGGCAAGGAG<br>TACAAGTGCAAGGTGAGCAACAAGGCCCTGCC<br>CGCCCCCATCGAGAAGACCATCAGCAAG<br>GCCAAGGGCCAGCCCAGGGAGCCCCAGGTGT<br>ACACCCTGCCCCCCAGCAGGGAGGAGATG<br>ACCAAGAACCAGGTGAGCCTGACCTGCCTGGT<br>GAAGGGCTTCTACCCCAGCGACATCGCC<br>GTGGAGTGGGAGAGCAACGGCCAGCCCGAGA |

TABLE 22-continued

Sequences according to embodiments of the invention

| SEQ ID NUMBER | Ab region | Sequence |
|---|---|---|
| | | ACAACTACAAGACCACCCCCCCCGTGCTG GACAGCGACGGCAGCTTCTTCCTGTACAGCAA GCTGACCGTGGACAAGAGCAGGTGGCAG CAGGGCAACGTGTTCAGCTGCAGCGTGATGCA CGAGGCCCTGCACAACCACTACACCCAG AAGAGCCTGAGCCTGAGCCCCGGCAAG |
| SEQ ID NO: 11 (Kabat) | LCDR1 | SGSSSNIGNHYVN |
| SEQ ID NO: 12 (Kabat) | LCDR2 | RNNHRPS |
| SEQ ID NO: 13 (Kabat) | LCDR3 | QSWDYSGFSTV |
| SEQ ID NO: 14 (Chothia) | LCDR1 | SSSNIGNHY |
| SEQ ID NO: 15 (Chothia) | LCDR2 | RNN |
| SEQ ID NO: 16 (Chothia) | LCDR3 | WDYSGFST |
| SEQ ID NO: 17 | VL | DIVLTQPPSVSGAPGQRVTISCSGSSS NIGNHYVNWYQQLPGTAPKLLIYRNNH RPSGVPDRFSGSKSGTSASLAITGLQS EDEADYYCQSWDYSGFSTVFGGGTKL TVL |
| SEQ ID NO: 18 | DNA VL | GATATCGTCCTGACTCAGCCCCCTAG CGTCAGCGGCGCTCCCGGTCAGAGA GTGACTATTAGCTGTAGCGGCTCTAG CTCTAATATCGGTAATCACTACGTGA ACTGGTATCAGCAGCTGCCCGGCAC CGCCCCTAAGCTGCTGATCTATAGAA ACAATCACCGGCCTAGCGGCGTGCC CGATAGGTTTAGCGGATCTAAGTCAG GCACTAGCGCTAGTCTGGCTATCACC GGACTGCAGTCAGAGGACGAGGCCG ACTACTACTGTCAGTCCTGGGACTAT AGCGGCTTTAGCACCGTGTTCGGCG GAGGCACTAAGCTGACCGTGCTG |
| SEQ ID NO: 19 | Light Chain | DIVLTQPPSVSGAPGQRVTISCSGSSS NIGNHYVNWYQQLPGTAPKLLIYRNNH RPSGVPDRFSGSKSGTSASLAITGLQS EDEADYYCQSWDYSGFSTVFGGGTKL TVLGQPKAAPSVTLFPPSSEELQANKA TLVCLISDFYPGAVTVAWKADSSPVKA GVETTTPSKQSNNKYAASSYLSLTPEQ WKSHRSYSCQVTHEGSTVEKTVAPTE CS |
| SEQ ID NO: 20 | DNA Light Chain | GATATCGTCCTGACTCAGCCCCCTAG CGTCAGCGGCGCTCCCGGTCAGAGA GTGACTATTAGCTGTAGCGGCTCTAG CTCTAATATCGGTAATCACTACGTGA ACTGGTATCAGCAGCTGCCCGGCAC CGCCCCTAAGCTGCTGATCTATAGAA ACAATCACCGGCCTAGCGGCGTGCC CGATAGGTTTAGCGGATCTAAGTCAG GCACTAGCGCTAGTCTGGCTATCACC GGACTGCAGTCAGAGGACGAGGCCG ACTACTACTGTCAGTCCTGGGACTAT AGCGGCTTTAGCACCGTGTTCGGCG GAGGCACTAAGCTGACCGTGCTGGG TCAGCCTAAGGCTGCCCCCAGCGTG ACCCTGTTCCCCCCCAGCAGCGAGG AGCTGCAGGCCAACAAGGCCACCCT GGTGTGCCTGATCAGCGACTTCTACC CAGGCGCCGTGACCGTGGCCTGGAA GGCCGACAGCAGCCCCGTGAAGGCC GGCGTGGAGACCACCACCCCCAGCA AGCAGAGCAACAACAAGTACGCCGC CAGCAGCTACCTGAGCCTGACCCCC GAGCAGTGGAAGAGCCACAGGTCCT ACAGCTGCCAGGTGACCCACGAGGG CAGCACCGTGGAAAAGACCGTGGCC CCAACCGAGTGCAGC |

TABLE 22-continued

Sequences according to embodiments of the invention

| SEQ ID NUMBER | Ab region | Sequence |
|---|---|---|
| mAb2 | | |
| SEQ ID NO: 21 (Kabat) | HCDR1 | VYGMN |
| SEQ ID NO: 22 (Kabat) | HCDR2 | IIWYDGDNQYYADSVKG |
| SEQ ID NO: 23 (Kabat) | HCDR3 | DLRTGPFDY |
| SEQ ID NO: 24 (Chothia) | HCDR1 | GFTFSVY |
| SEQ ID NO: 25 (Chothia) | HCDR2 | WYDGDN |
| SEQ ID NO: 26 (Chothia) | HCDR3 | DLRTGPFDY |
| SEQ ID NO: 27 | VH | QVQLVESGGGVVQPGRSLRLSCAASG FTFSVYGMNWVRQAPGKGLEMAIIW YDGDNQYYADSVKGRFTISRDNSKNTL YLQMNGLRAEDTAVYYCARDLRTGPF DYWGQGTLVTVSS |
| SEQ ID NO: 28 | DNA VH | CAGGTGCAGCTGGTGGAGAGCGGCG GCGGCGTGGTGCAGCCCGGCAGGA GCCTGAGGCTGAGCTGCGCCGCCAG CGGCTTCACCTTCAGCGTGTACGGC ATGAACTGGGTGAGGCAGGCCCCCG GCAAGGGCCTGGAGTGGGTGGCCAT CATCTGGTACGACGGCGACAACCAG TACTACGCCGACAGCGTGAAGGGCA GGTTCACCATCAGCAGGGACAACAG CAAGAACACCCTGTACCTGCAGATGA ACGGCCTGAGGGCCGAGGACACCGC CGTGTACTACTGCGCCAGGGACCTG AGGACCGGCCCCTTCGACTACTGGG GCCAGGGCACCCTGGTGACCGTGAG CAGC |
| SEQ ID NO: 29 | Heavy Chain | QVQLVESGGGVVQPGRSLRLSCAASG FTFSVYGMNWVRQAPGKGLEMAIIW YDGDNQYYADSVKGRFTISRDNSKNTL YLQMNGLRAEDTAVYYCARDLRTGPF DYWGQGTLVTVSSASTKGPSVFPLAP SSKSTSGGTAALGCLVKDYFPEPVTVS WNSGALTSGVHTFPAVLQSSGLYSLSS WTVPSSSLGTQTYICNVNHKPSNTKV DKRVEPKSCDKTHTCPPCPAPELLGG PSVFLFPPKPKDTLMISRTPEVTCVVVD VSHEDPEVKFNWYVDGVEVHNAKTKP REEQYNSTYRVVSVLTVLHQDWLNGK EYKCKVSNKALPAPIEKTISKAKGQPRE PQVYTLPPSREEMTKNQVSLTCLVKGF YPSDIAVEWESNGQPENNYKTTPPVLD SDGSFFLYSKLTVDKSRWQQGNVFSC SVMHEALHNHYTQKSLSLSPGK |
| SEQ ID NO: 30 | DNA Heavy Chain | CAGGTGCAGCTGGTGGAGAGCGGCGGCGGCG TGGTGCAGCCCGGCAGGAGCCTGAGGCTG AGCTGCGCCGCCAGCGGCTTCACCTTCAGCGT GTACGGCATGAACTGGGTGAGGCAGGCC CCCGGCAAGGGCCTGGAGTGGGTGGCCATCA TCTGGTACGACGGCGACAACCAGTACTAC GCCGACAGCGTGAAGGGCAGGTTCACCATCA GCAGGGACAACAGCAAGAACACCCTGTAC CTGCAGATGAACGGCCTGAGGGCCGAGGACA CCGCCGTGTACTACTGCGCCAGGGACCTG AGGACCGGCCCCTTCGACTACTGGGGCCAGG GCACCCTGGTGACCGTGAGCAGCGCCAGC ACCAAGGGCCCCAGCGTGTTCCCCCTGGCCCC CAGCAGCAAGAGCACCAGCGGCGGCACC GCCGCCCTGGGCTGCCTGGTGAAGGACTACTT CCCCGAGCCCGTGACCGTGAGCTGGAAC AGCGGCGCCCTGACCAGCGGCGTGCACACCTT CCCCGCCGTGCTGCAGAGCAGCGGCCTG TACAGCCTGAGCAGCGTGGTGACCGTGCCCAG CAGCAGCCTGGGCACCCAGACCTACATC TGCAACGTGAACCACAAGCCCAGCAACACCAA GGTGGACAAGAGGGTGGAGCCCAAGAGC |

TABLE 22-continued

Sequences according to embodiments of the invention

| SEQ ID NUMBER | Ab region | Sequence |
| --- | --- | --- |
| | | TGCGACAAGACCCACACCTGCCCCCCCTGCCCC<br>GCCCCCGAGCTGCTGGGCGGCCCCAGC<br>GTGTTCCTGTTCCCCCCCAAGCCCAAGGACACC<br>CTGATGATCAGCAGGACCCCCGAGGTG<br>ACCTGCGTGGTGGTGGACGTGAGCCACGAGG<br>ACCCCGAGGTGAAGTTCAACTGGTACGTG<br>GACGGCGTGGAGGTGCACAACGCCAAGACCA<br>AGCCCAGGGAGGAGCAGTACAACAGCACC<br>TACAGGGTGGTGAGCGTGCTGACCGTGCTGCA<br>CCAGGACTGGCTGAACGGCAAGGAGTAC<br>AAGTGCAAGGTGAGCAACAAGGCCCTGCCCG<br>CCCCCATCGAGAAGACCATCAGCAAGGCC<br>AAGGGCCAGCCCAGGGAGCCCCAGGTGTACA<br>CCCTGCCCCCCAGCAGGGAGGAGATGACC<br>AAGAACCAGGTGAGCCTGACCTGCCTGGTGAA<br>GGGCTTCTACCCCAGCGACATCGCCGTG<br>GAGTGGGAGAGCAACGGCCAGCCCGAGAACA<br>ACTACAAGACCACCCCCCCCGTGCTGGAC<br>AGCGACGGCAGCTTCTTCCTGTACAGCAAGCT<br>GACCGTGGACAAGAGCAGGTGGCAGCAG<br>GGCAACGTGTTCAGCTGCAGCGTGATGCACGA<br>GGCCCTGCACAACCACTACACCCAGAAG<br>AGCCTGAGCCTGAGCCCCGGCAAG |
| SEQ ID NO: 31 (Kabat) | LCDR1 | RASQSIGSSLH |
| SEQ ID NO: 32 (Kabat) | LCDR2 | YASQSFS |
| SEQ ID NO: 33 (Kabat) | LCDR3 | HQSSSLPFT |
| SEQ ID NO: 34 (Chothia) | LCDR1 | SQSIGSS |
| SEQ ID NO: 35 (Chothia) | LCDR2 | YAS |
| SEQ ID NO: 36 (Chothia) | LCDR3 | SSSLPF |
| SEQ ID NO: 37 | VL | EIVLTQSPDFQSVTPKEKVTITCRASQS<br>IGSSLHWYQQKPDQSPKLLIKYASQSF<br>SGVPSRFSGSGSGTDFTLTINSLEAED<br>AAAYYCHQSSSLPFTFGPGTKVDIK |
| SEQ ID NO: 38 | DNA VL | GAGATCGTGCTGACCCAGTCACCCG<br>ACTTTCAGTCAGTGACCCCTAAAGAA<br>AAAGTGACTATCACCTGTAGGGCCTC<br>CCAGTCTATCGGCTCTAGCCTGCACT<br>GGTATCAGCAGAAGCCCGATCAGTC<br>ACCTAAGCTGCTGATTAAGTACGCCT<br>CTCAGTCCTTTAGCGGCGTGCCCTCT<br>AGGTTTAGCGGCTCAGGCTCAGGCA<br>CCGACTTCACCCTGACTATCAATAGC<br>CTGGAAGCCGAGGACGCCGCTGCCT<br>ACTACTGTCATCAGTCAAGTAGCCTG<br>CCCTTCACCTTCGGCCCTGGCACTAA<br>AGTGGATATTAAG |
| SEQ ID NO: 39 | Light Chain | EIVLTQSPDFQSVTPKEKVTITCRASQS<br>IGSSLHWYQQKPDQSPKLLIKYASQSF<br>SGVPSRFSGSGSGTDFTLTINSLEAED<br>AAAYYCHQSSSLPFTFGPGTKVDIKRT<br>VAAPSVFIFPPSDEQLKSGTASVVCLLN<br>NFYPREAKVQWKVDNALQSGNSQESV<br>TEQDSKDSTYSLSSTLTLSKADYEKHK<br>VYACEVTHQGLSSPVTKSFNRGEC |
| SEQ ID NO: 40 | DNA Light Chain | GAGATCGTGCTGACCCAGTCACCCG<br>ACTTTCAGTCAGTGACCCCTAAAGAA<br>AAAGTGACTATCACCTGTAGGGCCTC<br>CCAGTCTATCGGCTCTAGCCTGCACT<br>GGTATCAGCAGAAGCCCGATCAGTC<br>ACCTAAGCTGCTGATTAAGTACGCCT<br>CTCAGTCCTTTAGCGGCGTGCCCTCT<br>AGGTTTAGCGGCTCAGGCTCAGGCA<br>CCGACTTCACCCTGACTATCAATAGC<br>CTGGAAGCCGAGGACGCCGCTGCCT<br>ACTACTGTCATCAGTCAAGTAGCCTG<br>CCCTTCACCTTCGGCCCTGGCACTAA |

TABLE 22-continued

Sequences according to embodiments of the invention

| SEQ ID NUMBER | Ab region | Sequence |
|---|---|---|
| | | AGTGGATATTAAGCGTACGGTGGCC<br>GCTCCCAGCGTGTTCATCTTCCCCCC<br>CAGCGACGAGCAGCTGAAGAGCGGC<br>ACCGCCAGCGTGGTGTGCCTGCTGA<br>ACAACTTCTACCCCCGGGAGGCCAA<br>GGTGCAGTGGAAGGTGGACAACGCC<br>CTGCAGAGCGGCAACAGCCAGGAGA<br>GCGTCACCGAGCAGGACAGCAAGGA<br>CTCCACCTACAGCCTGAGCAGCACC<br>CTGACCCTGAGCAAGGCCGACTACG<br>AGAAGCATAAGGTGTACGCCTGCGA<br>GGTGACCCACCAGGGCCTGTCCAGC<br>CCCGTGACCAAGAGCTTCAACAGGG<br>GCGAGTGC |
| Second part from mAb2 | | |
| SEQ ID NO: 41 (Combined) | HCDR1 | GFTFSVYGMN |
| SEQ ID NO: 42 (Combined) | HCDR2 | IIWYDGDNQYYADSVKG |
| SEQ ID NO: 43 (Combined) | HCDR3 | DLRTGPFDY |
| SEQ ID NO: 44 (Kabat) | HCDR1 | VYGMN |
| SEQ ID NO: 45 (Kabat) | HCDR2 | IIWYDGDNQYYADSVKG |
| SEQ ID NO: 46 (Kabat) | HCDR3 | DLRTGPFDY |
| SEQ ID NO: 47 (Chothia) | HCDR1 | GFTFSVY |
| SEQ ID NO: 48 (Chothia) | HCDR2 | WYDGDN |
| SEQ ID NO: 49 (Chothia) | HCDR3 | DLRTGPFDY |
| SEQ ID NO: 50 (IMGT) | HCDR1 | GFTFSVYG |
| SEQ ID NO: 51 (IMGT) | HCDR2 | IWYDGDNQ |
| SEQ ID NO: 52 (IMGT) | HCDR3 | ARDLRTGPFDY |
| SEQ ID NO: 53 | VH | QVQLVESGGGVVQPGRSLRLSCAASG<br>FTFSVYGMNWVRQAPGKGLEWVAIIW<br>YDGDNQYYADSVKGRFTISRDNSKNTL<br>YLQMNGLRAEDTAVYYCARDLRTGPF<br>DYWGQGTLVTVSS |
| SEQ ID NO: 54 | DNA VH | CAGGTGCAGCTGGTGGAATCAGGCG<br>GCGGAGTGGTGCAGCCTGGTAGATC<br>ACTGAGACTGAGCTGCGCTGCTAGT<br>GGCTTCACCTTTAGCGTCTACGGAAT<br>GAACTGGGTCCGACAGGCCCCTGGG<br>AAAGGCCTGGAGTGGGTGGCAATTA<br>TCTGGTACGACGGCGATAATCAGTAC<br>TACGCCGATAGCGTGAAGGGACGGT<br>TCACTATCTCTAGGGATAACTCTAAG<br>AACACCCTGTACCTGCAGATGAACGG<br>CCTGAGAGCCGAGGACACCGCCGTC<br>TACTACTGCGCTAGGGACCTGAGAAC<br>CGGCCCCTTCGACTACTGGGGACAG<br>GGCACCCTGGTCACCGTGTCTAGC |
| SEQ ID NO: 55 | Heavy Chain | QVQLVESGGGVVQPGRSLRLSCAASG<br>FTFSVYGMNWVRQAPGKGLEMAIIW<br>YDGDNQYYADSVKGRFTISRDNSKNTL<br>YLQMNGLRAEDTAVYYCARDLRTGPF<br>DYWGQGTLVTVSSASTKGPSVFPLAP<br>SSKSTSGGTAALGCLVKDYFPEPVTVS<br>WNSGALTSGVHTFPAVLQSSGLYSLSS<br>WTVPSSSLGTQTYICNVNHKPSNTKV<br>DKRVEPKSCDKTHTCPPCPAPEAAGG<br>PSVFLFPPKPKDTLMISRTPEVTCVVVD<br>VSHEDPEVKFNWYVDGVEVHNAKTKP |

TABLE 22-continued

Sequences according to embodiments of the invention

| SEQ ID NUMBER | Ab region | Sequence |
| --- | --- | --- |
| | | REEQYNSTYRVVSVLTVLHQDWLNGK<br>EYKCKVSNKALPAPIEKTISKAKGQPRE<br>PQVCTLPPSREEMTKNQVSLSCAVKG<br>FYPSDIAVEWESNGQPENNYKTTPPVL<br>DSDGSFFLVSKLTVDKSRWQQGNVFS<br>CSVMHEALHNHYTQKSLSLSPGK |
| SEQ ID NO: 56 | DNA Heavy Chain | CAGGTGCAGCTGGTGGAATCAGGCG<br>GCGGAGTGGTGCAGCCTGGTAGATC<br>ACTGAGACTGAGCTGCGCTGCTAGT<br>GGCTTCACCTTTAGCGTCTACGGAAT<br>GAACTGGGTCCGACAGGCCCCTGGG<br>AAAGGCCTGGAGTGGGTGGCAATTA<br>TCTGGTACGACGGCGATAATCAGTAC<br>TACGCCGATAGCGTGAAGGGACGGT<br>TCACTATCTCTAGGGATAACTCTAAG<br>AACACCCTGTACCTGCAGATGAACGG<br>CCTGAGAGCCGAGGACACCGCCGTC<br>TACTACTGCGCTAGGGACCTGAGAAC<br>CGGCCCCTTCGACTACTGGGGACAG<br>GGCACCCTGGTCACCGTGTCTAGCG<br>CCTCTACTAAGGGCCCAAGCGTGTTC<br>CCCCTGGCCCCTAGCTCTAAGTCTAC<br>TAGCGGAGGCACCGCCGCTCTGGGC<br>TGCCTGGTCAAGGACTACTTCCCCGA<br>GCCCGTGACCGTCAGCTGGAATAGC<br>GGCGCTCTGACTAGCGGAGTGCACA<br>CCTTCCCCGCCGTGCTGCAGTCTAG<br>CGGCCTGTATAGCCTGTCTAGCGTC<br>GTGACCGTGCCTAGCTCTAGCCTGG<br>GCACTCAGACCTATATCTGTAACGTG<br>AACCACAAGCCCTCTAACACTAAGGT<br>GGACAAGCGGGTGGAACCTAAGTCC<br>TGCGATAAGACTCACACCTGTCCTCC<br>CTGCCCTGCCCCTGAGGCTGCCGGA<br>GGACCTAGCGTGTTCCTGTTCCCACC<br>TAAGCCTAAAGACACCCTGATGATCT<br>CTAGGACCCCCGAAGTGACCTGCGT<br>GGTGGTGGACGTCTCACACGAGGAC<br>CCTGAAGTGAAGTTTAATTGGTACGT<br>GGACGGCGTGGAAGTGCACAACGCT<br>AAGACTAAGCCTAGAGAGGAACAGTA<br>TAACTCTACCTATAGGGTCGTCAGCG<br>TGCTGACAGTGCTGCACCAGGACTG<br>GCTGAACGGGAAAGAGTATAAGTGTA<br>AAGTGTCTAACAAGGCCCTGCCAGC<br>CCCTATCGAAAAGACTATCTCTAAGG<br>CTAAGGGGCAGCCTAGAGAACCCCA<br>AGTGTGCACTCTGCCCCCTAGTAGAG<br>AAGAGATGACTAAGAATCAGGTGTCA<br>CTGAGCTGTGCCGTGAAGGGCTTCT<br>ACCCTAGCGATATCGCCGTGGAGTG<br>GGAGAGCAACGGCCAGCCCGAGAAC<br>AACTACAAGACCACCCCCCCAGTGCT<br>GGACAGCGACGGCAGCTTCTTCCTG<br>GTGAGCAAGCTGACCGTGGACAAGT<br>CCAGGTGGCAGCAGGGCAACGTGTT<br>CAGCTGCAGCGTGATGCACGAGGCC<br>CTGCACAACCACTACACCCAGAAGTC<br>CCTGAGCCTGAGCCCCGGCAAG |
| SEQ ID NO: 57 (Combined) | LCDR1 | RASQSIGSSLH |
| SEQ ID NO: 58 (Combined) | LCDR2 | YASQSFS |
| SEQ ID NO: 59 (Combined) | LCDR3 | HQSSSLPFT |
| SEQ ID NO: 60 (Kabat) | LCDR1 | RASQSIGSSLH |
| SEQ ID NO: 61 (Kabat) | LCDR2 | YASQSFS |
| SEQ ID NO: 62 (Kabat) | LCDR3 | HQSSSLPFT |

TABLE 22-continued

Sequences according to embodiments of the invention

| SEQ ID NUMBER | Ab region | Sequence |
|---|---|---|
| SEQ ID NO: 63 (Chothia) | LCDR1 | SQSIGSS |
| SEQ ID NO: 64 (Chothia) | LCDR2 | YAS |
| SEQ ID NO: 65 (Chothia) | LCDR3 | SSSLPF |
| SEQ ID NO: 66 (IMGT) | LCDR1 | QSIGSS |
| SEQ ID NO: 67 (IMGT) | LCDR2 | YASQSFSGVP |
| SEQ ID NO: 68 (IMGT) | LCDR3 | HQSSSLPFT |
| SEQ ID NO: 69 | VL | EIVLTQSPDFQSVTPKEKVTITCRASQS IGSSLHWYQQKPDQSPKLLIKYASQSF SGVPSRFSGSGSGTDFTLTINSLEAED AAAYYCHQSSSLPFTFGPGTKVDIK |
| SEQ ID NO: 70 | DNA VL | GAGATCGTGCTGACCCAGTCACCCG ACTTTCAGTCAGTGACCCCTAAAGAA AAAGTGACTATCACCTGTAGGGCCTC CCAGTCTATCGGCTCTAGCCTGCACT GGTATCAGCAGAAGCCCGATCAGTC ACCTAAGCTGCTGATTAAGTACGCCT CTCAGTCCTTTAGCGGCGTGCCCTCT AGGTTTAGCGGCTCAGGCTCAGGCA CCGACTTCACCCTGACTATCAATAGC CTGGAAGCCGAGGACGCCGCTGCCT ACTACTGTCATCAGTCAAGTAGCCTG CCCTTCACCTTCGGCCCTGGCACTAA AGTGGATATTAAG |
| SEQ ID NO: 71 | Light Chain | EIVLTQSPDFQSVTPKEKVTITCRASQS IGSSLHWYQQKPDQSPKLLIKYASQSF SGVPSRFSGSGSGTDFTLTINSLEAED AAAYYCHQSSSLPFTFGPGTKVDIKRT VAAPSVFIFPPSDEQLKSGTASVVCLLN NFYPREAKVQWKVDNALQSGNSQESV TEQDSKDSTYSLSSTLTLSKADYEKHK VYACEVTHQGLSSPVTKSFNRGEC |
| SEQ ID NO: 72 | DNA Light Chain | GAGATCGTGCTGACCCAGTCACCCG ACTTTCAGTCAGTGACCCCTAAAGAA AAAGTGACTATCACCTGTAGGGCCTC CCAGTCTATCGGCTCTAGCCTGCACT GGTATCAGCAGAAGCCCGATCAGTC ACCTAAGCTGCTGATTAAGTACGCCT CTCAGTCCTTTAGCGGCGTGCCCTCT AGGTTTAGCGGCTCAGGCTCAGGCA CCGACTTCACCCTGACTATCAATAGC CTGGAAGCCGAGGACGCCGCTGCCT ACTACTGTCATCAGTCAAGTAGCCTG CCCTTCACCTTCGGCCCTGGCACTAA AGTGGATATTAAGCGTACGGTGGCC GCTCCCAGCGTGTTCATCTTCCCCCC CAGCGACGAGCAGCTGAAGAGCGGC ACCGCCAGCGTGGTGTGCCTGCTGA ACAACTTCTACCCCCGGGAGGCCAA GGTGCAGTGGAAGGTGGACAACGCC CTGCAGAGCGGCAACAGCCAGGAGA GCGTCACCGAGCAGGACAGCAAGGA CTCCACCTACAGCCTGAGCAGCACC CTGACCCTGAGCAAGGCCGACTACG AGAAGCATAAGGTGTACGCCTGCGA GGTGACCCACCAGGGCCTGTCCAGC CCCGTGACCAAGAGCTTCAACAGGG GCGAGTGC |

First part from mAb1

| SEQ ID NO: 73 (Combined) | HCDR1 | GGTFKSYAIS |
| SEQ ID NO: 74 (Combined) | HCDR2 | NIIPMTGQTYYAQKFQG |

TABLE 22-continued

Sequences according to embodiments of the invention

| SEQ ID NUMBER | Ab region | Sequence |
| --- | --- | --- |
| SEQ ID NO: 75 (Combined) | HCDR3 | AAYHPLVFDN |
| SEQ ID NO: 76 (Kabat) | HCDR1 | SYAIS |
| SEQ ID NO: 77 (Kabat) | HCDR2 | NIIPMTGQTYYAQKFQG |
| SEQ ID NO: 78 (Kabat) | HCDR3 | AAYHPLVFDN |
| SEQ ID NO: 79 (Chothia) | HCDR1 | GGTFKSY |
| SEQ ID NO: 80 (Chothia) | HCDR2 | IPMTGQ |
| SEQ ID NO: 81 (Chothia) | HCDR3 | AAYHPLVFDN |
| SEQ ID NO: 82 (IMGT) | HCDR1 | GGTFKSYA |
| SEQ ID NO: 83 (IMGT) | HCDR2 | IIPMTGQT |
| SEQ ID NO: 84 (IMGT) | HCDR3 | ARAAYHPLVFDN |
| SEQ ID NO: 85 | VH | EVQLVQSGAEVKKPGSSVKVSCKASG GTFKSYAISWVRQAPGQGLEWMGNIIP MTGQTYYAQKFQGRVTITADESTSTAY MELSSLRSEDTAVYYCARAAYHPLVFD NWGQGTLVTVSS |
| SEQ ID NO: 86 | DNA VH | GAGGTGCAGCTGGTGCAGTCAGGCG CCGAAGTGAAGAAACCCGGCTCTAG CGTGAAAGTCAGCTGTAAAGCTAGTG GCGGCACCTTCAAGTCCTACGCTATT AGCTGGGTCAGACAGGCCCCAGGTC AGGGCCTGGAGTGGATGGGCAATAT TATCCCTATGACCGGTCAGACCTACT ACGCTCAGAAATTTCAGGGTAGAGTG ACTATCACCGCCGACGAGTCTACTAG CACCGCCTATATGGAACTGTCTAGCC TGAGATCAGAGGACACCGCCGTCTA CTACTGCGCTAGAGCCGCCTATCACC CCCTGGTGTTCGATAACTGGGGTCA GGGCACCCTGGTCACCGTGTCTAGC |
| SEQ ID NO: 87 | Heavy Chain | EVQLVQSGAEVKKPGSSVKVSCKASG GTFKSYAISWVRQAPGQGLEWMGNIIP MTGQTYYAQKFQGRVTITADESTSTAY MELSSLRSEDTAVYYCARAAYHPLVFD NWGQGTLVTVSSASTKGPSVFPLAPS SKSTSGGTAALGCLVKDYFPEPVTVS WNSGALTSGVHTFPAVLQSSGLYSLSS WTVPSSSLGTQTYICNVNHKPSNTKV DKRVEPKSCDKTHTCPPCPAPEAAGG PSVFLFPPKPKDTLMISRTPEVTCVVVD VSHEDPEVKFNWYVDGVEVHNAKTKP REEQYNSTYRVVSVLTVLHQDWLNGK EYKCKVSNKALPAPIEKTISKAKGQPRE PQVYTLPPCREEMTKNQVSLWCLVKG FYPSDIAVEWESNGQPENNYKTTPPVL DSDGSFFLYSKLTVDKSRWQQGNVFS CSVMHEALHNHYTQKSLSLSPGK |
| SEQ ID NO: 88 | DNA Heavy Chain | GAGGTGCAGCTGGTGCAGTCAGGCG CCGAAGTGAAGAAACCCGGCTCTAG CGTGAAAGTCAGCTGTAAAGCTAGTG GCGGCACCTTCAAGTCCTACGCTATT AGCTGGGTCAGACAGGCCCCAGGTC AGGGCCTGGAGTGGATGGGCAATAT TATCCCTATGACCGGTCAGACCTACT ACGCTCAGAAATTTCAGGGTAGAGTG ACTATCACCGCCGACGAGTCTACTAG CACCGCCTATATGGAACTGTCTAGCC TGAGATCAGAGGACACCGCCGTCTA CTACTGCGCTAGAGCCGCCTATCACC CCCTGGTGTTCGATAACTGGGGTCA GGGCACCCTGGTCACCGTGTCTAGC GCTAGCACTAAGGGCCCCTCAGTGTT |

TABLE 22-continued

Sequences according to embodiments of the invention

| SEQ ID NUMBER | Ab region | Sequence |
|---|---|---|
| | | CCCCCTGGCCCCTAGCTCTAAGTCTA<br>CTAGCGGCGGCACCGCCGCTCTGGG<br>CTGCCTGGTGAAAGACTACTTCCCCG<br>AGCCCGTGACCGTGTCATGGAATAG<br>CGGCGCTCTGACTAGCGGAGTGCAC<br>ACCTTCCCCGCCGTGCTGCAGTCTA<br>GCGGCCTGTATAGCCTGTCTAGCGT<br>GGTGACCGTGCCTAGCTCTAGCCTG<br>GGCACTCAGACCTACATCTGTAACGT<br>GAACCACAAGCCCTCTAACACTAAGG<br>TGGACAAGCGGGTGGAACCTAAGTC<br>CTGCGATAAGACTCACACCTGTCCCC<br>CCTGCCCTGCCCCTGAGGCTGCCGG<br>AGGACCTAGCGTGTTCCTGTTCCCAC<br>CTAAGCCTAAGGACACCCTGATGATC<br>TCTAGGACCCCCGAAGTGACCTGCG<br>TGGTGGTGGATGTGTCTCACGAGGA<br>CCCTGAAGTGAAGTTCAATTGGTACG<br>TGGACGGCGTGGAAGTGCACAACGC<br>TAAGACTAAGCCTAGAGAGGAACAGT<br>ATAACTCCACCTATAGAGTGGTGTCA<br>GTGCTGACCGTGCTGCATCAGGACT<br>GGCTGAACGGCAAAGAGTATAAGTGT<br>AAAGTCTCTAACAAGGCCCTGCCAGC<br>CCCTATCGAAAAGACTATCTCTAAGG<br>CTAAGGGCCAGCCTAGAGAACCTCA<br>GGTGTACACCCTGCCCCCCTGTAGA<br>GAAGAGATGACTAAGAATCAGGTGTC<br>CCTGTGGTGTCTGGTGAAAGGCTTCT<br>ACCCTAGCGATATCGCCGTGGAATG<br>GGAGTCTAACGGCCAGCCCGAGAAC<br>AACTATAAGACTACCCCCCCTGTGCT<br>GGATAGCGACGGCTCATTCTTCCTGT<br>ACTCTAAGCTGACCGTGGACAAGTCT<br>AGGTGGCAGCAGGGCAATGTGTTTA<br>GCTGTAGCGTGATGCACGAGGCCCT<br>GCATAATCACTACACTCAGAAGTCAC<br>TGAGCCTGAGCCCCGGCAAG |
| SEQ ID NO: 89 (Combined) | LCDR1 | SGSSSNIGNHYVN |
| SEQ ID NO: 90 (Combined) | LCDR2 | RNNHRPS |
| SEQ ID NO: 91 (Combined) | LCDR3 | QSWDYSGFSTV |
| SEQ ID NO: 92 (Kabat) | LCDR1 | SGSSSNIGNHYVN |
| SEQ ID NO: 93 (Kabat) | LCDR2 | RNNHRPS |
| SEQ ID NO: 94 (Kabat) | LCDR3 | QSWDYSGFSTV |
| SEQ ID NO: 95 (Chothia) | LCDR1 | SSSNIGNHY |
| SEQ ID NO: 96 (Chothia) | LCDR2 | RNN |
| SEQ ID NO: 97 (Chothia) | LCDR3 | WDYSGFST |
| SEQ ID NO: 98 (IMGT) | LCDR1 | SSNIGNHY |
| SEQ ID NO: 99 (IMGT) | LCDR2 | RNN |
| SEQ ID NO: 100 (IMGT) | LCDR3 | QSWDYSGFSTV |
| SEQ ID NO: 101 | VL | DIVLTQPPSVSGAPGQRVTISCSGSSS<br>NIGNHYVNWYQQLPGTAPKLLIYRNNH<br>RPSGVPDRFSGSKSGTSASLAITGLQS<br>EDEADYYCQSWDYSGFSTVFGGGTKL<br>TVL |
| SEQ ID NO: 102 | DNA VL | GATATCGTCCTGACTCAGCCCCCTAG<br>CGTCAGCGGCGCTCCCGGTCAGAGA<br>GTGACTATTAGCTGTAGCGGCTCTAG<br>CTCTAATATCGGTAATCACTACGTGA |

TABLE 22-continued

Sequences according to embodiments of the invention

| SEQ ID NUMBER | Ab region | Sequence |
|---|---|---|
| | | ACTGGTATCAGCAGCTGCCCGGCAC<br>CGCCCCTAAGCTGCTGATCTATAGAA<br>ACAATCACCGGCCTAGCGGCGTGCC<br>CGATAGGTTTAGCGGATCTAAGTCAG<br>GCACTAGCGCTAGTCTGGCTATCACC<br>GGACTGCAGTCAGAGGACGAGGCCG<br>ACTACTACTGTCAGTCCTGGGACTAT<br>AGCGGCTTTAGCACCGTGTTCGGCG<br>GAGGCACTAAGCTGACCGTGCTG |
| SEQ ID NO: 103 | Light Chain | DIVLTQPPSVSGAPGQRVTISCSGSSS<br>NIGNHYVNWYQQLPGTAPKLLIYRNNH<br>RPSGVPDRFSGSKSGTSASLAITGLQS<br>EDEADYYCQSWDYSGFSTVFGGGTKL<br>TVLGQPKAAPSVTLFPPSSEELQANKA<br>TLVCLISDFYPGAVTVAWKADSSPVKA<br>GVETTTPSKQSNNKYAASSYLSLTPEQ<br>WKSHRSYSCQVTHEGSTVEKTVAPTE<br>CS |
| SEQ ID NO: 104 | DNA Light Chain | GATATCGTCCTGACTCAGCCCCCTAG<br>CGTCAGCGGCGCTCCCGGTCAGAGA<br>GTGACTATTAGCTGTAGCGGCTCTAG<br>CTCTAATATCGGTAATCACTACGTGA<br>ACTGGTATCAGCAGCTGCCCGGCAC<br>CGCCCCTAAGCTGCTGATCTATAGAA<br>ACAATCACCGGCCTAGCGGCGTGCC<br>CGATAGGTTTAGCGGATCTAAGTCAG<br>GCACTAGCGCTAGTCTGGCTATCACC<br>GGACTGCAGTCAGAGGACGAGGCCG<br>ACTACTACTGTCAGTCCTGGGACTAT<br>AGCGGCTTTAGCACCGTGTTCGGCG<br>GAGGCACTAAGCTGACCGTGCTGGG<br>TCAGCCTAAGGCTGCCCCCAGCGTG<br>ACCCTGTTCCCCCCCAGCAGCGAGG<br>AGCTGCAGGCCAACAAGGCCACCCT<br>GGTGTGCCTGATCAGCGACTTCTACC<br>CAGGCGCCGTGACCGTGGCCTGGAA<br>GGCCGACAGCAGCCCCGTGAAGGCC<br>GGCGTGGAGACCACCACCCCCAGCA<br>AGCAGAGCAACAACAAGTACGCCGC<br>CAGCAGCTACCTGAGCCTGACCCCC<br>GAGCAGTGGAAGAGCCACAGGTCCT<br>ACAGCTGCCAGGTGACCCACGAGGG<br>CAGCACCGTGGAAAAGACCGTGGCC<br>CCAACCGAGTGCAGC |

Throughout the text of this application, should there be a discrepancy between the text of the specification (e.g. Table 22) and the sequence listing, the text of the specification shall prevail.

What is claimed is:

1. A method for the treatment or prevention of an NLRC4 inflammasomopathy in a subject in need thereof, comprising administering to said subject a therapeutically effective amount of a bispecific antibody, wherein the antibody comprises a. a first part which is an immunoglobulin with a first variable light chain of (VL1) and a first variable heavy chain (VH1), that binds specifically to a IL1β, and a first constant heavy chain (CH1) with a hetero-dimerization modification, and b. a second part which is an immunoglobulin with a second variable light chain (VL2) and a second variable heavy chain (VH2), that binds specifically to IL-18 and a second constant heavy chain (CH2) with a hetero-dimerization modification which is complementary to the hetero-dimerization modification of the first constant heavy chain, wherein the method comprises administering the bispecific antibody intravenously at a dose of about 10 mg/kg, and wherein
- i. the first immunoglobulin VH1 domain of the bispecific antibody comprises the amino acid sequence SEQ ID NO: 85,
- ii. the first immunoglobulin VL1 domain of the bispecific antibody comprises the amino acid sequence SEQ ID NO: 101,
- iii. the second immunoglobulin VH2 domain of the bispecific antibody comprises the amino acid sequence SEQ ID NO: 53, and
- iv. the second immunoglobulin VL2 domain of the bispecific antibody comprises the amino acid sequence SEQ ID NO: 69.

2. The method according to claim 1, wherein said subject has an NLRC4-GOF inflammasomopathy.

3. The method according to claim 1, wherein said subject has macrophage activation syndrome (MAS).

4. The method according to claim 1, wherein said subject has autoinflammation with infantile enterocolitis (AIFEC).

5. The method according to claim 1, wherein the bispecific antibody is administered intravenously every other week.

6. The method according to claim 1, wherein
- a. the first immunoglobulin heavy chain of the bispecific antibody comprises the amino acid sequence SEQ ID NO: 87,
- b. the first immunoglobulin light chain of the bispecific antibody comprises the amino acid sequence SEQ ID NO: 103,
- c. the second immunoglobulin heavy chain of the bispecific antibody comprises the amino acid sequence SEQ ID NO: 55, and
- d. the second immunoglobulin light chain of the bispecific antibody comprises the amino acid sequence SEQ ID NO: 71.

* * * * *